(12) United States Patent
Hirasaka

(10) Patent No.: US 6,996,168 B2
(45) Date of Patent: Feb. 7, 2006

(54) SIGNAL-PROCESSING CIRCUIT, AND RECORDING AND PLAYBACK APPARATUS EMPLOYING THE SAME

(75) Inventor: Hisato Hirasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 09/992,606

(22) Filed: Nov. 14, 2001

(65) Prior Publication Data

US 2002/0122478 A1 Sep. 5, 2002

(30) Foreign Application Priority Data

Nov. 17, 2000 (JP) ............................ P2000-351894

(51) Int. Cl.
    *H03H 7/30* (2006.01)
    *H03D 3/24* (2006.01)
    *G06F 17/15* (2006.01)

(52) U.S. Cl. ....................... 375/229; 375/376; 708/322

(58) Field of Classification Search ................ 375/229, 375/232, 376; 360/46, 51, 65; 708/322, 708/323; 369/59, 21, 44
See application file for complete search history.

(56) References Cited

U.S. PATENT DOCUMENTS

| | | | | |
|---|---|---|---|---|
| 5,872,666 A | * | 2/1999 | Saiki et al. | 360/46 |
| 5,937,020 A | * | 8/1999 | Hase et al. | 375/376 |
| 6,124,997 A | * | 9/2000 | Hirasaka | 360/65 |

* cited by examiner

Primary Examiner—Khai Tran
(74) Attorney, Agent, or Firm—Jay H. Maioli

(57) ABSTRACT

A signal-processing circuit in which two-stage equalization is performed by using first and second equalization circuits provided on upstream and downstream sides from a phase-locked loop circuit, respectively, the first equalization circuit on the upstream side including a transversal filter to minimize an equalization error caused by the first equalization circuit and to stabilize the operation of the phase-locked loop circuit. Another signal-processing circuit including an analog-to-digital converter and a digital phase-locked loop circuit for receiving the output from the analog-to-digital converter and a recording and playback apparatus using the output are also provided, wherein the output from the analog-to-digital converter is input as the digital signal in the digital phase-locked loop circuit to fetch a detection point voltage and to stabilize the phase-locked loop circuit without an analog circuit.

27 Claims, 72 Drawing Sheets

FIG. 4A  x(n)
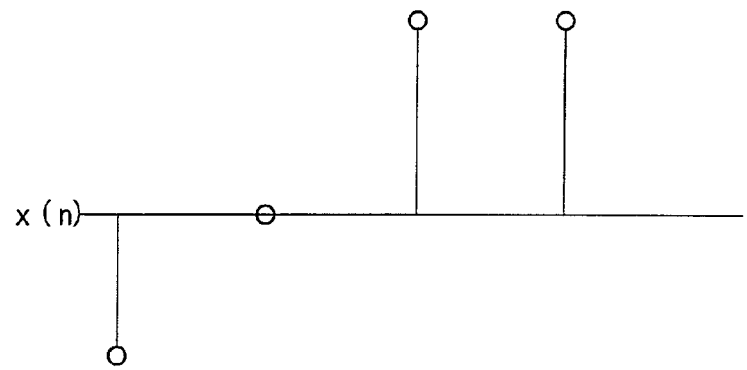
FIG. 4B  y(m)
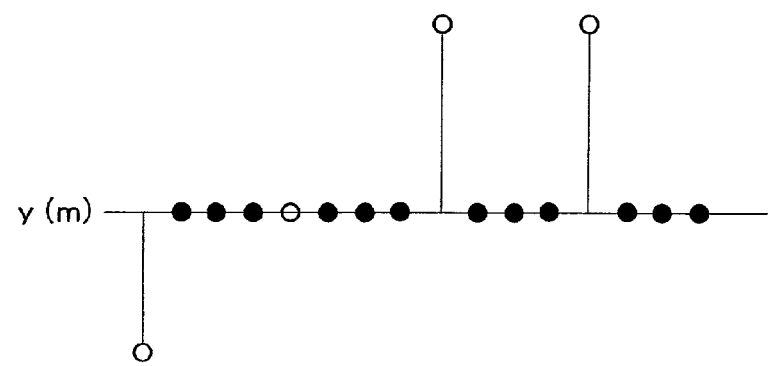
FIG. 4C  z(m)
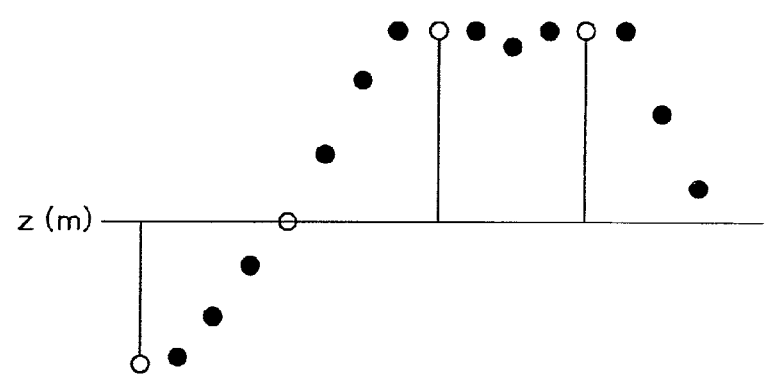

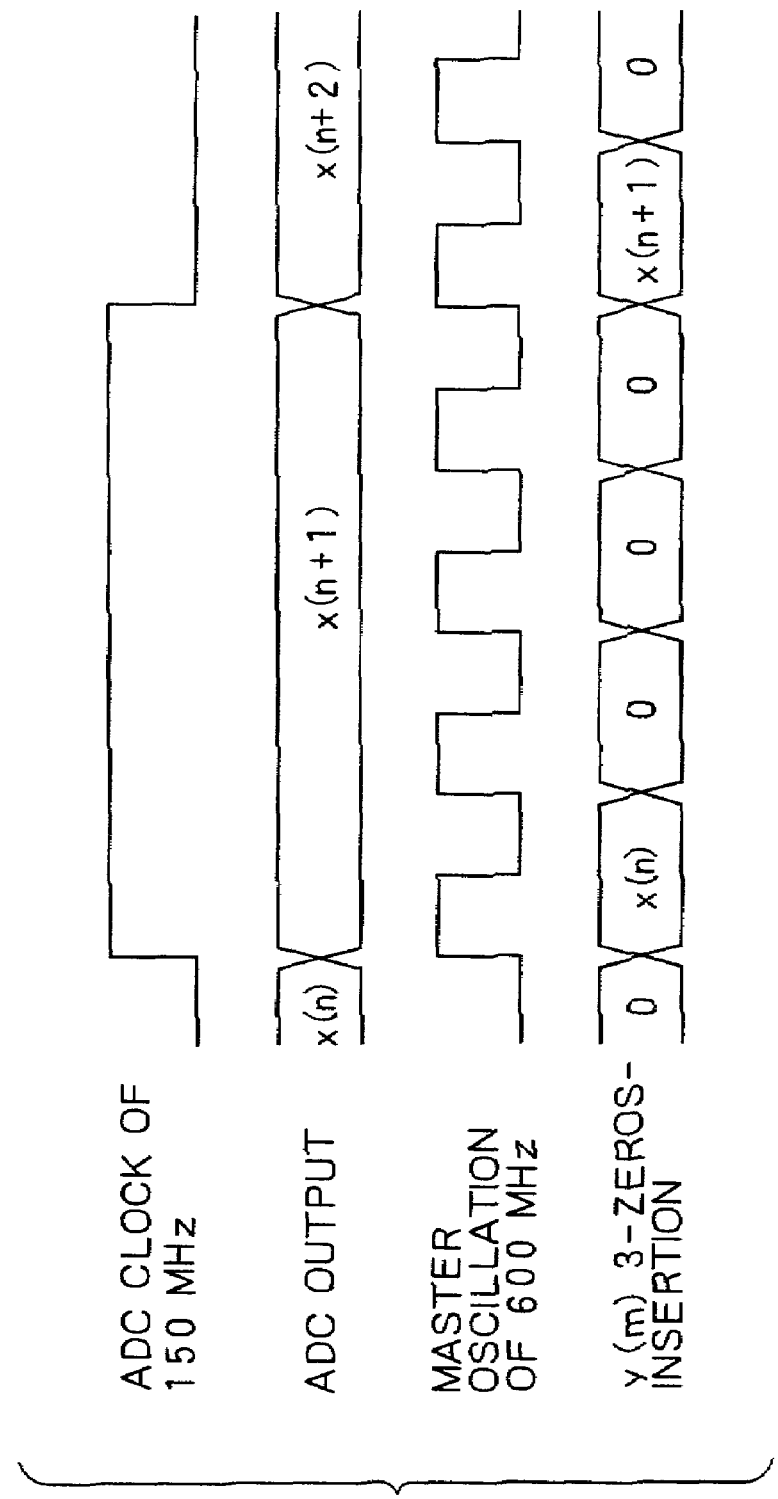

TAP COEFFICIENT OF THE x4 INTERPOLATION FILTER

TAP COEFFICIENT OF THE x16 INTERPOLATION FILTER

EYE PATTERN OF THE x16 INTERPOLATED DATA

FIG.30A

| | |
|---|---|
| . . . | . . . |
| . . . | . . . |
| . . . | . . . |
| ADDRESS 5 | data(10) |
| ADDRESS 4 | data(8) |
| ADDRESS 3 | data(6) |
| ADDRESS 2 | data(4) |
| ADDRESS 1 | data(2) |
| ADDRESS 0 | data(0) |

FIRST MEMORY BANK

FIG.30B

| | |
|---|---|
| . . . | . . . |
| . . . | . . . |
| . . . | . . . |
| ADDRESS 5 | data(11) |
| ADDRESS 4 | data(9) |
| ADDRESS 3 | data(7) |
| ADDRESS 2 | data(5) |
| ADDRESS 1 | data(3) |
| ADDRESS 0 | data(1) |

SECOND MEMORY BANK

TRANSFER CHARACTERISTICS OF THE 24-TAPS EQUALIZER 2 (t=i)

TRANSFER CHARACTERISTICS OF THE 24-TAPS EQUALIZER 1 (t = i+1)

TRANSFER CHARACTERISTICS OF THE 24-TAPS EQUALIZER 1 (t = i+1)

PR1 CHANNEL EYE PATTERN

PR1 CHANNEL EYE PATTERN

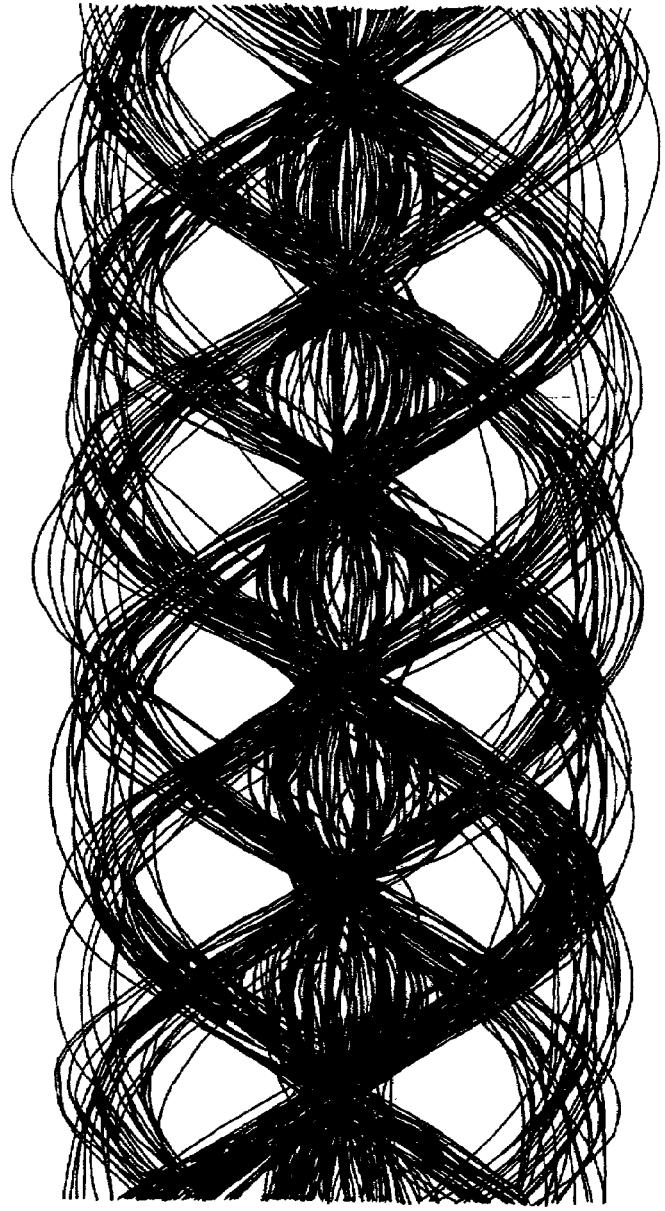
F I G. 70
PR1 CHANNEL EYE PATTERN

PR1 EYE PATTERN

PR1 EYE PATTERN

PR1 EYE PATTERN

FIG. 76  PR1 EYE PATTERN

PR1 EYE PATTERN

SIGNAL-PROCESSING CIRCUIT, AND RECORDING AND PLAYBACK APPARATUS EMPLOYING THE SAME

BACKGROUND OF THE INVENTION

In general, the present invention relates to a signal-processing circuit employed in a playback system for playing back information from a magnetic recording medium or an optical recording medium. More particularly, the present invention relates to a signal-processing circuit employing a PLL (Phase Locked Loop) circuit inputting playback data obtained as a result of digital conversion of a playback signal through a first equalization circuit, and relates to a recording and playback apparatus employing the signal-processing circuit.

A tape streamer conforming to DDS (Digital Data Storage)-4 specifications typically includes a recording system 110 with a configuration like one shown in FIG. 65 and a playback system 120 with a configuration like one shown in FIG. 66. The recording system 110 records data onto a magnetic tape 130 whereas the playback system 120 plays back data from a magnetic tape 130.

As shown in FIG. 65, in the recording system 110 employed in a tape streamer conforming to the DDS4 specifications, data to be recorded is subjected to 8/10 conversion carried out by an 8/10 converter 111. The 8/10 conversion is a kind of block coding. The data completing the 8/10 conversion is then converted into a current by a recording amplifier 112. The current is supplied to a recording head 114 by way of a rotary transformer 113. Then, the recording head 114 records the data onto the magnetic tape 130.

In the playback system 120 employed in a tape streamer conforming to the DDS4 specifications, on the other hand, a playback RF signal generated by a playback head 121 from the magnetic tape 130 is amplified by a playback amplifier 122 before being supplied to a first equalization circuit 124 by way of a rotary transformer 123 as shown in FIG. 66. In accordance with the DDS4 specifications, partial response class 1 (PR1) is embraced as a channel transfer characteristic. Thus, the transfer characteristic of the first equalization circuit 124 is adjusted so that the transfer characteristic from the recording amplifier 112 employed in the recording system 110 to the output of the first equalization circuit 124 in the playback system 120 becomes similar to a PR1 transfer characteristic shown in FIG. 67. A PLL circuit 125 extracts a channel clock signal from a signal output by the first equalization circuit 124. An ADC (Analog-to-Digital Converter) 126 driven by this channel clock signal samples detection-point voltages of the signal output by the first equalization circuit 124 as shown in FIG. 68.

Sampling data sampled by the ADC 126 is equalized by a second equalization circuit 127 with a higher degree of precision. After an equalization error has been minimized, the sampling data is converted into a binary signal by a viterbi decoder 128. The second equalization circuit 127 plays a role of compensating the first equalization circuit 124 for low precision of the first equalization circuit 124.

That is to say, in the playback system 120 of a tape streamer, the first equalization circuit 124 and the second equalization circuit 127, which are provided at stages respectively preceding and following the PLL circuit 125, carry out 2-stage equalization.

The binary signal produced by the viterbi decoder 128 is subjected to 10/8 conversion in a 10/8 converter 129 into output playback data.

The 10/8 conversion carried out by the 10/8 converter 129 employed in the playback system 120 is processing inverse to the 8/10 conversion carried out by the 8/10 converter 111 employed in the recording system 110.

In the playback system 120 employed in the tape streamer conforming to the DDS4 specifications, by the way, the first equalization circuit 124 employs an analog CR filter and the second equalization circuit 127 employs a digital transversal filter, which is controlled by an adaptive equalization circuit 127A. Provided at a stage preceding the ADC 126, the first equalization circuit 124 processes an analog signal. Thus, the analog CR filter is appropriate for the first equalization circuit 124. Since the second equalization circuit 127 processes digital data, on the other hand, the digital transversal filter is desirable for the second equalization circuit 127.

The analog CR filter and the digital transversal filter have merits and demerits shown in Table 1.

TABLE 1

|  | Precision/freedom | Configuration | Place |
| --- | --- | --- | --- |
| Analog CR filter | Poor | Simple | Stage preceding ADC |
| Digital transversal filter | Good | Complex | Stage following ADC |

As described above, the 2-stage equalization is carried out by the first equalization circuit 124 and the second equalization circuit 127, which are provided at respectively 2 stages preceding and following the PLL circuit 125. In order to make the 2-stage equalization effective, the following precondition must be satisfied.

The SN ratio of a signal output by the first equalization circuit>the operation limit SN ratio of the PLL circuit 125.

That is to say, if the PLL circuit 125 does not operate normally, the second equalization circuit 127 does not operate normally either. Thus, the minimization of an equalization error by the second equalization circuit 127 can no longer be expected.

Typical cases in which the precondition described above is not satisfied are, for example:

Case 1) The equalization precision of the first equalization circuit 124 is low so that an eye pattern goes out of order.

Case 2) The magnitude of the playback signal is small so that the eye pattern goes out of order.

Case 1 is a case in which the playback frequency characteristic set at the factory has inevitably changed due to wear of the playback head 121 or dirt stuck on the playback head 121. Case 2 is a case in which the magnitude of the playback signal has decreased inevitably in the event of an off-track.

In either case, distinction is impossible by eye-pattern observation as shown in FIGS. 69 and 70.

In order to solve the problem of Case 1, there is devised an approach wherein the equalization error of the first equalization circuit 124 is minimized to assure the normal operation of the PLL circuit 125 so that, as a result, the normal operation of the second equalization circuit 127 is also assured to improve reliability.

In order to solve the problem of Case 2, basically, the off-track must be avoided even though minimization of the equalization error is also effective. This is because the eye-pattern confusion of the signal output by the first equalization circuit 124 is confusion caused by a noise and confusion caused by the equalization error. Thus, by providing an approach of minimizing the equalization error of the first equalization circuit 124, the amount of SN-ratio deterioration can be reduced even by a small playback signal so as to assure the normal operation of the PLL circuit 125. As a result, the normal operation of the second equalization circuit 127 is also assured so that the reliability is improved.

In the minimization of an equalization error of the first equalization circuit 124, however, the use of an analog CR filter causes low precision so that there is a limit.

In addition, if a digital transversal filter is used, there exists an algorithm called an LMS (Least Mean Squared) technique, which exhibits a good convergence characteristic. However, there is no excellent algorithm for automatically controlling the analog CR filter.

Furthermore, assume that a digital transversal filter 124C is employed in the first equalization circuit 124 as shown in FIG. 71. Since an analog signal input to the PLL circuit 125 is a precondition, it is necessary to carry out DAC (Digital-to-Analog Conversion) to generate an analog signal. In this case, the first equalization circuit 124 needs to employ also an LPF 124A, an ADC 124B, a DAC 124D and an LPF 124E in addition to the digital transversal filter 124C, raising the cost.

Moreover, a PLL circuit 125 inputting digital data can be employed as shown in FIG. 72. In this case, the ADC 124B and the digital transversal filter 124C must be operated at a sampling frequency equal to a multiple of the channel clock frequency. Typically, the sampling frequency is at least 10 times the channel clock frequency. This is because, as indicated by eye patterns computed for different sampling rates as shown in FIGS. 73 to 77, with a sampling rate equal to merely few times the channel clock frequency, a sampling data train will include no detection-point voltages.

FIG. 73 is a diagram showing a PR1-channel output typical eye pattern computed at an over-sampling rate 2 times the channel clock frequency.

FIG. 74 is a diagram showing a PR1-channel output typical eye pattern computed at an over-sampling rate 3 times the channel clock frequency.

FIG. 75 is a diagram showing a PR1-channel output typical eye pattern computed at an over-sampling rate 4 times the channel clock frequency.

FIG. 76 is a diagram showing a PR1-channel output typical eye pattern computed at an over-sampling rate 6 times the channel clock frequency.

FIG. 77 is a diagram showing a PR1-channel output typical eye pattern computed at an over-sampling rate 10 times the channel clock frequency.

Since they are each a result of simulation, a detection-point voltage is always included in 1 channel period. In the case of an actual playback waveform, however, a detection-point voltage is not always included in 1 channel period. For an over-sampling rate 10 times the channel clock frequency, a voltage in the vicinity of a detection point is included. In the case of an over-sampling rate 6 or fewer times the channel clock frequency, however, sampling points are too sparse, resulting in a big error.

It is thus necessary to increase the over-sampling rate. However, a high over-sampling rate raises a problem of a difficulty to implement a high-magnification-frequency clock circuit and a problem of rising power consumption.

In addition, with the contemporary technology wherein an analog filter is required at a stage preceding the PLL circuit 125, only the following 2 choices are available:
1. adoption of a 2-chip configuration comprising an analog IC and a digital IC 2. utilization of a BICMOS (BIpolar Complementary Metal Oxide Semiconductor) process to manufacture an analog-digital hybrid IC The 2-chip configuration entails a high cost and is thus not suitable for a small-size product. In addition, the amount of power consumed by the analog IC is large. On the other hand, the BICMOS process is also costly. In addition, there is also raised a problem that the design periods of both the analog and BICMOS processes are also longer than a CMOS digital IC.

SUMMARY OF THE INVENTION

It is thus an object of the present invention to solve the variety of problems raised by the conventional technology as described above.

To be more specific, it is an object of the present invention to provide a signal-processing circuit capable of minimizing an equalization error of a first equalization circuit by providing the first equalization circuit at a stage preceding a PLL circuit and a second equalization circuit at a stage following the PLL circuit as 2 means for carrying out 2-stage equalization.

It is another object of the present invention to provide a signal-processing circuit allowing adaptive equalization to be carried out by a first equalization circuit by providing the first equalization circuit at a stage preceding a PLL circuit and a second equalization circuit at a stage following the PLL circuit as 2 means for carrying out 2-stage equalization.

It is a further object of the present invention to provide a signal-processing circuit easy to be manufactured and capable of reducing power consumption by employment of a digital transversal filter and elimination of an analog circuit and to provide a recording and playback apparatus employing the signal-processing circuit.

In order to attain the objects described above, according to a first aspect of the present invention, there is provided a signal-processing circuit including:

a phase locked loop circuit for receiving playback data obtained as a result of analog-to-digital conversion of a playback signal from a first equalization circuit;

wherein the first equalization circuit is composed of a transversal filter.

According to a second aspect of the present invention, there is provided a signal-processing circuit including:

an analog-to-digital converter for sampling a playback signal to convert the playback signal into a digital signal; and a digital phase locked loop circuit for receiving the digital signal from the analog-to-digital converter;

wherein the digital signal output by the analog-to-digital converter is supplied to the digital phase locked loop circuit so as to fetch a detection-point voltage.

According to a third aspect of the present invention, there is provided a recording and playback apparatus having a recording system and a playback system each employing a signal-processing circuit, the signal-processing circuit employed in the playback system including:

a first equalization circuit;

a phase locked loop circuit for receiving playback data obtained as a result of analog-to-digital conversion of a playback signal from the first equalization circuit; and a second equalization circuit provided on the downstream side from the phase locked loop circuit;

wherein each of the first and second equalization circuits is composed of a transversal filter;

a sampling frequency of the first equalization circuit is set at a value approximately equal to a channel clock frequency;

a next time transfer characteristic of the first equalization circuit is made equal to a product of a present time transfer characteristic of the first equalization circuit and a present time transfer characteristic of the second equalization circuit; and a next time transfer characteristic of the second equalization circuit is flattened.

According to a fourth aspect of the present invention, there is provided a recording and playback apparatus including a recording system and a playback system each employing a signal-processing circuit, the signal-processing circuit employed in the playback system including:

an analog-to-digital converter for sampling a playback signal to convert the playback signal into a digital signal;

a digital phase locked loop circuit for receiving the digital signal from the analog-to-digital converter;

a first equalization circuit composed of a digital transversal filter, the first equalization circuit being provided between the analog-to-digital converter and the phase locked loop circuit; and an interpolation circuit for interpolating sparse pieces of sampling data with a period close to a channel clock period, the interpolation circuit being provided between the first equalization circuit and the digital phase locked loop circuit;

wherein the interpolation circuit includes a Q-times linear interpolation circuit and an R-times interpolation circuit composed of transversal filters of the number of R.

a sampling frequency of the ADC is set at a value approximately equal to a channel clock frequency; and the digital signal output by the analog-to-digital converter is supplied to the digital phase locked loop circuit so as to fetch a detection point voltage.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 4A to 4C are diagrams showing models of the operation of 4-times interpolation carried out by the 4-times interpolation circuit;

FIG. 6 is time charts representing the operation of a 3-zeros-inserting circuit employed in the 4-times interpolation circuit;

FIGS. 30A and 30B are diagrams showing models of a storing detection-point data into memory banks;

FIG. 70 is a diagram showing an eye pattern for a case in which the magnitude of a playback signal inevitably decreases in the event of an off-track;

PREFERRED EMBODIMENTS OF THE INVENTION

Some preferred embodiments of the present invention are explained in detail by referring to accompanying diagrams as follows.

Figure 1:
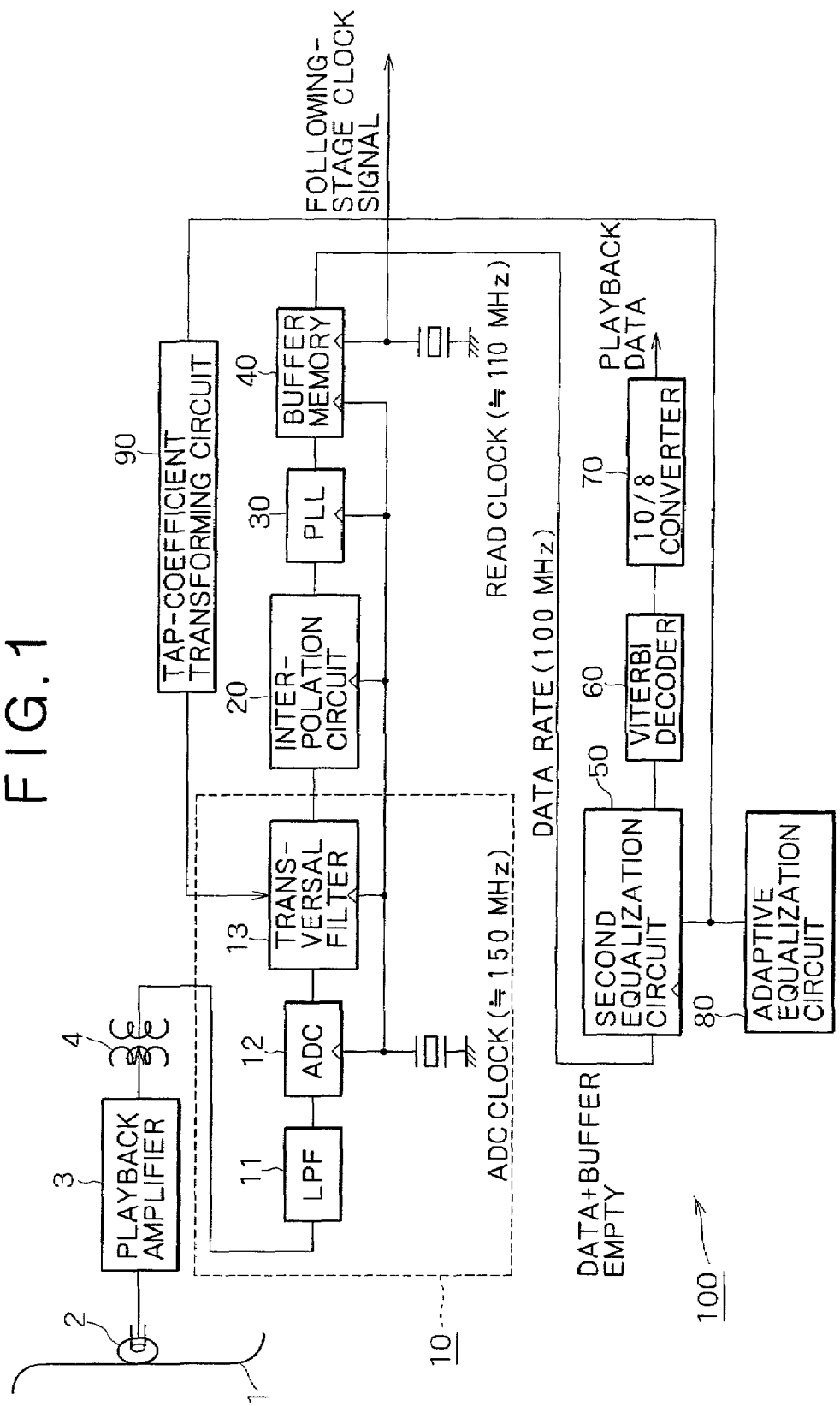
FIG. 1 is a block diagram showing the configuration of a playback system of a tape streamer conforming to the DDS (Digital Data Storage)-4 specifications as provided by the present invention.

FIG. 1 is a block diagram showing the configuration of a playback system 100 of a tape streamer conforming to the DDS (Digital Data Storage)-4 specifications as provided by the present invention.

As shown in the figure, in the playback system 100 of the tape streamer, a playback RF signal generated by a playback head 2 from a magnetic tape 1 is amplified by a playback amplifier 3 and then supplied to a first equalization circuit 10 by way of a rotary transformer 4.

The first equalization circuit 10 includes an LPF (Low Pass Filter) 11 and an ADC (Analog-to-Digital Converter) 12 and a transversal filter 13. The ADC 12 samples the playback RF signal supplied to the ADC 12 by way of the LPF 11 synchronously with an ADC clock signal, converting the playback RF signal into digital data, which is then supplied to the transversal filter 13.

In addition, the playback system 100 of the tape streamer also includes an interpolation circuit 20, a PLL circuit 30, a buffer memory 40, a second equalization circuit 50, a viterbi decoder 60 and a 10/8 converter 70. The interpolation circuit 20 receives a signal generated by the first equalization circuit 10 and outputs a signal to the PLL circuit 30. A signal output by the PLL circuit 30 is supplied to the buffer memory 40. A signal is read out from the buffer memory 40 and supplied to a transversal filter employed in the second equalization circuit 50, which outputs a signal to the viterbi decoder 60. A signal produced by the viterbi decoder 60 is supplied to the 10/8 converter 70.

The playback system 100 further has an adaptive equalization circuit 80 and a tap-coefficient-transforming circuit 90. The adaptive equalization circuit 80 provides the second equalization circuit 50 with a tap coefficient used for automatically minimizing an equalization error of the second equalization circuit 50. The tap-coefficient-transforming circuit 90 transforms the tap coefficient output by the adaptive equalization circuit 80 to the second equalization circuit 50 into a tap coefficient suitable for the first equalization circuit 10.

In the playback system 100 of the tape streamer, the LPF 11 functions as an anti-aliasing filter and can be designed as a simple analog circuit.

The ADC clock signal is a clock signal supplied to components ranging from the ADC 12 to the buffer memory 40. The ADC clock signal has a frequency 1 to 2 times that of a channel clock signal.

The transversal filter 13 employed in the first equalization circuit 10 is capable of implementing equalization with a higher degree of precision than an analog CR filter.

The interpolation circuit 20 interpolates low-magnification-frequency sample data supplied by the first equalization circuit 10 to the interpolation circuit 20 and outputs high-magnification-frequency sample data to the PLL circuit 30.

The PLL circuit 30 finds a detection-point voltage for the high-magnification-frequency sample data supplied by the interpolation circuit 20 and supplies the detection-point voltage to the buffer memory 40.

The buffer memory 40 functions as a buffer for absorbing a difference in frequency between the ADC clock signal and a following-stage clock signal. To put it in detail, data output by the PLL circuit 30 is written into the buffer memory 40 synchronously with the ADC clock signal but read out from the buffer memory 40 synchronously with the following-stage clock signal also referred to hereafter as a read clock signal.

The transversal filter employed in the second equalization circuit 50 operates to automatically minimize an equalization error in conjunction with the adaptive equalization circuit 80.

The viterbi decoder 60 converts the sample data output by the second equalization circuit 50 into a binary signal having only 2 values, namely, 1 and 0.

The 10/8-converter 70 carries out 10/8 conversion on the binary signal generated by the viterbi decoder 60, and outputs a result of the 10/8 conversion as playback data.

In the playback system 100 of the tape streamer having this configuration, by employing the transversal filter 13 in the first equalization circuit 10, the degree of equalization freedom can be increased and the equalization error can be minimized.

In the playback system 100 of the tape streamer, the playback head 2 slides along the magnetic tape 1. Thus, the playback head 2 becomes dirty instantaneously or permanently and inevitably changes the playback frequency response in some cases. When the playback head 2 becomes dirty, the distance between the magnetic tape 1 and the playback head 2 becomes longer, causing a spacing loss, which lowers the small-wavelength sensitivity.

In the playback system 100 of the tape streamer, by implementing adaptive equalization as described above, an equalization error can be minimized dynamically even for such a case.

It should be noted that, since the transfer characteristic of the second equalization circuit 50 is an equalization-error characteristic of the first equalization circuit 10, a transfer function required for the first equalization circuit 10 can be computed from the transfer characteristic of the second equalization circuit 50. By making the transfer characteristic of the first equalization circuit 10 equal to the transfer characteristic of the second equalization circuit 50, adaptive equalization of the first equalization circuit 10 can be implemented. A tap coefficient of the digital transfer filter exists in the circuit and can be subjected to Fourier transformation to find the transfer characteristic with ease.

In addition, in the playback system 100 of the tape streamer, sparse low-magnification-frequency pieces of sample data with a period close to the channel period are subjected to interpolation in signal processing carried out by the interpolation circuit 20 provided at a stage preceding the PLL circuit 30 to generate a data train with a frequency corresponding to high-magnification-frequency sampling inside the circuit. In this way, a high-speed ADC 12 is not required.

Since the interpolation circuit 20 produces a digital-data train with a frequency corresponding to high-magnification-frequency sampling, the PLL circuit 30 is capable of extracting detection-point data by carrying out digital signal processing on this data train.

Figure 2:
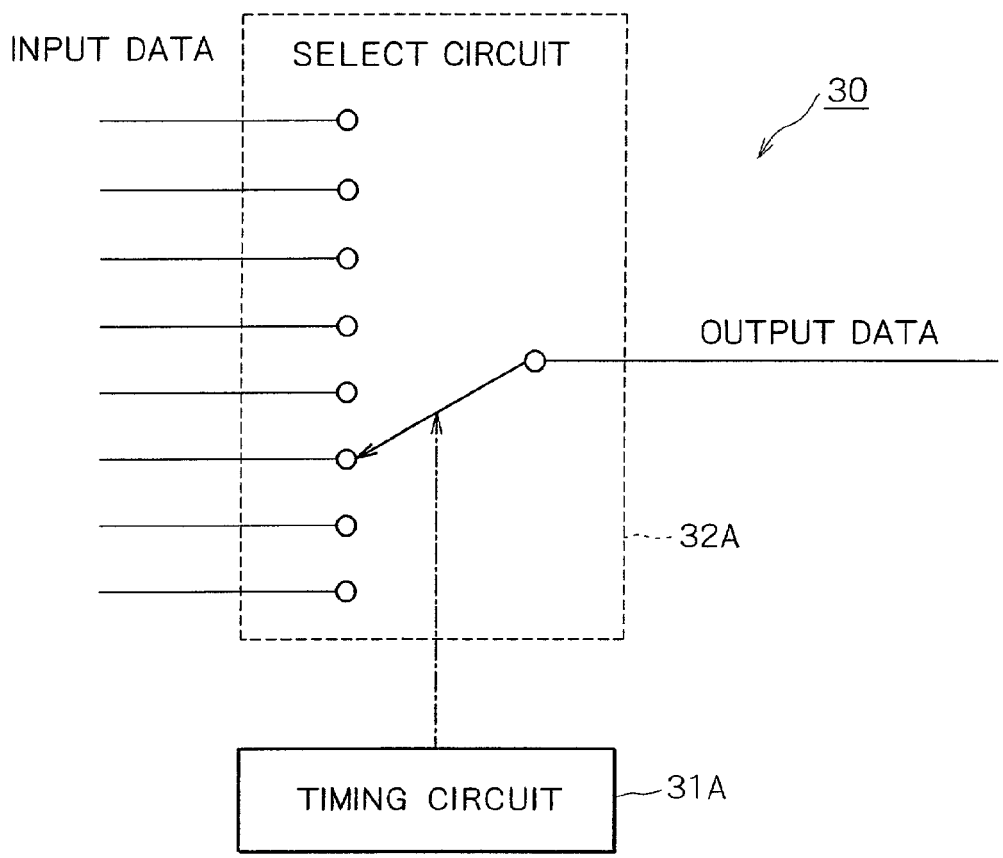
FIG. 2 is a block diagram showing the principle of a PLL circuit employed in the playback system of a tape streamer.

The principle of the PLL circuit 30 is shown in FIG. 2. As shown in the figure, the PLL circuit 30 includes a select circuit 32A controlled by a timing circuit 31A based on an ADC clock signal.

In addition, in the playback system 100 of the tape streamer, the playback RF signal is subjected directly to AD conversion carried out by the first equalization circuit 10. Thus, an analog circuit is not required. The anti-aliasing LPF 11 can be implemented as a simple analog circuit.

Next, the interpolation circuit 20 employed in the playback system 100 of the tape streamer is explained in concrete terms.

It should be noted that an interpolation algorithm is based on a technology adopted by an audio sampling rate converter.

Figure 3:
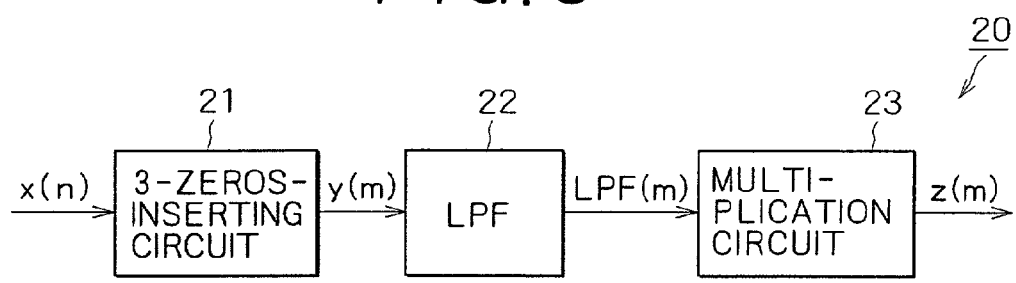
FIG. 3 is a block diagram showing the configuration of an interpolation circuit employed in the playback system of a tape streamer.

A configuration of the interpolation circuit 20 adopting a 4-times interpolation algorithm is shown in FIG. 3. As shown in FIG. 3, the interpolation circuit 20 includes a 3-zeros-inserting circuit 21, a low-pass filter (LPF) 22 and a multiplication circuit 23. The 3-zeros-inserting circuit 21 inserts a sequence of 3 zeros into an input signal train x(n) to generate a 4-times interpolated signal train y(m).

As an example, consider an input signal train x(n) comprising pieces of sample data at positions each indicated by a mark ○ in FIG. 4A. The input signal train x(n) is expressed as follows:

x(n)=( . . . , −1, 0, 1, 1, . . . )

Sequences each consisting of 3 zeros each represented by a mark ● are inserted into the input signal train x(n) to generate a 4-times interpolated signal train y(m) as shown in FIG. 4B. The 4-times interpolated signal train y(m) is expressed as follows:

y(m)=( . . . , −1, 0, 0, 0, 0, 1, 0, 0, 0, 1, 0, 0, 0, . . . )

In the LPF 22 at the next stage, the 4-times interpolated signal train y(m) generated by the 3-zeros-inserting circuit 21 is averaged.

An LPF output signal train input to the multiplication circuit 23 at the last stage is the averaged 4-times interpolated signal train y(m) including 3-zero sequences. Thus, the signal input to the multiplication circuit 23 has an amplitude equal to ¼ of the amplitude of the input signal train x(n). The amplitude of the averaged 4-times interpolated signal train y(m) is multiplied by 4 to generate an output signal train z(m) with an amplitude equal to the original amplitude as shown in FIG. 4C.

In the processing carried out by the interpolation circuit 20 having such a configuration, assume that the input signal train x(n) has 10 pieces of sample data, that is, $0 \leq n \leq 9$. In this case, the generated output signal train z(m) has 40 pieces of data, that is, $0 \leq m \leq 39$.

It should be noted that, in order to implement R-time interpolation by using the interpolation circuit 20, the 3-zeros-inserting circuit 21 needs to insert (R−1)-zero sequences.

Figure 5:
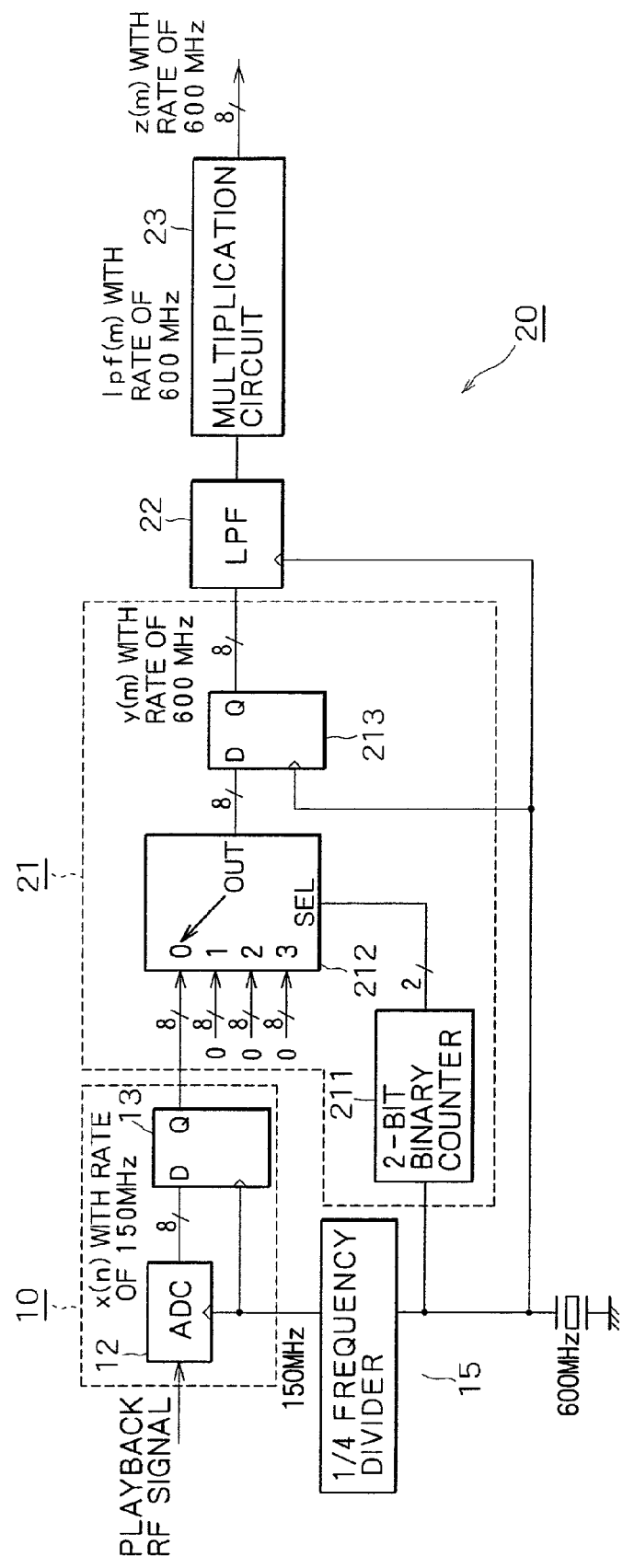
FIG. 5 is a block diagram showing a typical concrete configuration of the 4-times interpolation circuit.

Next, a typical interpolation circuit 20 for carrying out 4-times interpolation is explained by referring to FIG. 5.

As shown in FIG. 5, the interpolation circuit 20 includes a 3-zeros-inserting circuit 21 which receives an input signal train x(n) from the transversal filter 13 employed in the first equalization circuit 10. The input signal train is digital data produced by the ADC 12 also employed in the first equalization circuit 10 as a result of analog-to-digital conversion carried out on a playback RF signal supplied to the first equalization circuit 10. The ADC 12 operates synchronously with an ADC clock signal having a frequency of 150 MHz produced by a ¼ frequency divider 15 for dividing a master oscillation signal's frequency of 600 MHz. Each piece of sample data in the input signal train consists of 8 bits.

It should be noted that the transversal filter 13 employed in the first equalization circuit 10 is shown as an 8-bit register.

The 3-zeros-inserting circuit 21 includes a 2-bit binary counter 211, a data selector 212 and an 8-bit latch circuit 213. The 2-bit binary counter 211 counts the number of pulses included in the master oscillation signal having a frequency of 600 MHz and outputs a 2-bit count to the data selector 212 in order to control the data selector 212, which is used for selecting one of four inputs as an 8-bit output. The 8-bit output of the data selector 212 is latched in the latch circuit 213 synchronously with the master oscillation signal having the frequency of 600 MHz to be eventually output to the LPF 22 provided at the following stage.

The LPF 22 employs a transversal filter whereas the multiplication circuit 23 employs a 2-bit shift circuit.

The data selector 212 employed in the 3-zeros-inserting circuit 21 has selector input terminal 0 for receiving the input signal train x(n) and selector input terminals 1 to 3 each used for receiving zeros. The data selector 212 sequentially switches the input among selector input terminals 0 to 3 one terminal to another at the clock-signal frequency of 600 MHz. As a result, an output data train y(m) including 3-zero sequences is generated at a frequency of 600 MHz as shown in FIG. 6.

Next, an interpolation algorithm adopted in the interpolation circuit 20 is explained.

An input signal train x(n) where n=0 to 9 is subjected to Fourier transformation to produce a data train X(w) in accordance with the following equation.

$$X(w) = \sum_{n=0}^{9} x(n) \cdot e^{-j2\pi nw/10} \text{ where } 0 \leq w \leq 9 \quad (1)$$

In the interpolation circuit 20 for carrying out 4-times interpolation, 3 zeros are inserted for each piece of data x(n) Thus, the output signal train y(m) obtained as a result of the 4-times interpolation can be expressed as follows:

$$y(m) = \begin{pmatrix} x(n) & m = 4n \\ 0 & m \neq 4n \end{pmatrix} \quad (2)$$

The output signal train y(m) obtained as a result of the 4-times interpolation is subjected to Fourier transformation as follows:

$$Y(w) = \sum_{m=0}^{39} y(m) \cdot e^{-j2\pi mw/40} \text{ where } 0 \leq w \leq 39 \quad (3)$$

As indicated by Eq. (2), the term of the summation Σ of Eq. (1) is equal to x(n), which is a non-zero, only for m=4n. Substitution of x(n) and 4n to Eq. (3) for y(m) and m respectively yields the following equation for $0 \leq n \leq 9$:

$$Y(w) = \sum_{4n=0}^{39} x(n) \cdot e^{-j2\pi 4nw/40} \text{ where } 0 \leq w \leq 39 \quad (4)$$

Eq. (5) below can be derived by simplification of the expression on the right side of Eq. (4).

$$Y(w) = \sum_{n=0}^{9} x(n) \cdot e^{-j2\pi nw/10} \text{ where } 0 \leq w \leq 39 \quad (5)$$

Figure 7A:
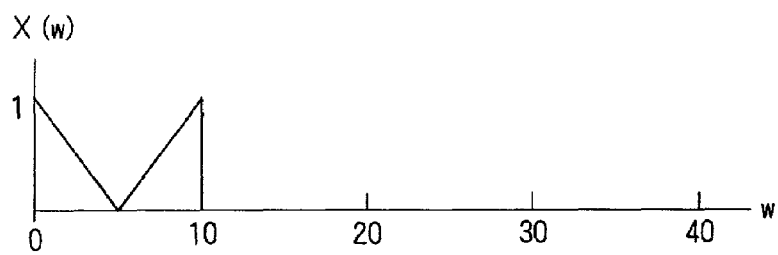
FIGS. 7A to 7E are diagrams showing a variety of frequency spectra observed in the operation of 4-times interpolation carried out by the 4-times interpolation circuit.
Figure 7B:
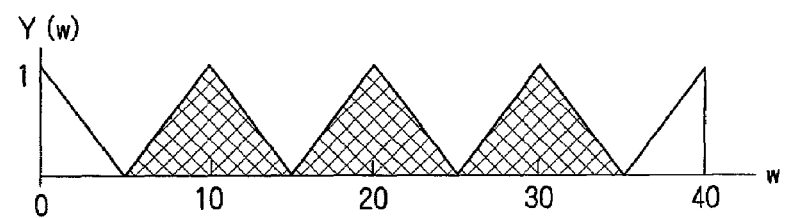
Figure 7C:
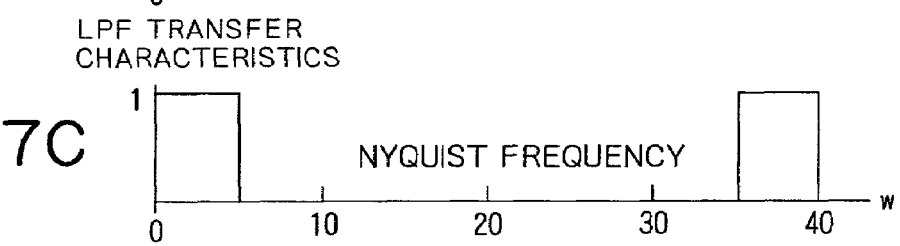
Figure 7D:
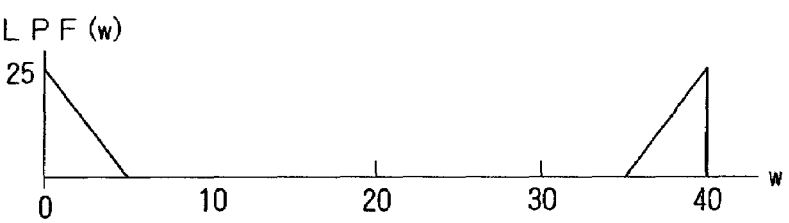
Figure 7E:
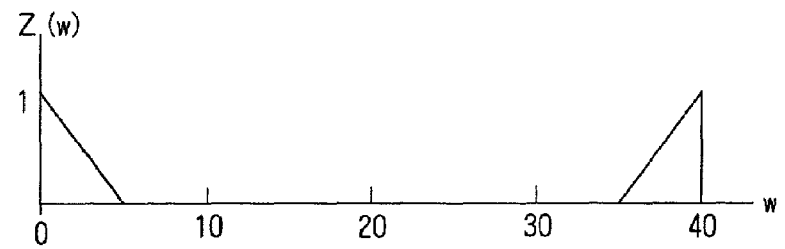

The value of the expression on the right side of Eq. (5) is equal to X(w). By the way, X(w) has a periodical waveform shown in FIG. 7A. As shown in the figure, the waveform has a period of 10. As shown in FIG. 7B, Y(w) is frequency spectra obtained by repetition of X(w) 4 times. Since a hatched spectrum is an image component resulting from zero interpolation, only spectrums at the right and left ends can be left by an LPF with a characteristic of abrupt attenuation at ¼ of the Nyquist frequency as shown in FIG. 7C. The spectrums LPF(w), which are obtained as a result of the 4-times interpolation and remain at the right and left ends, are shown in FIG. 7D. Since 3-zero sequences are inserted, the amplitude is reduced to ¼. The amplitude is multiplied by 4 to generate the output signal train Z(w) having the original amplitude as shown in FIG. 7E.

The digital transversal filter employed in the LPF 32 can be provided with an impulse response used for determining a tap coefficient. The impulse response is obtained as a result of inverse Fourier transformation of a desired transfer characteristic.

Figure 8:
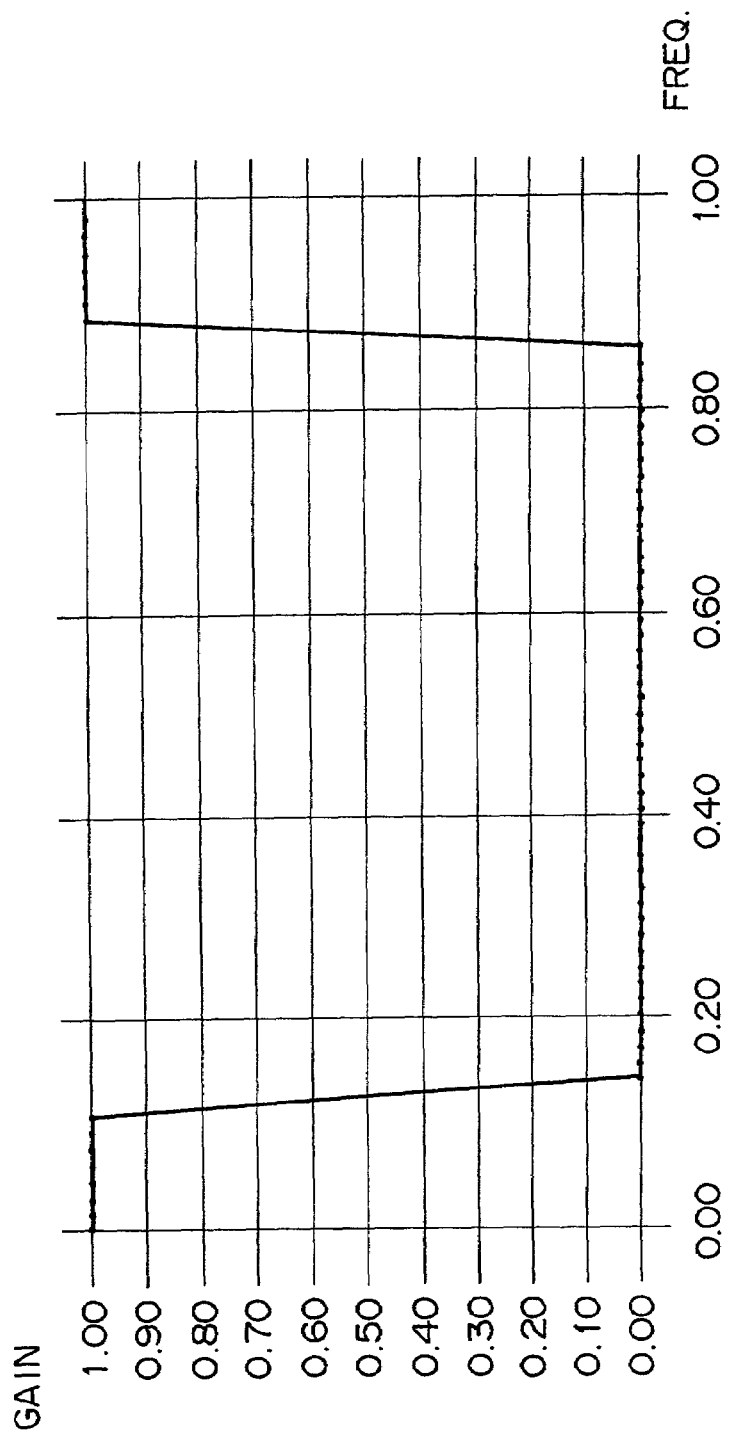
FIG. 8 is a diagram showing typical transfer characteristics required for a 4-times interpolation filter.

FIG. 8 is a diagram showing typical transfer characteristics required for a 4-times interpolation filter.

In the transfer characteristics shown in FIG. 8, a point with a gain of 0.5 is provided on a boundary between a passing region and an attenuating region. Consideration is given so as to make the side lobe of an impulse response converge to a zero fast. Such consideration is given in order to provide a 4-times interpolation filter having as a small number of taps as possible.

Figure 9:
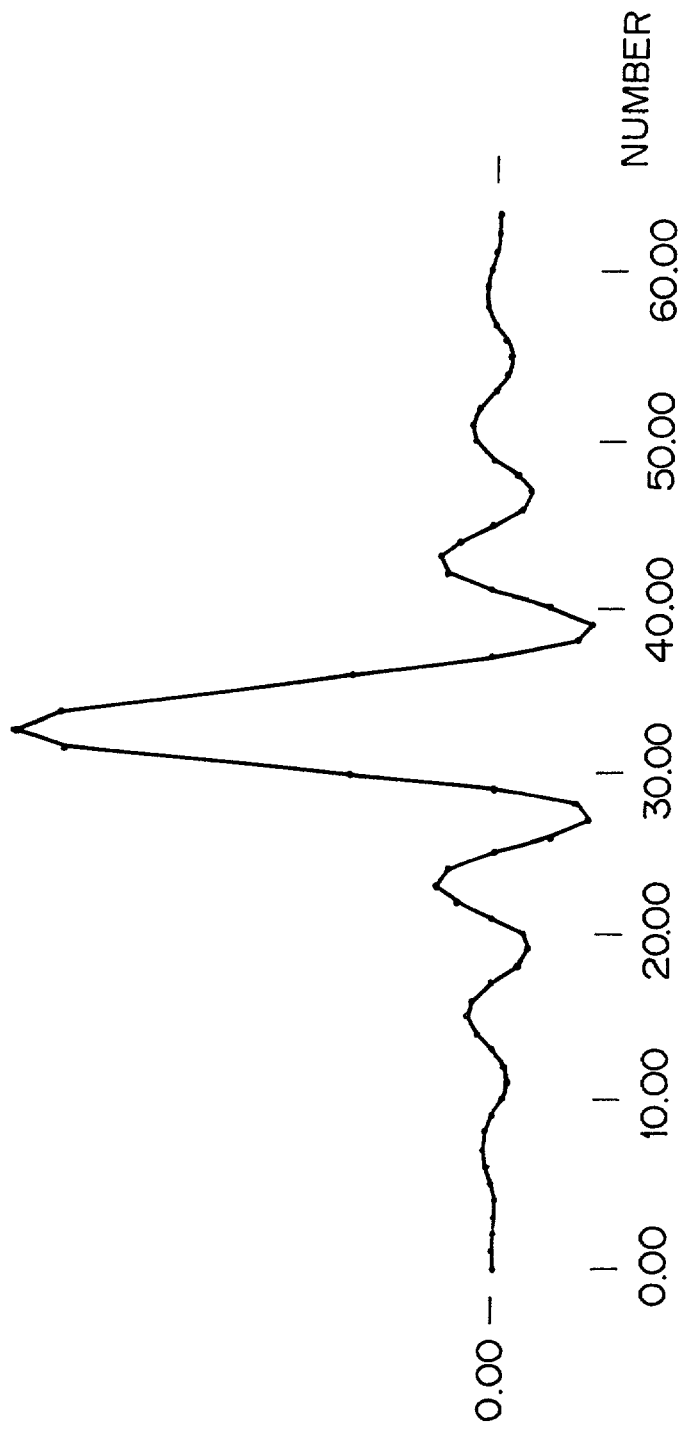
FIG. 9 is a diagram showing a result of ending an impulse response obtained as a result of inverse Fourier transformation at 64 points.

FIG. 9 is a diagram showing a result of ending an impulse response obtained as a result of inverse Fourier transformation at 64 points. By using this response as a tap coefficient of a 64-taps transversal filter, an LPF can be implemented.

As is obvious from the timing charts shown in FIG. 6, the data rate of the input signal train x(n) is 150 MHz and the data rate of the output signal train z(m) is 600 MHz. Thus, by carrying out R-time interpolation, the output signal train z(m) has a data rate R times the data rate of the input signal train x(n).

In order to leave the clock frequency at 150 MHz as it is, four 16-taps transversal filters thinning the input signal train x(n) at every fourth tap are employed. The four 16-taps transversal filters output pieces of 4-times interpolation data in parallel to give the same effect.

Figure 10A:
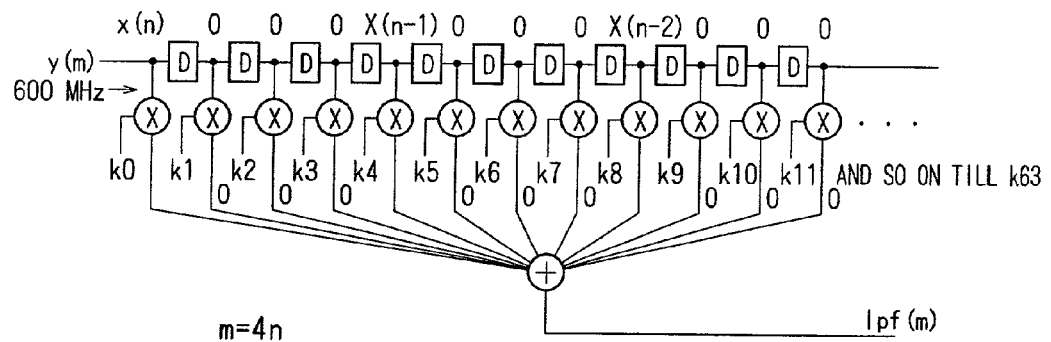
FIGS. 10A to 10C are diagrams each showing a state in which a sum-of-products circuit inputting coefficients k0, k4, k8, k12 and so on (that is, coefficients km where m=4n and n=0, 1, 2, 3 and so on) generates a non-zero output when an LPF operating at 600 MHz is observed at a time m.
Figure 10B:
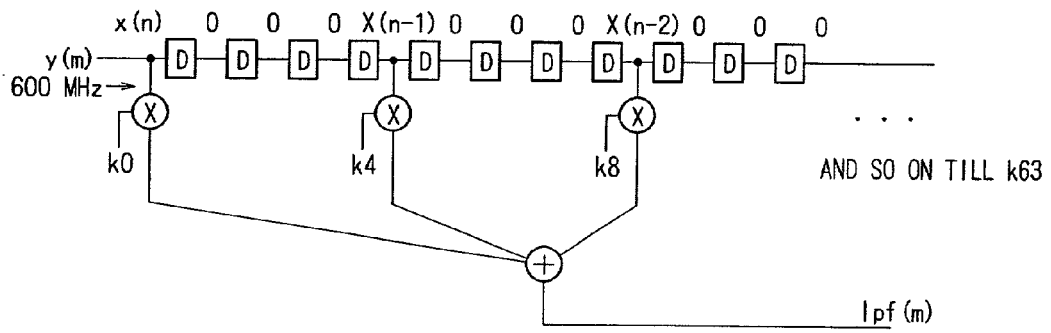
Figure 10C:
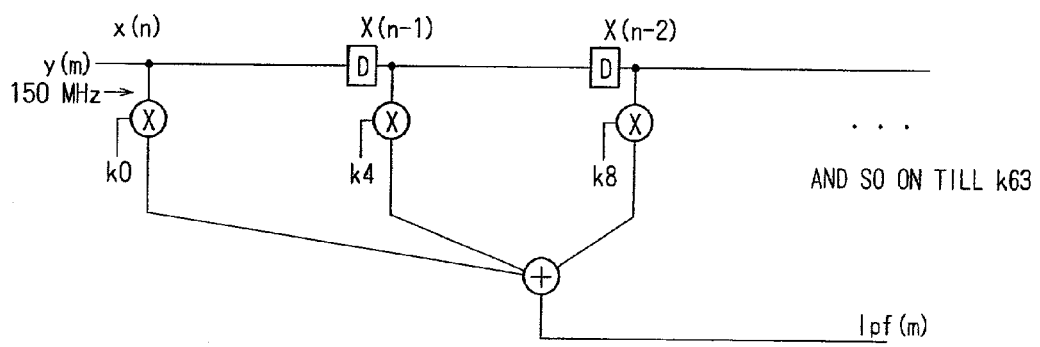

To put it in detail, FIG. 10A shows the operation of an LPF at a frequency of 600 MHz as a result of observation along the time axis. Since a data train y(m) obtained as a result of inserting 3-zero sequences into the input signal train x(n) is supplied to the LPF, three of 4 bits of a shift register must each be a zero. Thus, the sum-of-products circuit used for inserting zeros as shown in FIG. 10A is not required as shown in FIG. 10B. A circuit shown in FIG. 10C is also capable of generating a correct output. As shown in FIG. 10C, a shift register for generating zeros is further eliminated from the circuit shown in FIG. 10B so that no zeros are inserted into the input signal train x(n). In this configuration, the clock frequency can be lowered to 150 MHz.

By having the configuration described above by referring to FIG. 10C, the transversal filter thins the input signal train x(n) at every fourth tap to reduce the number of taps to ¼. In addition, the shift register is eliminated so that the clock frequency can be kept at 150 MHz as it is.

Figure 11A:
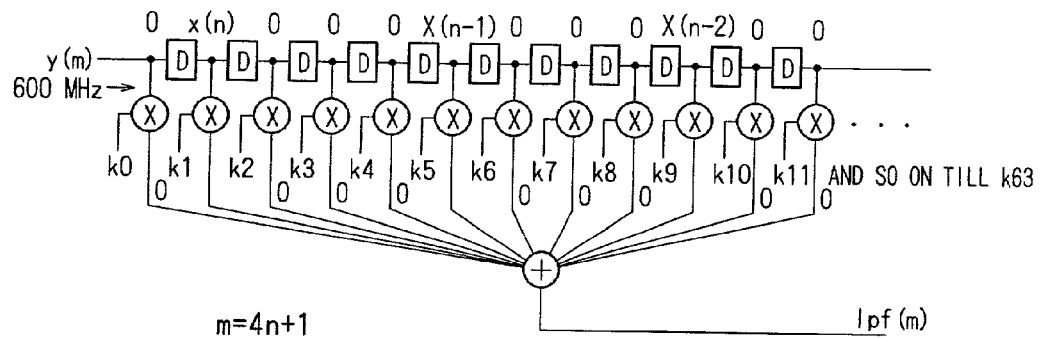
FIGS. 11A to 11C are diagrams each showing a state in which a sum-of-products circuit inputting coefficients k1, k5, k9, k13 and so on (that is, coefficients km where m=4n+1 and n=0, 1, 2, 3 and so on) generates a non-zero output when an LPF operating at 600 MHz is observed at a time m.
Figure 11B:
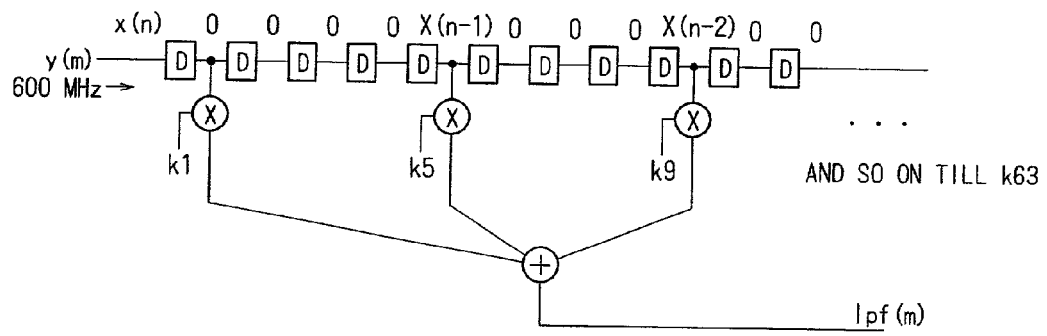
Figure 11C:
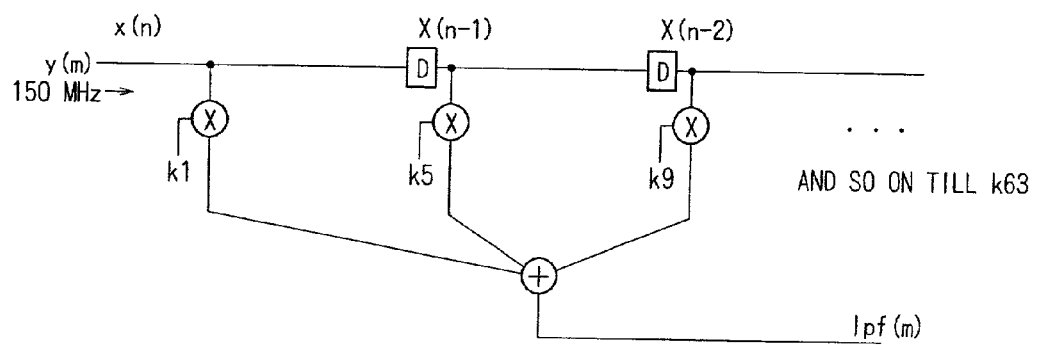
Figure 12A:
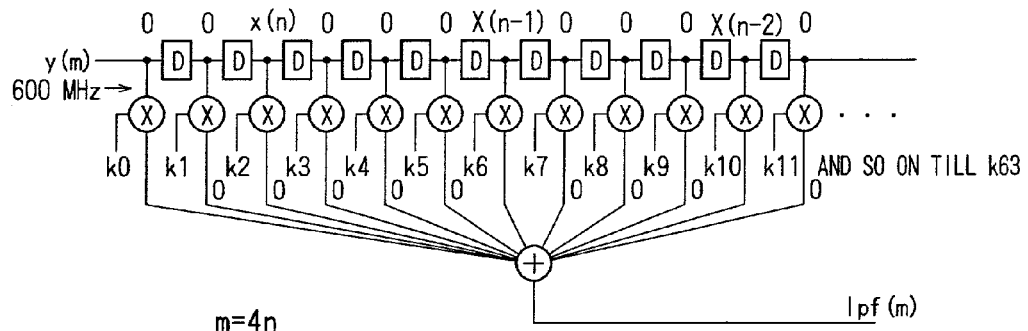
FIGS. 12A to 12C are diagrams each showing a state in which a sum-of-products circuit inputting coefficients k2, k6, k10, k14 and so on (that is, coefficients km where m=4n+2 and n=0, 1, 2, 3 and so on) generates a non-zero output when an LPF operating at 600 MHz is observed at a time m.
Figure 12B:
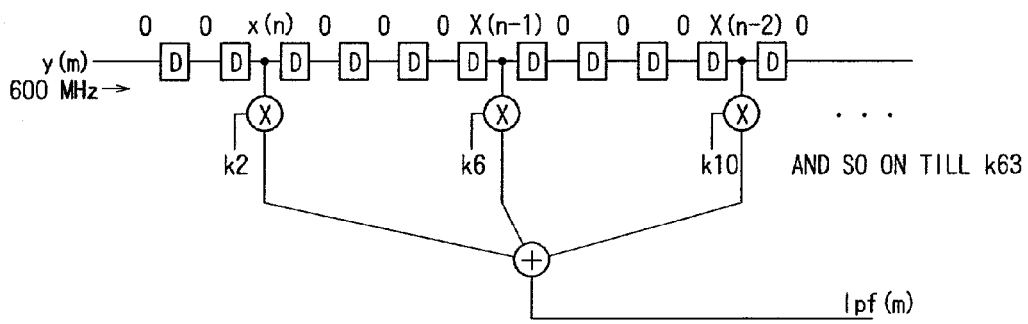
Figure 12C:
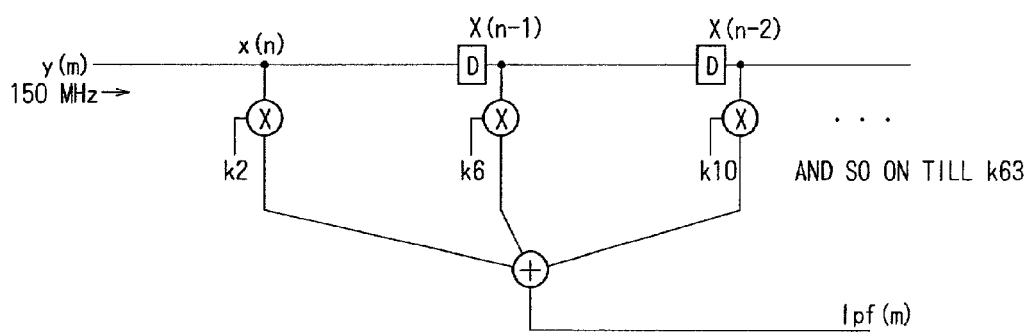
Figure 13A:
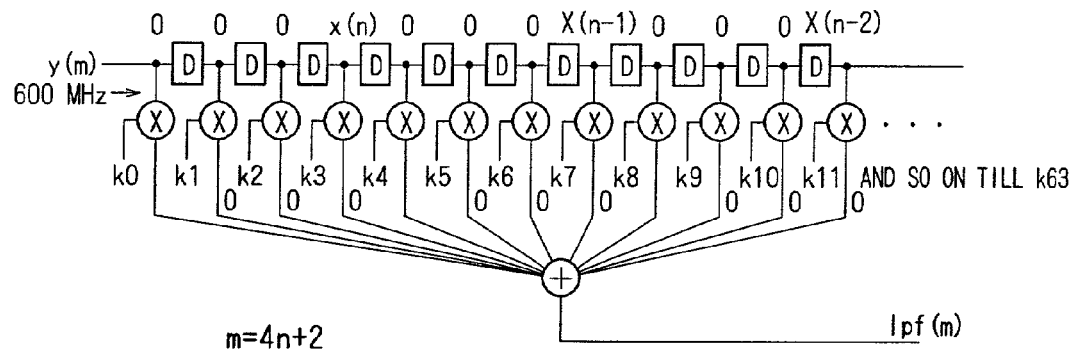
FIGS. 13A to 13C are diagrams each showing a state in which a sum-of-products circuit inputting coefficients k3, k7, k11, k15 and so on (that is, coefficients km where m=4n+3 and n=0, 1, 2, 3 and so on) generates a non-zero output when an LPF operating at 600 MHz is observed at a time m.
Figure 13B:
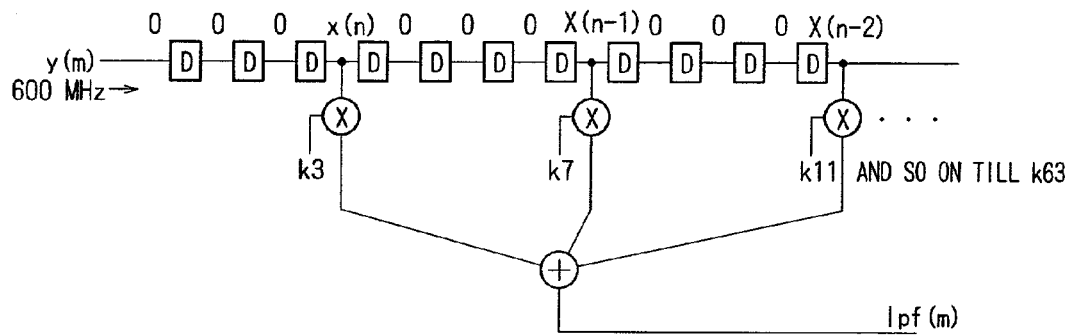
Figure 13C:
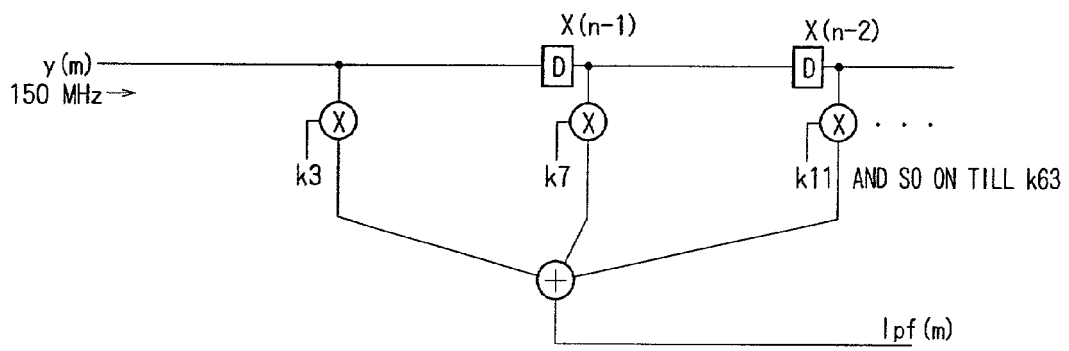

In the configurations shown in FIG. 10, a sum-of-products circuit for coefficients k0, k4, k8 and k12 is sufficient. Nevertheless, there are a total of four non-zero patterns of the sum-of-products circuit which are each determined by a set of non-zero coefficients. The patterns are:

1) A sum-of-products circuit for coefficients k0, k4, k8, k12 and so on at m=4n as shown in FIG. 10.
2) A sum-of-products circuit for coefficients k1, k5, k9, k13 and so on at m=4n−1 as shown in FIG. 11.
3) A sum-of-products circuit for coefficients k2, k6, k10, k14 and so on at m=4n−2 as shown in FIG. 12.
4) A sum-of-products circuit for coefficients k3, k7, k11, k15 and so on at m=4n−3 as shown in FIG. 13, where notation m denotes a point of time of the interpolation output signal.

The output lpf(m) of a 64-taps transversal filter shown in FIG. 10A is represented by a sum-of-products expression as follows:

$$lpf(m) = \sum_{a=0}^{63} y(m-a) \times k(a) \qquad (6)$$
$$= y(m)k(0) + y(m-1)k(1) + y(m-2)k(2) + y(m-3)k(3)$$

1) For m=4n $$y(m-4b)=x(n-b)$$

where notation b denotes an integer. Otherwise, y=0. Thus, $$lpf(m) = y(m)*k(0) + y(m-4)*k(4) + y(m-8)*k(8) + \qquad (7)$$
$$y(m-12)*k(12) \ldots + y(m-60)*k(60)$$
$$lpf(m) = \sum_{b=0}^{15} y(m-4b) \times k(4b) = \sum_{b=0}^{15} x(n-b) \times k(4b)$$

The right factor of each term of the summation Σ is a tap coefficient starting with k0 for thinning the input signal train x(n) at every fourth tap. This summation is equalization to an operation to supply the input signal train x(n) to the 16-taps transversal filter shown in FIG. 10B or 10C.

2) For m=4n+1

$$y(m-1-4b)=x(n-b).$$

Otherwise, y=0.
Thus, $$lpf(m) = y(m-1)*k(1) + y(m-5)*k(5) + y(m-9)*k(9) + \qquad (8)$$
$$y(m-13)*k(13) \ldots + y(m-61)*k(61)$$
$$lpf(m) = \sum_{b=0}^{15} y(m-1-4b) \times k(4b+1)$$
$$= \sum_{b=0}^{15} x(n-b) \times k(4b+1)$$

The right factor of each term of the summation Σ is a tap coefficient starting with k1 for thinning the input signal train x(n) at every fourth tap. This summation is equalization to an operation to supply the input signal train x(n) to the 16-taps transversal filter shown in FIG. 11B or 11C.

3) For m=4n+2

$$y(m-2-4b)=x(n-b).$$

Otherwise, y=0.
Thus, $$lpf(m) = y(m-2)*k(2) + y(m-6)*k(6) + y(m-10)*k(10) + \quad (9)$$
$$y(m-14)*k(14)\ldots + y(m-62)*k(62)$$

$$lpf(m) = \sum_{b=0}^{15} y(m-2-4b) \times k(4b+2)$$

$$= \sum_{b=0}^{15} x(n-b) \times k(4b+2)$$

The right factor of each term of the summation Σ is a tap coefficient starting with k2 for thinning the input signal train x(n) at every fourth tap. This summation is equalization to an operation to supply the input signal train x(n) to the 16-taps transversal filter shown in FIG. 12B or 12C.

4) For m=4n+3

$$y(m-3-4b)=x(n-b).$$

Otherwise, y=0.

$$lpf(m) = y(m-3)*k(3) + y(m-7)*k(7) + y(m-11)*k(11) + \quad (10)$$
$$y(m-15)*k(15)\ldots + y(m-63)*k(63)$$

$$lpf(m) = \sum_{b=0}^{15} y(m-3-4b) \times k(4b+3)$$

$$= \sum_{b=0}^{15} x(n-b) \times k(4b+3)$$

The right factor of each term of the summation Σ is a tap coefficient starting with k3 for thinning the input signal train x(n) at every fourth tap. This summation is equalization to an operation to supply the input signal train x(n) to the 16-taps transversal filter shown in FIG. 13B or 13C.

Figure 14:
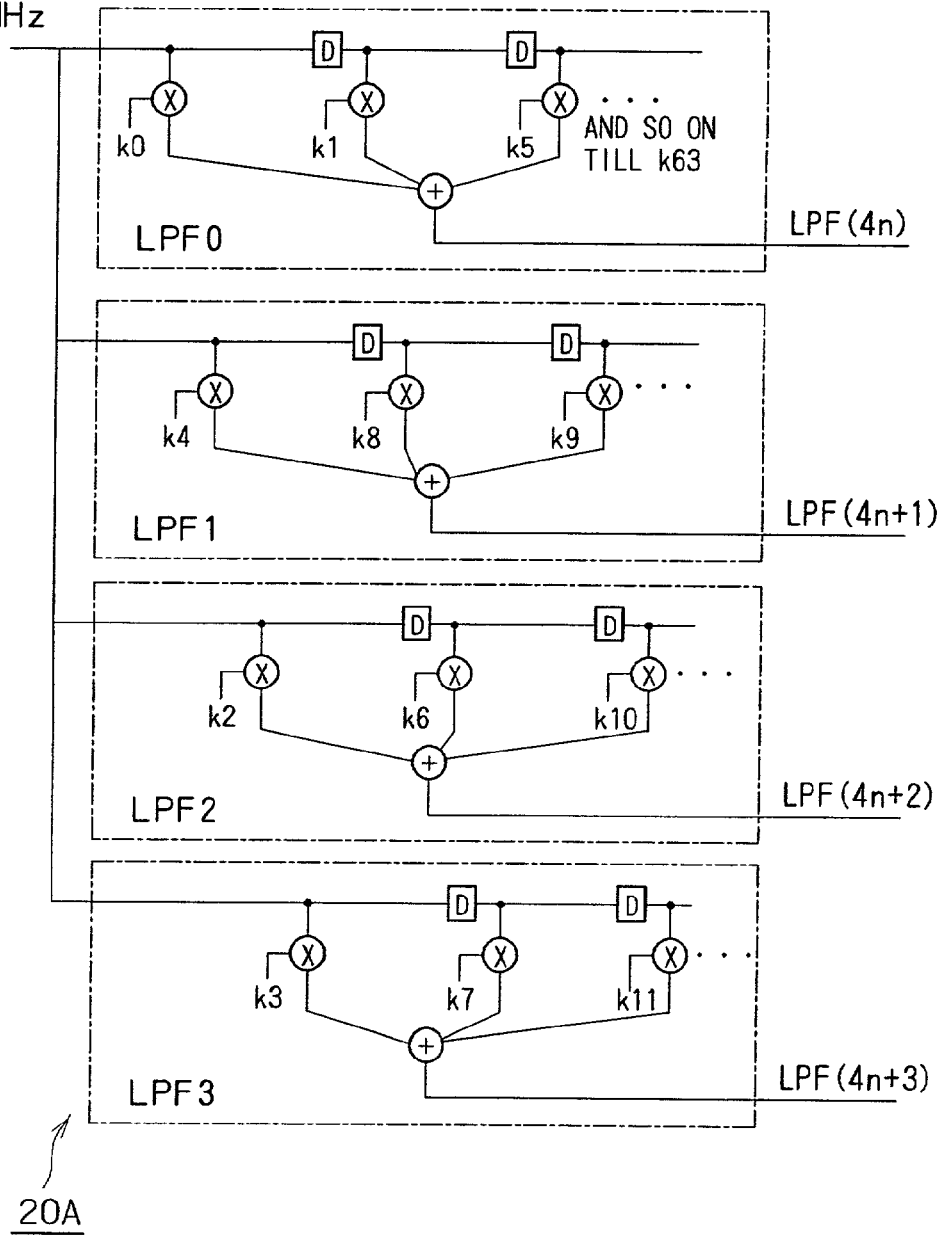
FIG. 14 is a diagram showing the configuration of an interpolation circuit for generating 4 parallel pieces of 4-times interpolation data in 1 clock cycle.

Thus, the original 64-taps transversal filter is modified into the following four 16-taps transversal filters LPF0, LPF1, LPF2 and LPF3, which are shown in FIG. 14:

1) A 16-taps transversal filter LPF0 thinning the input signal train x(n) at every fourth tap of the original 64-taps transversal filter starting with tap k0.
2) A 16-taps transversal filter LPF1 thinning the input signal train x(n) at every fourth tap of the original 64-taps transversal filter starting with tap k1.
3) A 16-taps transversal filter LPF2 thinning the input signal train x(n) at every fourth tap of the original 64-taps transversal filter starting with tap k2.
4) A 16-taps transversal filter LPF3 thinning the input signal train x(n) at every fourth tap of the original 64-taps transversal filter starting with tap k3.

The four 16-taps transversal filters LPF0, LPF1, LPF2 and LPF3 are each driven by the pre-interpolation clock signal having a frequency of 150 MHz. The four 16-taps transversal filters LPF0, LPF1, LPF2 and LPF3 constitute a 4-times interpolation circuit 20A capable of producing parallel pieces of 4-times interpolation data in 1 clock cycle from the input signal train x(n).

In the 4-times interpolation circuit 20A, the 16-taps transversal filter LPF0 generates an (m=4n)th interpolated-data train lpf(4n), the 16-taps transversal filter LPF1 generates an (m=4n+1)th interpolated-data train lpf(4n+1), the 16-taps transversal filter LPF2 generates an (m=4n+2)th interpolated-data train lpf(4n+2) and the 16-taps transversal filter LPF3 generates an (m=4n+3)th interpolated-data train lpf(4n+3).

The typical interpolation LPF described above carries out 4-times interpolation, which can be generally expressed as follows.

TABLE 2

| (Conditions) | |
|---|---|
| Original tap count | N |
| Original tap coefficients | k(0) to k(N − 1) |
| Interpolation magnification | R |

TABLE 3

| (LPF specifications) | |
|---|---|
| LPF | Tap coefficients |
| LPF0 | k(0), k(R), k(2R), k(3R), . . . up to k(N − 1) |
| LPF1 | k(1), k(R + 1), k(2R + 1), k(3R + 1), . . . up to k(N − 1) |
| LPFi | k(i), k(R + i), k(2R + i), k(3R + i), . . . up to k(N − 1) |
| LPFR-1 | k(R − 1), k(2R − 1), k(3R − 1), k(4R − 1), . . . up to k(N − 1) |

Since a PR1 channel transfer characteristic becomes a zero at half the channel clock frequency, the channel output power can be considered to be distributed to almost all frequencies lower than the Nyquist frequency. Thus, non-aliasing sampling can be carried out provided that the ADC sampling frequency in the playback system 100 of the tape streamer shown in FIG. 1 is higher than the channel clock frequency.

For the above reason, in the following description, the following typical frequency values are assumed:

Channel clock frequency=100 MHz
ADC sampling frequency=150 MHz

With the ADC sampling frequency set at a value 1.5 times the channel clock frequency as shown above, the load of circuit accompanying enhancement of the speed is small.

As described above, in order to reduce noises in the PLL circuit 30, high-magnification interpolation is desirable. This is because high-magnification interpolation data train includes sampling data in the vicinity of a detection point.

If 8-times or 16-times interpolation is executed as an extension of the interpolation method described above, however, the interpolation extension will face a difficulty caused by an increased tap count of the transversal filter. An LPF for 4-times interpolation requires a characteristic exhibiting abrupt attenuation at ¼ of the Nyquist frequency. For this reason, a 64-taps transversal filter is used. On the other hand, an LPF for 16-times interpolation requires a characteristic exhibiting abrupt attenuation at ¹⁄₁₆ of the Nyquist frequency. Such an LPF will have a poor zero-convergence characteristic of a side lobe of an impulse response and require a tap count greater than 64.

Figure 15:
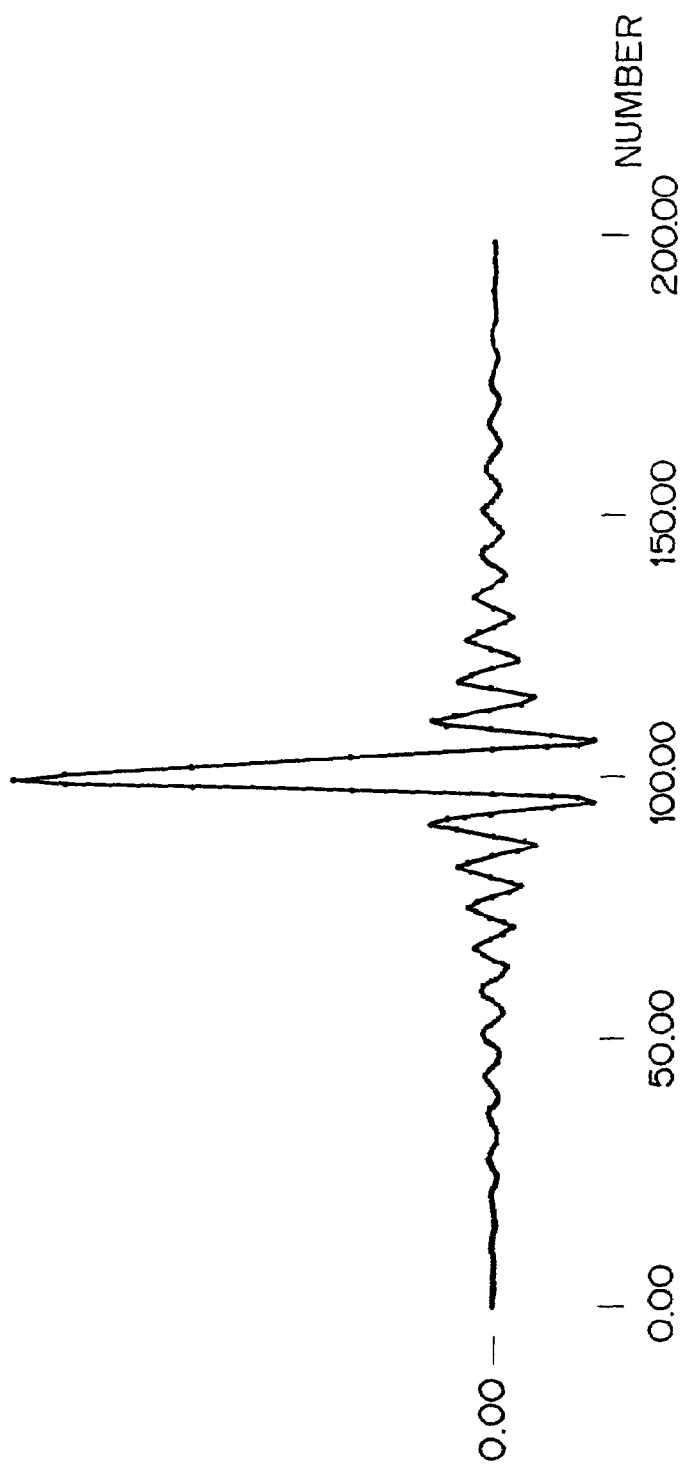
FIG. 15 is a diagram showing an impulse response of an LPF having a cut-off frequency at $\frac{1}{4}$ of the Nyquist frequency.
Figure 16:
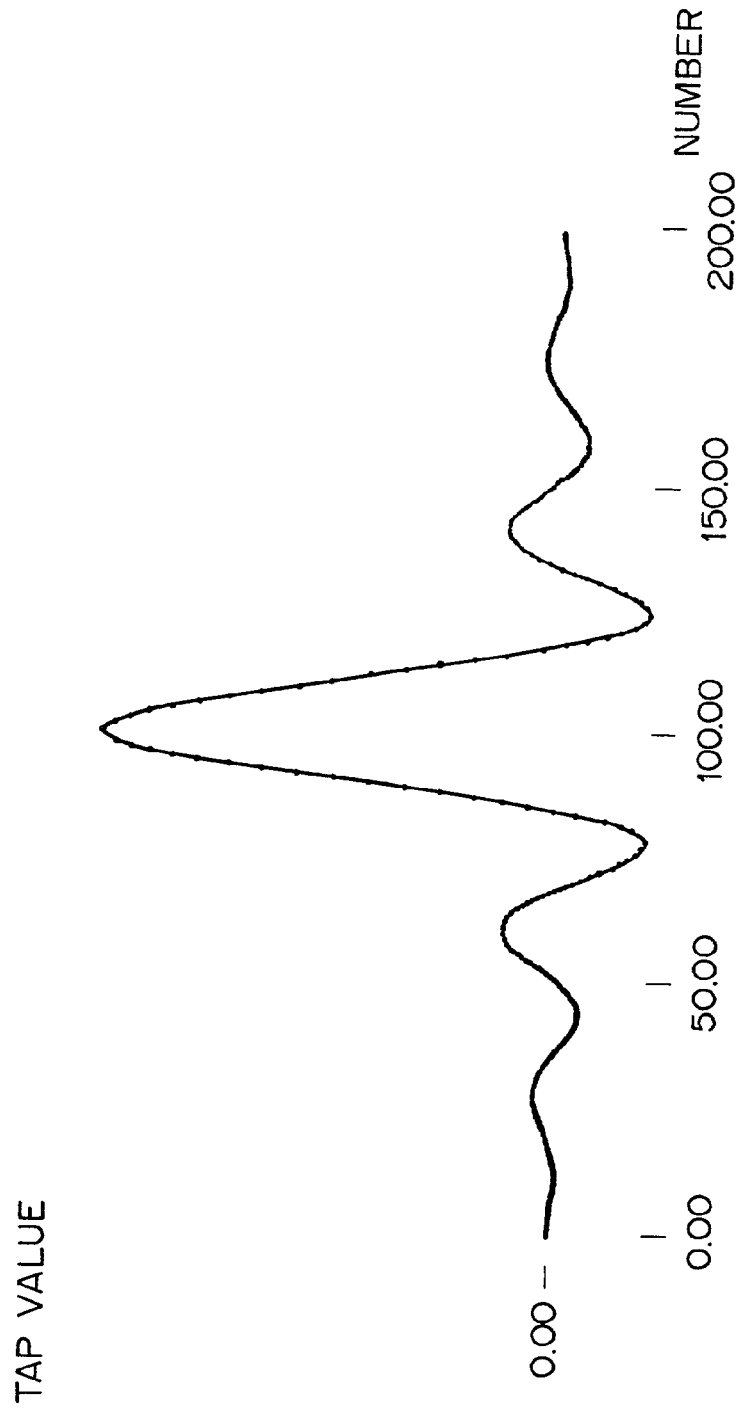
FIG. 16 is a diagram showing an impulse response of an LPF having a cut-off frequency at $\frac{1}{16}$ of the Nyquist frequency.

FIG. 15 is a diagram showing an impulse response of an LPF having a cut-off frequency at ¼ of the Nyquist frequency. On the other hand, FIG. 16 is a diagram showing an impulse response of an LPF having a cut-off frequency at $\frac{1}{16}$ of the Nyquist frequency. The impulse responses are each a typical result of computation covering a length of 200 points. The latter impulse response exhibits a poor convergence characteristic of the side lobe.

Figure 17:
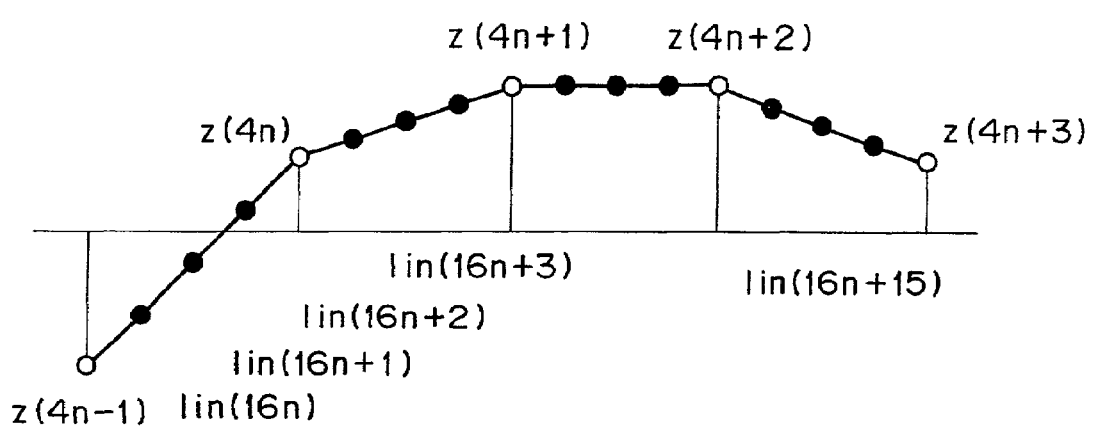
FIG. 17 is a diagram showing a model of an interpolation technique adopted by a linear interpolation circuit.

The transversal filters are used for carrying out low-magnification interpolation followed by linear interpolation carried out at the following stage to implement high-magnification interpolation which is advantageous in that there is no need to increase the scale of the circuit. Typical interpolation using a linear interpolation circuit is shown in FIG. 17.

In general, in order to obtain as many samples lin (i) as Q by linear interpolation between two points a and b, the following equation is used.

$$lin(i) = a + \frac{b-a}{Q} \times i \quad \text{where } 1 \leq i \leq Q \qquad (11)$$

In order to generate 16 samples lin(i) from 4 inputs z(4n), z(4n+1), z(4n+2) and z(4n+3), the 4-times linear interpolation is applied to the 4 inputs z(4n), z(4n+1), z(4n+2) and z(4n+3) as follows:

lin(16n)=z(4n−1)+{z(4n)−z(4n−1)}/4 lin(16n+1)=z(4n−1)+{z(4n)−z(4n−1)}/4×2 lin(16n+2)=z(4n−1)+{z(4n)−z(4n−1)}/4×3 lin(16n+3)=z(4n)

lin(16n+4)=z(4n)+{z(4n+1)−z(4n)}/4 lin(16n+5)=z(4n)+{z(4n+1)−z(4n)}/4×2 lin(16n+6)=z(4n)+{z(4n+1)−z(4n)}/4×3 lin(16n+7)=z(4n+1)

lin(16n+8)=z(4n+1)+{z(4n+2)−z(4n+1)}/4 lin(16n+9)=z(4n+1)+{z(4n+2)−z(4n+1)}/4×2 lin(16n+10)=z(4n+1)+{z(4n+2)−z(4n+1)}/4×3 lin(16n+11)=z(4n+2)

lin(16n+12)=z(4n+2)+{z(4n+3)−z(4n+2)}/4 lin(16n+13)=z(4n+2)+{z(4n+3)−z(4n+2)}/4×2 lin(16n+14)=z(4n+2)+{z(4n+3)−z(4n+2)}/4×3 lin(16n+15)=z(4n+3)

Multiplication and division circuits used in the linear interpolation are each a shift circuit. To be more specific, a multiplication-by-2 circuit is a 1-bit left-shift circuit and a multiplication-by-4 circuit is a 2-bit left-shift circuit. On the other hand, a division-by-2 circuit is a 1-bit right-shift circuit and a division-by-4 circuit is a 2-bit right-shift circuit. As a result, the scale of the entire circuit can be kept small.

So far, as the interpolation circuit 20, a 4-times interpolation circuit 20A employing transversal filters and a 4-times interpolation circuit adopting the linear interpolation method have been explained.

Figure 18:
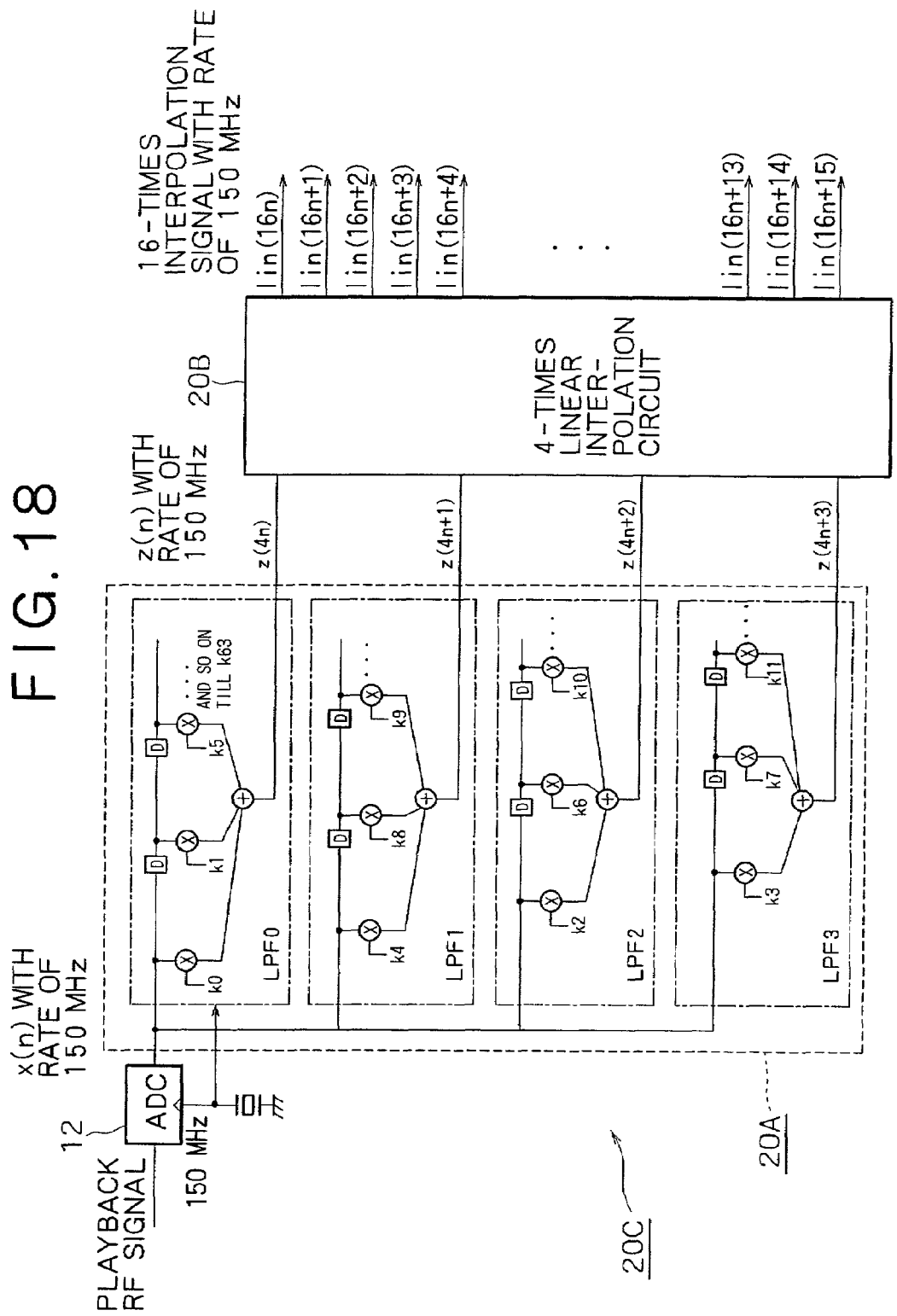
FIG. 18 is a block diagram showing a 16-times interpolation circuit, which is a combination of a 4-times interpolation circuit and a 4-times linear interpolation circuit.

FIG. 18 is a block diagram showing a 16-times interpolation circuit 20C, which is a combination of the 4-times interpolation circuit 20A and a 4-times linear interpolation circuit 20B. As described earlier, the 4-times interpolation circuit 20A includes the four 16-taps transversal filters LPF0, LPF1, LPF2 and LPF3, which are shown in FIG. 14.

Typical interpolation waveforms obtained by calculation are shown as follows.

Figure 19:
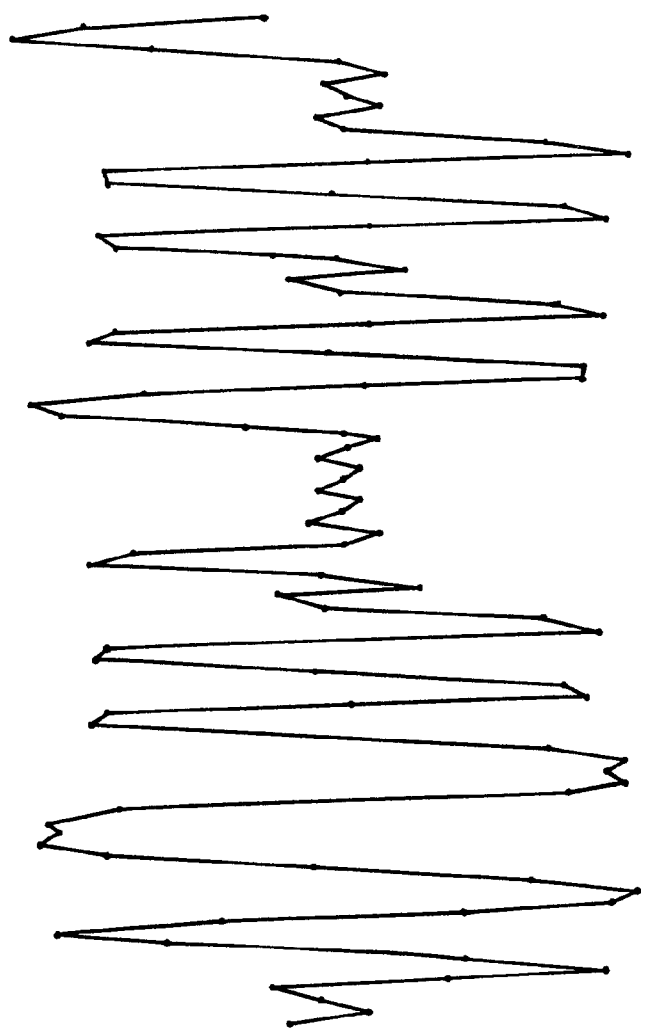
FIG. 19 is a diagram showing the PR1 channel's typical output completing a 1.5-times over-sampling process.
Figure 20:
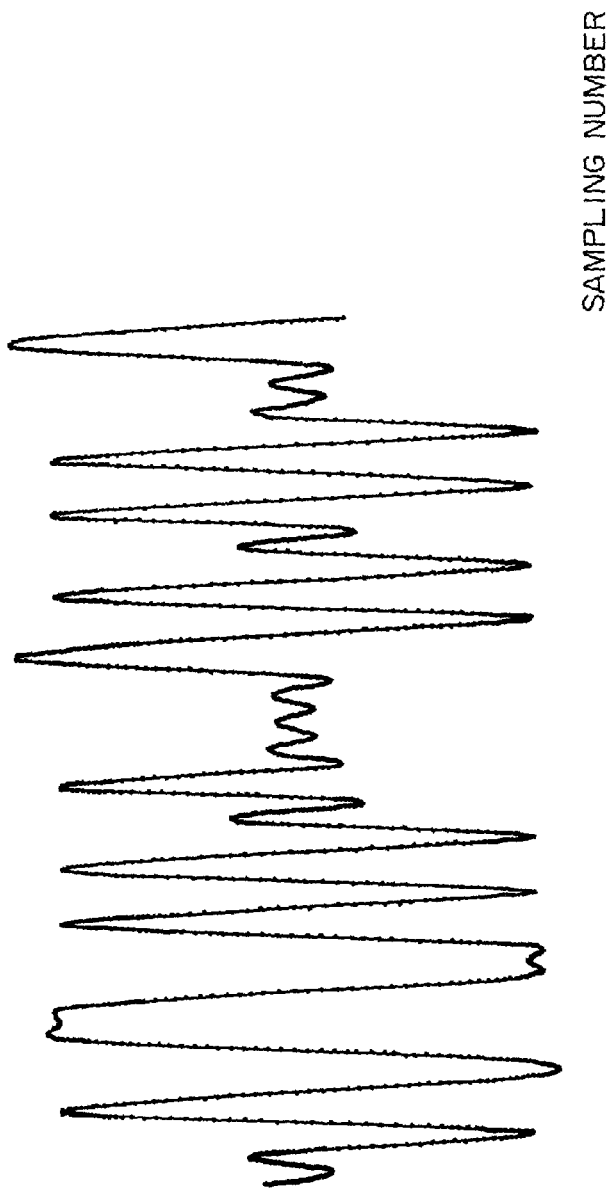
FIG. 20 is a diagram showing the PR1 channel's typical output completing a 16-times over-sampling process.
Figure 21:
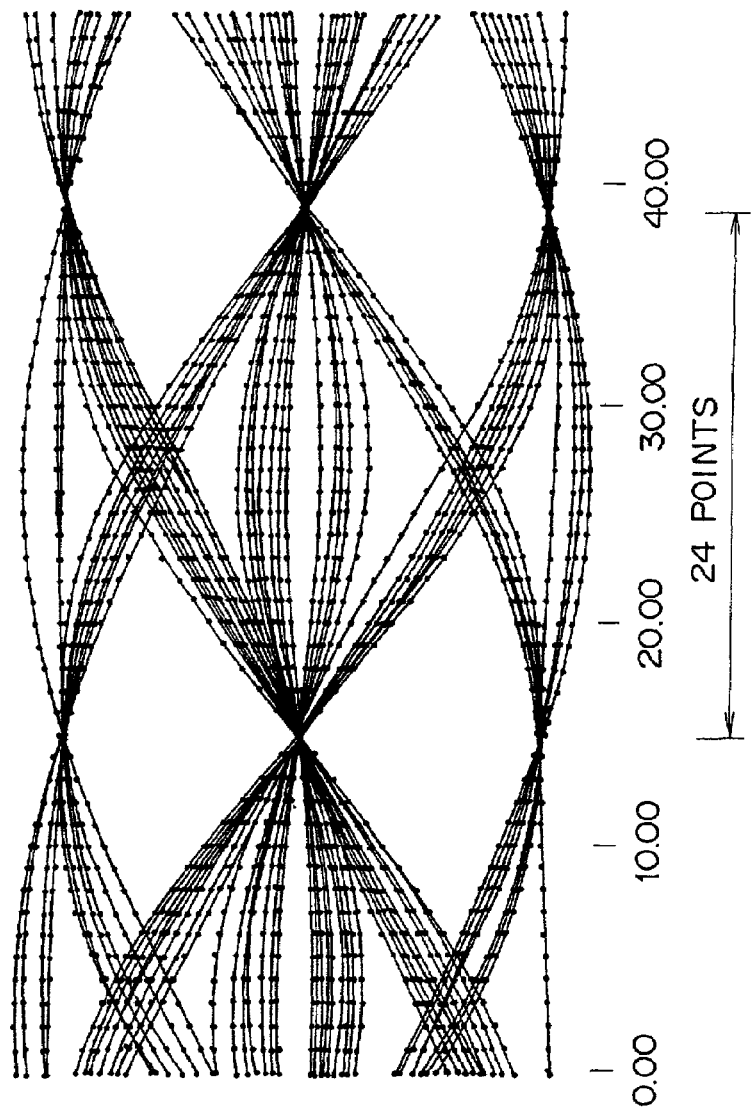
FIG. 21 is a diagram showing an eye pattern of the PR1 channel's typical output completing a 16-times over-sampling process.

FIG. 19 is a diagram showing the PR1 channel's typical output completing a 1.5-times over-sampling process. On the other hand, FIG. 20 is a diagram of a waveform showing the PR1 channel's typical output completing a 16-times interpolated process. FIG. 21 is a diagram showing an eye pattern of the PR1 channel's typical output completing a 16-times interpolated process. As is obvious from the eye pattern shown in FIG. 21, a detection point exists for every 24 pieces of data.

For an ADC sampling frequency of 150 MHz, a signal completing 16-times interpolation corresponds to a sample signal with a frequency of 2,400 MHz, and it is extremely hard to obtain such a high-frequency analog-to-digital converter. In addition, the design of the transversal filter is also difficult as well. Moreover, the power consumption also increases almost proportionally to the clock frequency.

The following description concretely explains the PLL circuit 30 employed in the playback system 100 of the tape streamer with conditions set as follows:

Channel clock frequency=100 MHz
ADC sampling frequency=150 MHz
Interpolation magnification=16

The 16-times interpolation circuit 20C with a configuration described above is used for carrying out 16-times interpolation per ADC sample to generate a 24-times over-sampling data train. The number 24 is a product of 1.5 and 16(1.5×16) where the number 1.5 is a ratio of an ADC sampling frequency of 150 MHz to a channel clock frequency of 100 MHz. This means that data in the vicinity of a detection point exists for every about 24 pieces of data in a data train supplied to the PLL circuit 30.

As is obvious from the eye pattern shown in FIG. 21, a detection point exists for every 24 pieces of data. Thus, detection-point data is selected by thinning the input data train supplied to the PLL circuit 30 for every approximately 24 periods. It should be noted that the phrase "approximately 24 periods" is used because the interval is not accurately 24 periods in actual playback signals due to variations in frequency which are caused by:

1) rotational irregularity of a rotary drum in a helical scan system
2) rotational irregularity of a disc
3) tape-feeding-speed irregularity of a tape in the linear tape recording.

It is a role played by the PLL circuit 30 to follow the irregularities.

Figure 22:
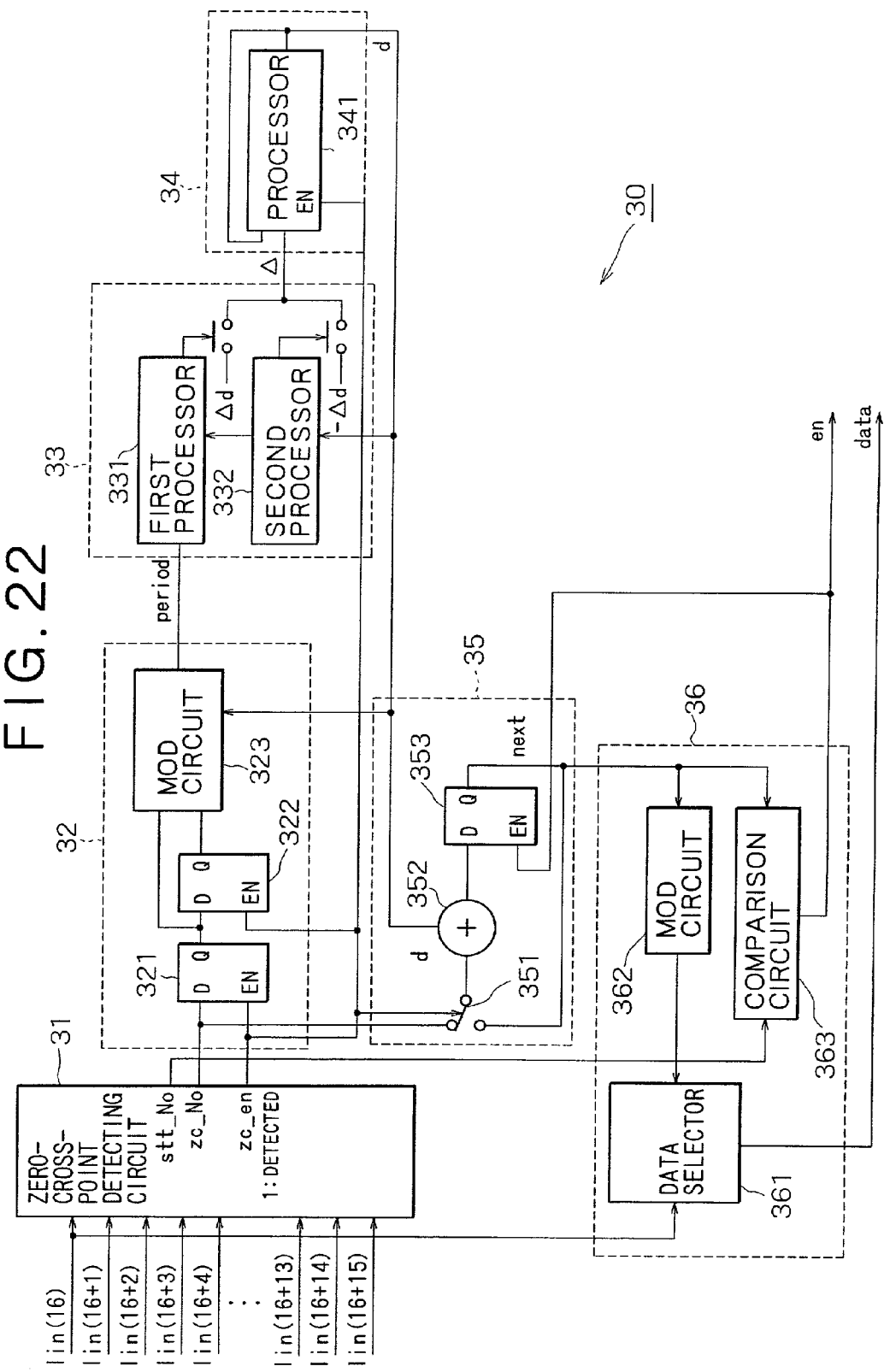
FIG. 22 is a block diagram showing a concrete typical configuration of a PLL circuit employed in the playback system of the tape streamer.

FIG. 22 is a block diagram showing a typical configuration of the PLL circuit 30 in concrete terms.

The PLL circuit 30 operates with a zero cross point of the playback RF signal used as phase information. It should be noted, however, that there are other techniques for extracting phase information.

As shown in FIG. 22, the PLL circuit 30 includes a zero-cross-point-detecting circuit 31, a period-detecting unit 32, a thinning-correction-quantity-computing unit 33, a thinning-period-correcting unit 34, a next-detection-absolute-number-computing unit 35 and a detection unit 36. The zero-cross-point-detecting circuit 31 inputs 16 parallel pieces of data lin(16n) to lin(16n+15), which are generated by the 16-times interpolation circuit 20C. The period-detecting unit 32 receives the output of the zero-cross-point-detecting circuit 31.

Figure 23:
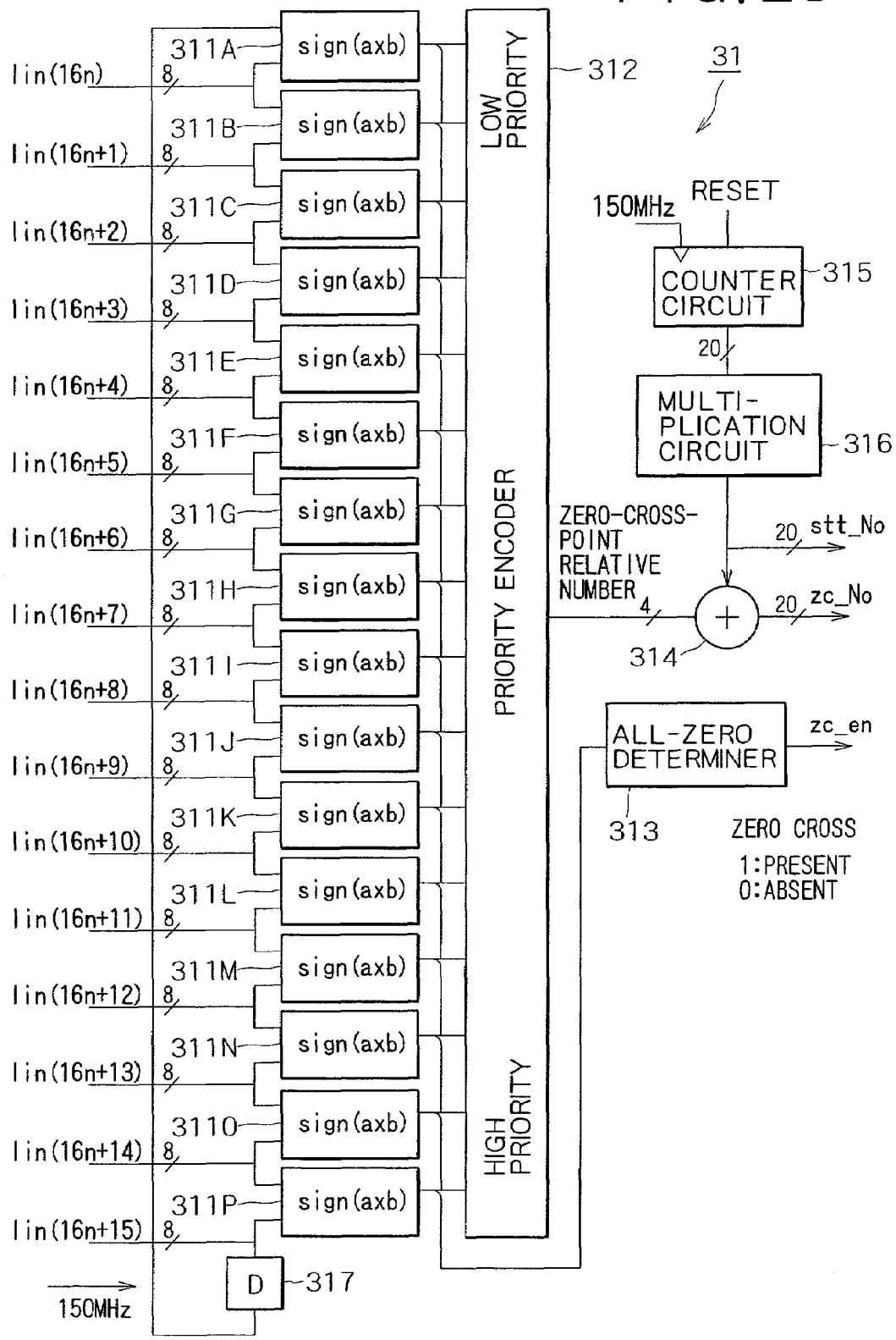
FIG. 23 is a block diagram showing the configuration of a zero-cross-point-detecting circuit employed in the PLL circuit.

The zero-cross-point-detecting circuit 31 is a circuit for finding zero cross points of the 16 parallel pieces of data lin(16n) to lin(16n+15). As shown in FIG. 23, the zero-cross-point-detecting circuit 31 includes 16 sign comparators (sign (a×b)) 311A, 311B, . . . 311P, a priority encoder 312, an all-zero determiner 313, an addition circuit 314, a counter circuit 315, a 16-times multiplication circuit 316 and a latch circuit 317. The 16 sign comparators 311A, 311B, . . . 311P input the 16 parallel pieces of data lin(16n) to lin(16n+15) respectively. The priority encoder 312 receives the outputs of the 16 sign comparators 311A, 311B, . . . 311P. The addition circuit 314 adds a zero-cross-point relative number to the output of the 16-times multiplication circuit 316. The counter circuit 315 is reset at the beginning of a track. The 16-times multiplication circuit 316 multiplies the output of the counter circuit 315 by 16.

The 16 sign comparators 311A, 311B, . . . 311P each output a value of 1 when the sign of its input a is different from the sign of its input b.

The sign comparator 311A compares the sign of the data lin(16n) with the sign of the data lin(16n−1), which is the data lin(16n+15) delayed by 1 clock period by the latch circuit 317.

The sign comparator 311B compares the sign of the data lin(16n) with the sign of the data lin(16n+1).

The sign comparator 311C compares the sign of the data lin(16n+1) with the sign of the data lin(16n+2).

Similarly, the remaining sign comparators 311D, 311E, . . . 311P each compare the sign of the data lin(16n+2) to the sign of the data lin(16n+15).

The priority encoder 312 receives the comparison outputs of the 16 sign comparators 311A, 311B, . . . 311P, and outputs a number in the range 0 to 15. The number is a zero-cross-point relative number indicating which of the 16 parallel pieces of data lin(16n) to lin(16n+15) includes the zero cross point. In case there is a plurality of zero cross points in the 16 parallel pieces of data lin(16n) to lin (16n+15), the priority encoder 312 outputs a zero-cross-point relative number with a highest priority level, that is, a most recent zero cross point. It should be noted that since the interval in this embodiment is approximately 24 periods, there is either one or no zero cross point in the 16 parallel pieces of data lin(16n) to lin(16n+15).

The all-zero determiner 313 determines whether there is one or no zero cross point in the 16 parallel pieces of data lin(16n) to lin(16n+15) on the basis of the comparison outputs of the 16 sign comparators 311A, 311B, . . . 311P, and outputs a zero-cross-presence/absence signal zc_en representing a result of determination. That is to say, the all-zero determiner 313 sets the zero-cross-presence/absence signal zc_en at 1 if any one of the comparison outputs of the 16 sign comparators 311A, 311B, . . . 311P is set at 1 to indicate that there is a zero cross point. On the other hand, the all-zero determiner 313 sets the zero-cross-presence/absence signal zc_en at 0 if none of the comparison outputs of the 16 sign comparators 311A, 311B, . . . 311P is set at 1, indicating that there is no zero cross point.

Reset at the beginning of a track, the counter circuit 315 employed in the zero-cross-point-detecting circuit 31 counts the number of ADC clock pulses having a frequency of 150 MHz. The 16-times multiplication circuit 316 multiplies the number of ADC clock pulses by 16 to generate a beginning-data absolute number stt_No of the current 16 parallel pieces of data lin(16n) to lin(16n+15). The addition circuit 314 then adds the beginning data absolute number stt_No to the zero-cross-point relative number to produce a zero-cross-point absolute number zc_No.

As shown in FIG. 22, the period-detecting unit 32 includes a first register 321, a second register 322 and a mod circuit 323.

The first register 321 and the second register 322, which are employed in the period-detecting unit 32, constitute a 2-stage shift register inputting the zc_No output by the zero-cross-point-detecting circuit 31. Controlled by the zc_en output by the zero-cross-point-detecting circuit 31, the first register 321 and the second register 322 are used for storing a new zero-cross-point absolute number zc2 and an old zero-cross-point absolute number zc1 respectively. The mod circuit 323 provides the thinning-correction-quantity-computing unit 33 with a modulo of a thinning period d and a difference $zc2_{13}\ zc1$ between the new zero-cross-point absolute number zc2 and the old zero-cross-point absolute number zc1, assuming that zc2>zc1. The modulo is referred to as a zero-cross period "period". A modulo of a thinning period d and a difference zc2_zc1 is computed because the zero-cross period of the signal has a value which varies in dependence on the recording pattern. The variable value is one of d, 2d, 3d, 4d and so on (24, 48, 72, 96 and so on in this embodiment).

Relations between the magnitudes of the zero-cross period "period" and the thinning period d are given as follows.

Case 1) For a small thinning period d (That is to say, the thinning period of the PLL circuit 30 is shorter than the input signal)

$1 \leq period < d/2$ (In this embodiment, $1 \leq period < 12$)

Case 2) For a just right thinning period d period=0

Case 3) For a long thinning period d (That is to say, the thinning period of the PLL circuit 30 is longer than the input signal)

$d/2 \leq period \leq d-1$     (In this embodiment, $12 \leq period \leq 23$)

Thus, the thinning-correction-quantity-computing unit 33 outputs the following thinning-period correction quantity Δ to a thinning-period-correcting unit 34.

Since the thinning period d of Case 1 needs to be increased, the thinning-period correction quantity Δ is set at Δd(Δ=Δd).

Since the thinning period d of Case 3 needs to be decreased, on the other hand, the thinning-period correction quantity Δ is set at −Δd(Δ=−Δd).

In order to output such a thinning-period correction quantity Δ to the thinning-period-correcting unit 34, the thinning-correction-quantity-computing unit 33 is provided with first and second processors 331 and 332 for comparing the zero cross period "period" detected by the period-detecting unit 32 with half the thinning period d output by the thinning-period correcting unit 34. To be more specific, the thinning-correction-quantity-computing unit 33 outputs Δd as the thinning-period correction quantity Δ when the processor 331 detects the following relation:

period<d/2

On the other hand, the thinning-correction-quantity-computing unit 33 outputs −Δd as the thinning-period correction quantity Δ when the processor 332 detects the following relation:

$$\text{period} \geq d/2$$

It should be noted that high-speed thinning can also be implemented by increasing the thinning-period correction quantity Δ at the beginning of a track.

The thinning-period correcting unit 34 has a processor 341 for increasing the thinning period d by the thinning-period correction quantity Δ obtained by the thinning-correction-quantity-computing unit 33 in order to correct the thinning period d for every zero-cross-point detection as follows:

$$d = d + \Delta$$

The thinning-period correcting unit 34 supplies the thinning period d corrected for every zero-cross-point detection to the thinning-correction-quantity-computing unit 33 and a next-detection-point-absolute-number-computing unit 35.

The next-detection-point-absolute-number-computing unit 35 includes a select switch 351, an adder 352 and a register 353. The next-detection-point-absolute-number-computing unit 35 computes a next-detection-point absolute number "next" based on a zero-cross-point absolute number zc_No output by the zero-cross-point-detecting circuit 31 and a thinning period d produced by the thinning-period correcting unit 34.

Normally, the next-detection-point absolute number "next" is computed as follows:

$$\text{next} = \text{next} + d$$

It should be noted, however, that if the current 16 parallel pieces of data lin(16n) to lin(16n+15) include a zero cross point, that is, if zc_en=1, the next-detection-point absolute number "next" is computed with the same zero cross point used as an origin for the purpose of phase locking.

That is to say, the select switch 351 employed in the next-detection-point-absolute-number-computing unit 35 is controlled by the zero-cross-point presence/absence signal zc_en output by the zero-cross-point-detecting circuit 31. To be more specific, for zc_en=1, that is, if a zero cross point is included in the current 16 parallel pieces of data lin(16n) to lin(16n+15) supplied to the sign comparators 311A, 311B, ... and 311P respectively, the select switch 351 selects a zero-cross-point absolute number zc_No output by the zero-cross-point-detecting circuit 31 and outputs the selected zero-cross-point absolute number zc_No to the adder 352. For zc_en=0, that is, if no zero cross point is included in the current 16 parallel pieces of data lin(16n) to lin(16n+15) supplied to the sign comparators 311A, 311B, ... and 311P respectively, on the other hand, the select switch 351 selects a next-detection-point absolute number "next" output by the register 353 and outputs the next-detection-point absolute number next to the adder 352.

The adder 352 adds the selected zero-cross-point absolute number zc_No or the next-detection-point absolute number next, which is supplied by the select switch 351 as described above, to the thinning period d output by the thinning-period correcting unit 34 in accordance with either of the following equations:

$$\text{next} = zc\_No + d, \text{ or}$$

$$\text{next} = \text{next} + d$$

A sum obtained as a result of addition is supplied to the register 353.

The register 353 is controlled by a control signal en output by the detection unit 36. The control signal en indicates whether or not a detection point is included in the current 16 parallel pieces of data lin(16n) to lin(16n+15). If a detection point is included in the current 16 parallel pieces of data lin(16n) to lin(16n+15), the register 353 receives the sum output by the adder 352 and passes on the sum as the next-detection-point absolute number "next".

Normally, the next-detection-point-absolute-number-computing unit 35 computes the next-detection-point absolute number "next" in accordance with the following:

$$\text{next} = \text{next} + d$$

It should be noted, however, that if the current 16 parallel pieces of data lin(16n) to lin(16n+15) include a zero cross point, that is, if zc_en=1, the next-detection-point absolute number "next" is computed with the same zero cross point used as an origin for the purpose of phase locking.

The operation of the next-detection-point-absolute-number-computing unit 35 can be summarized as follows.

For en=1 (in the case of an existing detection point),

For $zc\_en=0$, $\text{next} = \text{next} + d$

For $zc\_en=1$, $\text{next} = zc\_No + d$

For en=0 (in the case of no existing detection point), next=next no updated

The detection unit 36 includes a 16-input and 1-output data selector 361, a mod circuit 362 and a comparison circuit 363. The data selector 361 selects one of the 16 parallel pieces of data lin(16n) to lin(16n+15). The mod circuit 362 receives the next-detection-point absolute number next computed by the next-detection-point-absolute-number-computing unit 35. The comparison circuit 363 compares the next-detection-point absolute number next with the beginning-data absolute-number sst_No generated by the zero-cross-point-detecting circuit 31.

The mod circuit 362 employed in the detection unit 36 supplies (next mod 16) to the data selector 361 as a detection-point select signal.

The data selector 361 uses the (next mod 16) received as a detection-point select signal to select one of the 16 parallel pieces of data lin(16n) to lin(16n+15), and outputs the selected one as detection-point data "data".

The comparison circuit 363 compares the next-detection-point absolute number next with the beginning-data absolute-number sst_No of the 16 parallel pieces of data to find out if the following relation holds true:

$$\text{next} \leq sst\_No + 15$$

Figure 24:
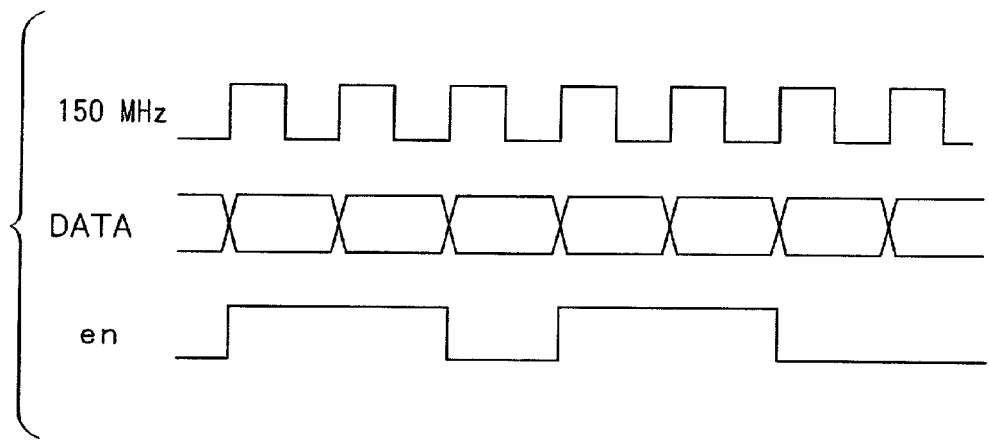
FIG. 24 is time charts representing the operation of the PLL circuit.

The above relation holding true indicates that the 16 parallel pieces of data lin(16n) to lin(16n+15) include the detection-point data "data". In this case, the control signal en is output. Since the ADC sampling frequency is 1.5 times the channel clock frequency, the control signal en is output twice in 3 clock cycles on the average as shown in FIG. 24.

Next, the buffer memory 40 is explained concretely.

In the playback system 100 of the tape streamer, the control signal en output by the PLL circuit 30 has a duty cycle of about ⅔. Thus, a circuit provided at a later stage is required to operate at a speed of 150 MHz in spite of the fact that a signal having a data rate of 100 MHz is processed so that ⅓ of the time is an idle pause period. In order to solve this problem, the buffer memory 40 is provided at a stage following the PLL circuit 30. Data is written into the buffer memory 40 at a rate corresponding to the PLL operating clock frequency of 150 MHz. The data is then read out from the buffer memory 40 at a later-stage clock frequency used for specially reading out data from the buffer memory 40. In this way, the operating clock frequency at the later stage can be kept at 150 MHz or lower.

The read clock frequency needs to be set at such a value that no overflow occurs in the buffer memory 40.

In order to prevent an overflow from occurring in the buffer memory 40, the read clock frequency is set typically at a value slightly higher than the channel clock frequency.

Even though the channel clock frequency varies due to rotational irregularity in disc rotation and/or drum rotation, an expected change of ±5% to occur in the helical scan apparatus is considered to be sufficient. Thus, by setting the read clock frequency at a fixed value of about 110 MHz to slightly increase the processing speed in advance, an overflow can be prevented from occurring in the buffer memory 40, and the operating frequency can be reduced from 150 MHz to 110 MHz. At a read clock frequency of 110 MHz, data is read out from the buffer memory 40 at a rate increased by about 10%(=110/100). Thus, on the average, the buffer memory 40 is found empty in 1 out of 11 read operations. For this reason, the buffer memory 40 is required to output a buffer-empty signal to indicate that the buffer memory 40 is empty.

Figure 25:
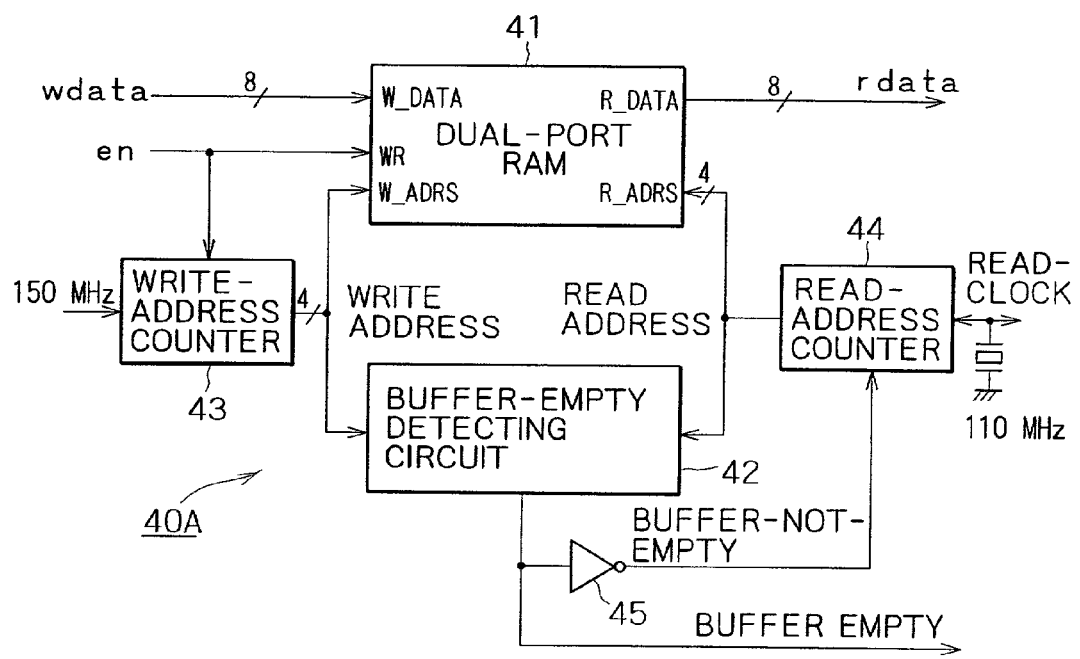
FIG. 25 is a block diagram showing a typical configuration of a buffer memory employed in the playback system of the tape streamer.

FIG. 25 is a block diagram showing a typical configuration of the buffer memory 40.

The typical buffer memory 40A shown in FIG. 25 includes a 16-word dual-port RAM 41 and a buffer-empty-detecting circuit 42.

The detection-point data "data" and the control signal en, which are output by the PLL circuit 30, are supplied to the 16-word dual-port RAM 41 as write data "wdata" and a write control signal respectively. In addition, a write address is also supplied to the 16-word dual-port RAM 41 from a write-address counter 43 which counts the number of write clock pulses having a frequency of 150 MHz. Furthermore, a read address is also supplied to the 16-word dual-port RAM 41 from a read-address counter 44, which counts the number of read clock pulses having a frequency of 110 MHz.

The write-address counter 43 is controlled by the control signal en. To put it in detail, when the control signal en is set at 1, the write-address counter 43 is incremented. On the other hand, the read-address counter 44 is controlled by a buffer-not-empty signal received from the buffer-empty-detecting circuit 42 through an inversion circuit 45. To put it in detail, when the buffer-not-empty signal is active to indicate that the buffer memory 40 is not empty, the read-address counter 44 is incremented.

The buffer-empty-detecting circuit 42 regards coincidence of the read address with the write address as an empty state of the buffer memory 40. When an empty state of the buffer memory 40 is detected, the buffer-empty-detecting circuit 42 generates a buffer-not-empty signal.

The buffer-empty signal generated by the buffer-empty-detecting circuit 42 halts processing carried out by a circuit provided at the following stage.

In order to prevent an overflow from occurring in the buffer memory 40 shown in FIG. 25, the read clock frequency is made slightly higher than the channel clock frequency. As an alternative, as shown in FIG. 26, a read clock signal is generated by a VCO.(Voltage Controlled Oscillator), the oscillation frequency of which is controlled in such a way that neither an empty state nor a data overflow is generated in the buffer memory 40.

Figure 27:
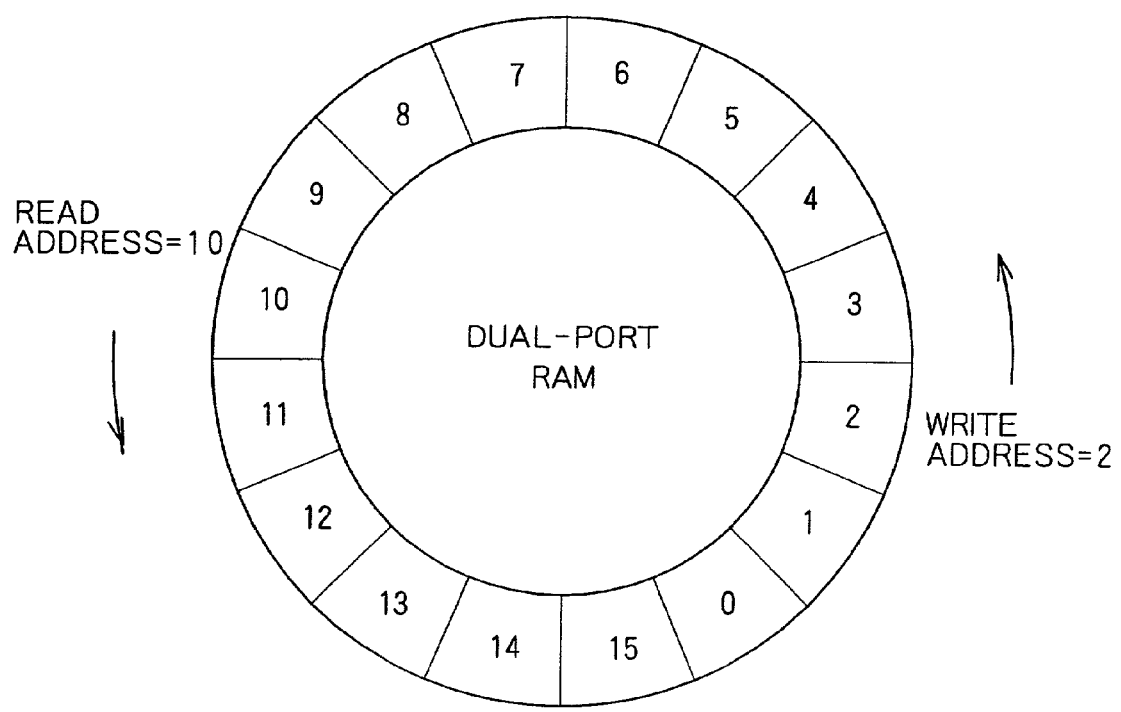
FIG. 27 is a diagram showing a ring-memory model of a dual-port RAM used as the buffer memory.

To put it in detail, assume that the 16-word dual-port RAM 41 employed in a buffer memory 40A shown in FIG. 25 is a ring memory like one shown in FIG. 27. As shown in FIG. 27, the write and read addresses move along the ring circumference in the counterclockwise direction with the read address lagging behind the write address. As described above, the buffer memory 40 plays a role of absorbing variations in playback RF signal frequency. It is thus desirable to control the read clock frequency so as to set the read address at a position on the other end of a diameter of the ring with respect to the write address. In this way, variations in playback RF signal frequency can be absorbed effectively and, at the same time, neither an empty state nor a data overflow is generated in the buffer memory 40.

Figure 26:
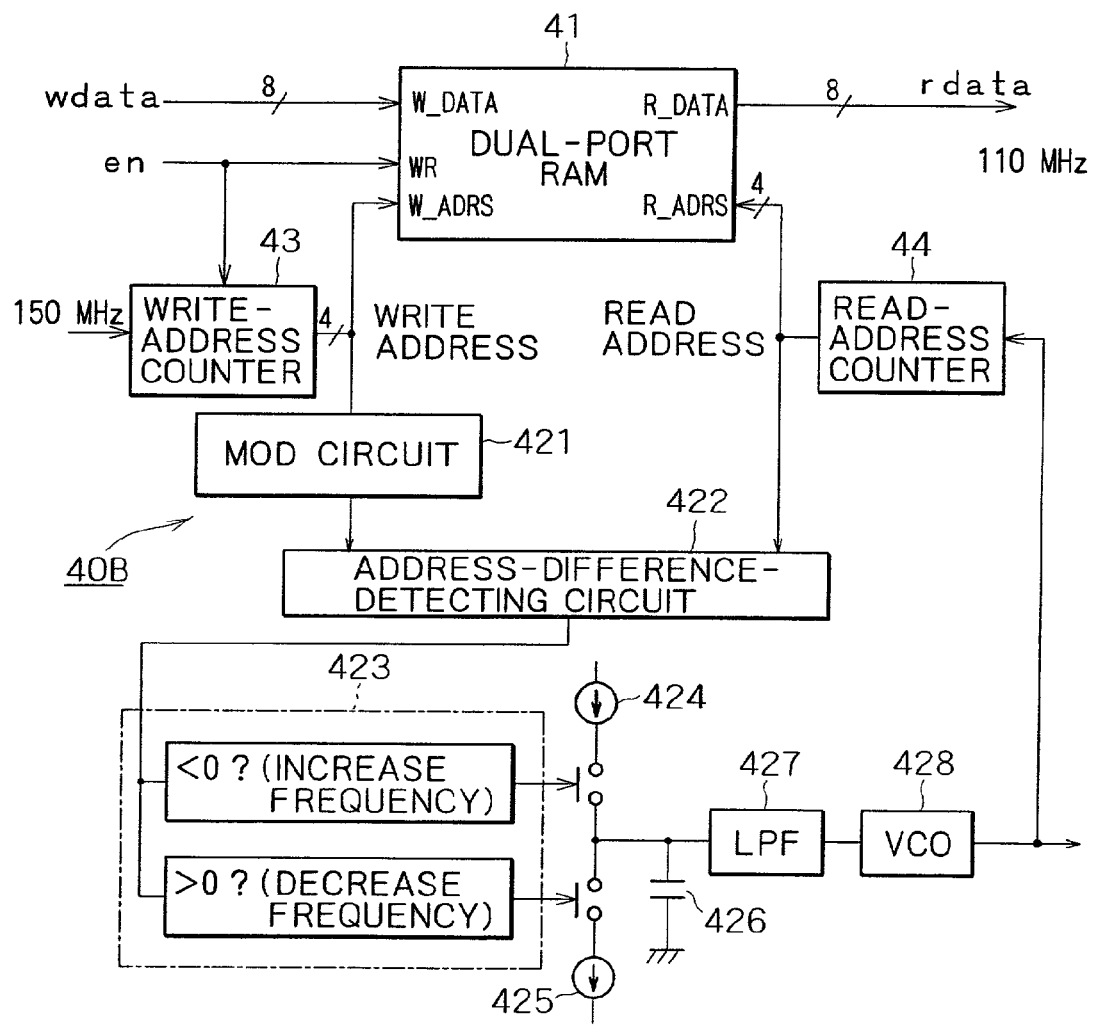
FIG. 26 is a block diagram showing another typical configuration of the buffer memory.

Another typical buffer memory 40B is shown in FIG. 26. As shown in the figure, a mod circuit 421 receives a write address generated by the write-address counter 43, carrying out the following modulo processing to generate a read-address reference:

Read-address reference=(write address−8)$mod$ 16

An address-difference-detecting circuit 422 detects a difference between the read-address reference and a read address generated by the read-address counter 44.

The address-difference-detecting circuit 422 supplies the detected address difference to a judgment circuit 423. If the address difference is smaller than 0, that is, if the read address leads ahead of the read-address reference, the VCO 428 is controlled to lower the oscillation frequency. If the address difference is greater than 0, that is, if the read address lags behind the read-address reference, on the other hand, the VCO 428 is controlled to increase the oscillation frequency.

The oscillation frequency of the VCO 28 is controlled by adjusting a control voltage applied to the VCO 428 by way of an LPF 427. The control voltage is adjusted by controlling an operation to electrically charge a capacitor 426 by using constant-current power supplies 424 and 425.

In the playback system 100 employing the buffer memory 40 shown in FIG. 26, the clock frequency of circuits provided at the later stage is 100 MHz.

The following description explains a PLL circuit 30 and a buffer memory 40, which are provided for 1-time sampling operations.

A contrivance is required for an ADC clock frequency of 100 MHz, that is, for 1-time sampling. In a helical scan apparatus, the channel rate of the playback RF signal is in the range 95 to 105 MHz. With the channel rate of the playback RF signal varying in such a range, there may be a moment in which the ADC rate of 100 MHz is smaller than the signal rate of 105 MHz. Such a moment violates Nyquist's rule, inevitably generating an aliasing noise.

Since the transfer characteristic of the PR1 channel is zero at the Nyquist frequency, however, frequency components in the vicinity of the Nyquist frequency are very little. Thus, even if the ADC clock frequency for carrying out AD conversion on the PR1 signal is 100 MHz, that is, even in the case of 1-time sampling, only few aliasing noises are generated, making it possible to put the helical scan apparatus to practical use.

As described above, there may be a moment in which the ADC sampling frequency is smaller than the channel clock frequency of the playback RF signal in the case of the 1-time sampling. Thus, one can imagine a case in which two detection points are included at positions close to respectively the beginning and the end of 16-times parallel data. Since the PLL circuit 30 shown in FIG. 22 does not have such a 2-detection-point simultaneous output function, however, the PLL circuit 30 cannot be used for 1-time sampling.

Figure 28:
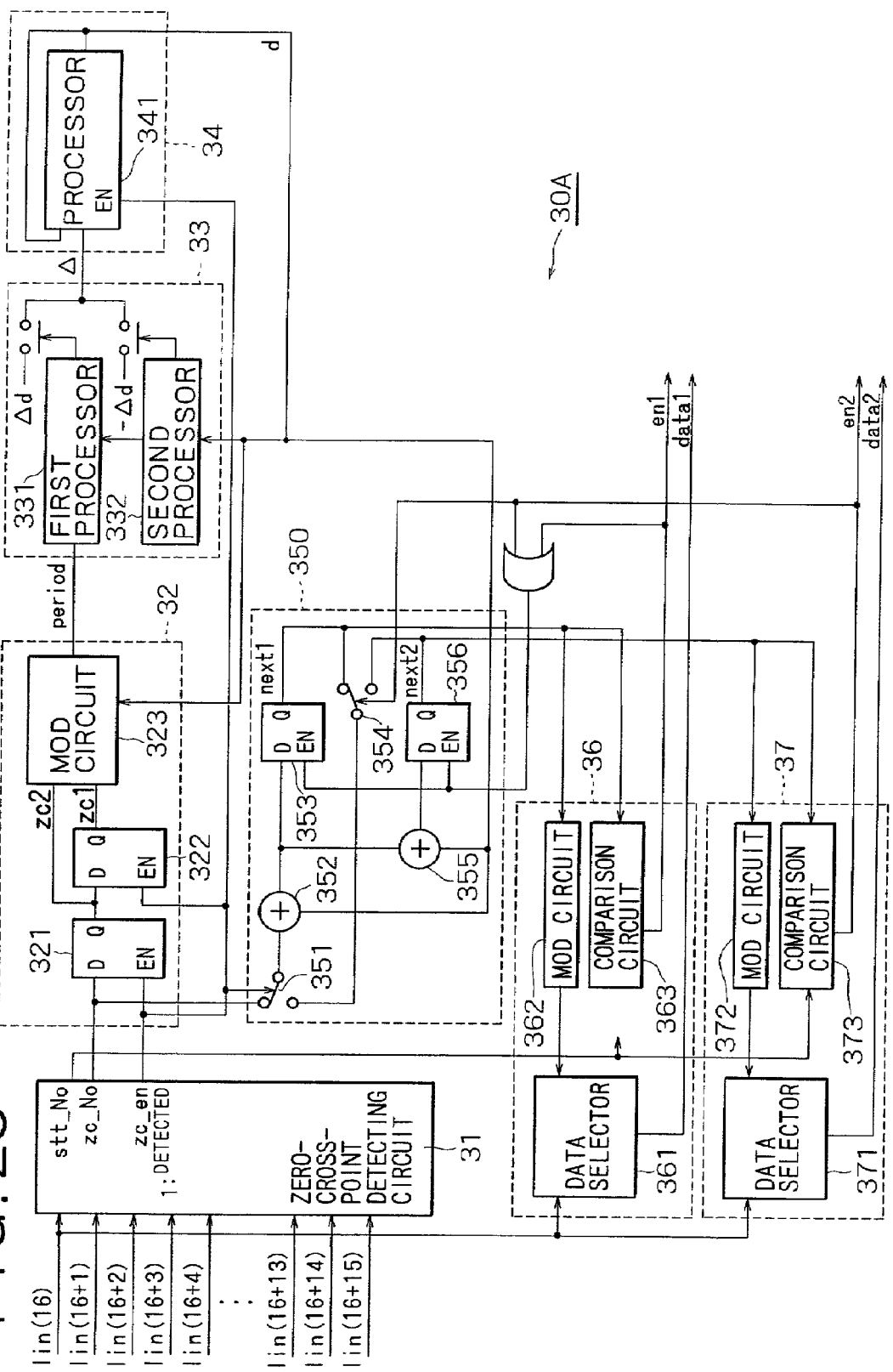
FIG. 28 is a block diagram showing the configuration of a PLL circuit for 1-time ADC sampling.

In order to solve this problem, the configuration of the PLL circuit 30 shown in FIG. 22 may be changed to one shown in FIG. 28.

The next-detection-point-absolute-number-computing unit 350 employed in the PLL circuit 30A shown on FIG. 28 is different from the next-detection-point-absolute-number-computing unit 35 employed in the PLL circuit 30 shown in FIG. 22 in that the next-detection-point-absolute-number-computing unit 350 has an additional function unit 356 for computing and outputting a next detection-point absolute number next2 following the next detection-point absolute number next1. In addition, the PLL circuit 30A also has a second detection unit 37 in addition to the detection unit 36.

The next-detection-point-absolute-number-computing unit 350 employed in the PLL circuit 30A includes the aforementioned switch 351, the aforementioned adder 352, the aforementioned register 353, another select switch 354, another adder 355 and another register 356 for computing and outputting a next-detection-point absolute number next2 following the next-detection-point absolute number next1 computed and output by the register 353. An addition result output by the adder 352 is output by way of the register 353 as the next-detection-point absolute number next1. The addition result output by the adder 352 is added by the adder 355 to a thinning period d, and an addition result output by the adder 355 is output by way of the register 356 as the next-detection-point absolute number next2.

The second detection unit 37 includes a 16-input and 1-output data selector 371, a mod circuit 372 and a comparison circuit 373. The 16-input and 1-output data selector 371 selects one of the 16 parallel pieces of data lin(16n) to lin(16n+15). The mod circuit 372 receives the next-detection-point absolute number next2 computed by the next-detection-point-absolute-number-computing unit 350. The comparison circuit 373 compares the next-detection-point absolute number next2 with the beginning-data absolute-number stt_No generated by the zero-cross-point-detecting circuit 31. The second detection unit 37 outputs detection-point data dat2 and a control signal en2 when a plurality of detection point exists.

Controlled by a control signal en2 obtained by the second detection unit 37, the additional select switch 354 employed in the next-detection-point-absolute-number-computing unit 350 selects the next-detection-point absolute number next2 in case there is a plurality of detection points. The additional select switch 354 then passes on the selected next-detection-point absolute number next2 to the adder 352 by way of the select switch 351.

The next-detection-point-absolute-number-computing unit 350 carries out processing according to processing formulas shown in the following table to compute and output the next-detection-point absolute number next1 and the next-detection-point absolute number next2 following the next-detection-point absolute number next1.

TABLE 4

| Condition 1 | Condition 2 | Operation 1 | Operation 2 |
| --- | --- | --- | --- |
| For en1 = en2 = 1 (2 detection points) | For zc_en = 0 | next1 = next2 + d | next2 = next1 + 2d |
| | For zc_en = 1 | next1 = zc_No + d | next2 = zc_No + 2d |
| For en1 = 1, en2 = 0 (1 detection point) | For zc_en = 0 | next1 = next1 + d | next2 = next1 + 2d |
| | For zc_en = 1 | next1 = zc_No + d | next2 = zc_No + 2d |

TABLE 4-continued

| Condition 1 | Condition 2 | Operation 1 | Operation 2 |
| --- | --- | --- | --- |
| For en1 = en2 = 0 (No detection points) | | next1 = next1 | next2 = next2 |

Figure 29:
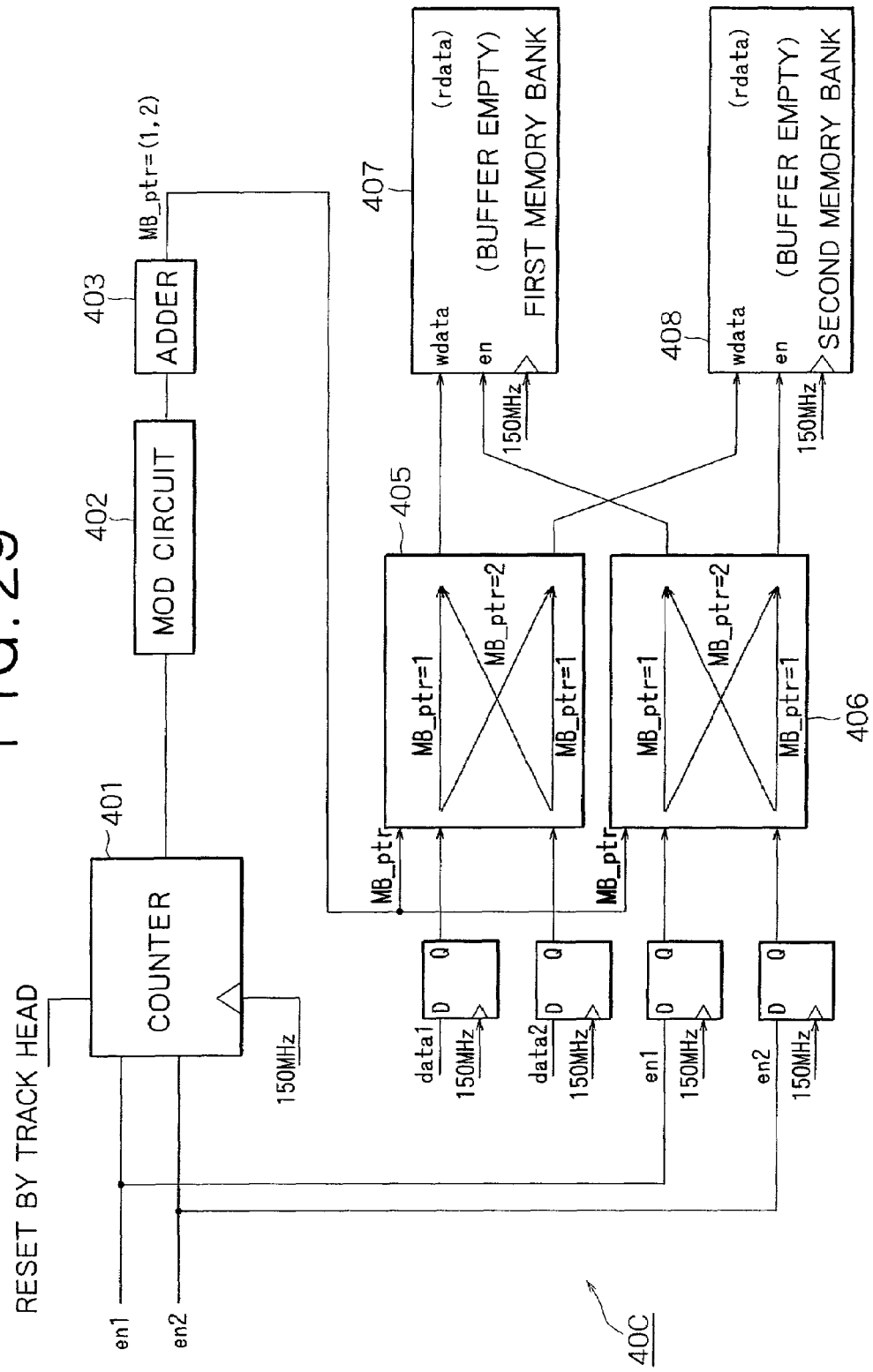
FIG. 29 is a block diagram showing the configuration of a buffer memory for 1-time ADC sampling.

In addition, in order to keep up with a 2-detection-point simultaneous output in 1-time sampling, a buffer memory 40 with a configuration like one shown in FIG. 29 is employed.

The buffer memory 40C shown in FIG. 29 includes 2 memory banks, namely first and second memory banks 407 and 408. Write data is supplied to the first memory bank 407 and the second memory bank 408 by way of a first switching circuit 405. On the other hand, control signals are supplied to the first memory bank 407 and the second memory bank 408 by way of a second switching circuit 406. It should be noted that FIG. 29 shows only the write side of the buffer memory 40C.

The buffer memory 40C having such a 2-bank configuration receives five signals, namely, the control signal en1, the control signal en2, detection-point data data1 and detection-point data data2, which are generated by the PLL circuit 30A shown in FIG. 28, as well as the clock signal having a frequency of 150 MHz.

As described above, the following three cases are conceivable for detection-point counts of 0, 1 and 2 respectively.

TABLE 5

| | |
| --- | --- |
| en1 = en2 = 1 | 2 detection points |
| en1 = 1, en2 = 0 | 1 detection point |
| en1 = en2 = 0 | No detection points |

The buffer memory 40C includes a counter 401, which is reset at 0 at the beginning of a track. The counter 401 is incremented by 0, 1 or 2 in dependence on the number of detection points to update a data count data_No as follows:

data_No=data_No+$en1$+$en2$

A memory-bank pointer MB_ptr is found by using a mod circuit 402 and an adder 403 based on the data count data_No output by the counter 401 in accordance with the following equation.

MB_ptr=(data_No $mod$ 2)+1

The first switching circuit 405 passes on the detection-point data data1 and/or data2 to the first memory bank 407 and/or the second memory bank 408 at the next clock in accordance with the value of the memory-bank pointer MB_ptr. On the other hand, the second switching circuit 406 passes on the control signal en1 and/or en2 to the first memory bank 407 and/or the second memory bank 408 in accordance with the value of the memory-bank pointer MB_ptr to enable or disable the first memory bank 407 and/or the second memory bank 408. As a result, operations are carried out in accordance with the following table.

TABLE 6

| Condition | Operation 1 | Operation 2 |
| --- | --- | --- |
| MB_ptr = 1 and 2 detection points | Write detection point data 1 into the first memory bank | Write detection point data 2 into the second memory bank |

TABLE 6-continued

| Condition | Operation 1 | Operation 2 |
|---|---|---|
| MB_ptr = 1 and 1 detection point | Write detection point data 1 into the first memory bank | Write nothing into the second memory bank |
| MB_ptr = 1 and no detection points | Write nothing into the first memory bank | Write nothing into the second memory bank |
| MB_ptr = 2 and 2 detection points | Write detection point data 1 into the second memory bank | Write detection point data 2 into the first memory bank |
| MB_ptr = 1 and 1 detection point | Write detection point data 1 into the second memory bank | Write nothing into the first memory bank |
| MB_ptr = 1 and no detection points | Write nothing into the first memory bank | Write nothing into the second memory bank |

As a result of the above operations, even-numbered pieces of detection-point data are written into the first memory bank 407 and odd-numbered pieces of detection-point data are written into the second memory bank 408, being arranged in order as shown in FIGS. 30A and 30B respectively.

On the read side of the buffer memory 40C, on the other hand, data is read out from the first memory bank 407 and the second memory bank 408 alternately in synchronization with a read clock signal. Details of the read operations are not explained.

It should be noted that, if P parallel input signals are supplied to the PLL circuit 30 and the PLL clock frequency is lowered to 1/P, a train of P×R×Q parallel trains of S×R×Q-time interpolation data is supplied to the PLL circuit 30. A maximum number Dmax of detection points that may be possibly included in the parallel data is found in accordance with the following equation.

$$Dmax = Int(P/S) + 1$$

Examples:
For P=1 and S=1.5, Dmax=1
For P=1 and S=1, Dmax=2
For P=2 and S=1.5, Dmax=3

In order to carry out an operation to select (or thin) data closest to a detection point among the P×R×Q parallel trains of S×R×Q-time interpolation data as data corresponding to the detection-point maximum number Dmax, the PLL circuit 30 is provided with as many data selectors as Dmax, as many detection-point-computing circuits as Dmax and a circuit for reporting the number of detection points. The detection-point-computing circuits are each used for controlling one of the data selectors.

In addition, when the PLL circuit 30 reports as many detection points as D for a buffer memory 40 including as many memory banks as Dmax, it is necessary to execute control to write D detection points into respectively D memory banks of the buffer memory 40 wherein D≦Dmax where notation Dmax denotes the maximum number of detection points as described above.

Next, an adaptive-equalization algorithm embraced by the first equalization circuit 10 is explained.

The adaptive-equalization algorithm for a digital transversal filter is an algorithm called LMS. The LMS algorithm has been put to practical use in accordance with the DDS4 specifications. The second equalization circuit 50 is subjected to adaptive control by using the algorithm called LMS.

Compensating for an equalization error of the first equalization circuit 10, the transfer characteristic of the second equalization circuit 50 is automatically found. That is to say, a transfer characteristic obtained by the first equalization circuit 10 can be computed from the transfer characteristic of the second equalization circuit 50. By making the transfer characteristic of the first equalization circuit 10 equal to the transfer characteristic of the second equalization circuit 50, adaptive equalization of the first equalization circuit 10 can be implemented. Tap coefficients of the digital transversal filter exist in the circuit. By applying the Fourier transformation to these tap coefficients, the transfer characteristic can also be found with ease.

For the above reason, the first equalization circuit 10 is subjected to adaptive control as follows.

If the sampling frequency of the first equalization circuit 10 is equal to the channel clock frequency, the transfer characteristic of the first equalization circuit 10 is made equal to the transfer characteristic of the second equalization circuit 50. By employing a transversal filter in each of the first equalization circuit 10 and the second equalization circuit 50, the tap coefficients of the first equalization circuit 10 can be made equal to the tap coefficients of the second equalization circuit 50. If the number of taps in one of the transversal filters is different from the number of taps in the other transversal filter, however, the tap-coefficient-transforming circuit 90 is used to increase no longer the number of tap coefficients or add zeros in dependence on the tap count.

If the sampling frequency of the first equalization circuit 10 is higher than the sampling frequency of the second equalization circuit 50, the transfer characteristic of a frequency region A inside the frequency range of the second equalization circuit 50 is used as the transfer characteristic of the first equalization circuit 10 as it is and a transfer characteristic of 0 for a frequency region B outside the frequency range of the second equalization circuit 50 is provided to the first equalization circuit 10. Let notation S1 denote the sampling frequency of the first equalization circuit 10 employing a transversal filter and notation S2 denote the sampling frequency of the second equalization circuit 50 also employing a transversal filter. In this case, the tap-coefficient-transforming circuit 90 computes tap coefficients by S1/S2-interpolation of the tap coefficients of the second equalization circuit 50 and uses the computed tap coefficients as tap coefficients of the first equalization circuit 10. The tap-coefficient-transforming circuit 90 may increase no longer the number of tap coefficients or adds zeros in dependence on the tap count.

In accordance with the above description, by adoption of an algorithm to make the transfer characteristic of the first equalization circuit 10 equal to the transfer characteristic of the second equalization circuit 50, adaptive control of the first equalization circuit 10 can be implemented. As will be described below, however, it is also possible to embrace an algorithm of updating the transfer characteristic of the first equalization circuit 10 from time to time.

First of all, the meaning of the word 'updating' is explained. The transfer function of the second equalization circuit 50 employed in an apparatus implementing an embedded adaptive-equalization function is set to carry out adapting at certain time intervals by the adaptive equalization circuit 80. In an embodiment having a DDS format, the transfer characteristics of the second equalization circuit 50 is adapted in each rotation of the drum. This adaptation of the transfer characteristics is referred to as an updating operation. In the DDS format, the second equalization circuit 50 employs a transversal filter. Thus, the transfer characteristics is updated by updating tap coefficients. Let notation C2_t(k) denote a kth tap's tap coefficient of the second equalization circuit 50 where notation k denotes a tap number. In this case, the updating operation is carried out to update the tap coefficient C2_t(k) as follows:

$$C2\_t+1(k)=C2\_t(k)+\Delta(k)$$

In the case of a 24-taps FIR filter, k is an integer in the range 0 to 23. Notation t denotes a drum-rotation number, which is an integer incremented for every drum rotation. Notation $\Delta$ denotes a correction value for correcting the tap coefficient. The correction value $\Delta$ is a small value, which is determined by considering a trade-off between a convergence speed and a stabilization speed.

As described above, there is a function executed by the adaptive equalization circuit 80 to adapt the second equalization circuit 50 for every drum rotation. It is thus desirable to also update the transfer function of the first equalization circuit 10 from time to time.

Figure 31:
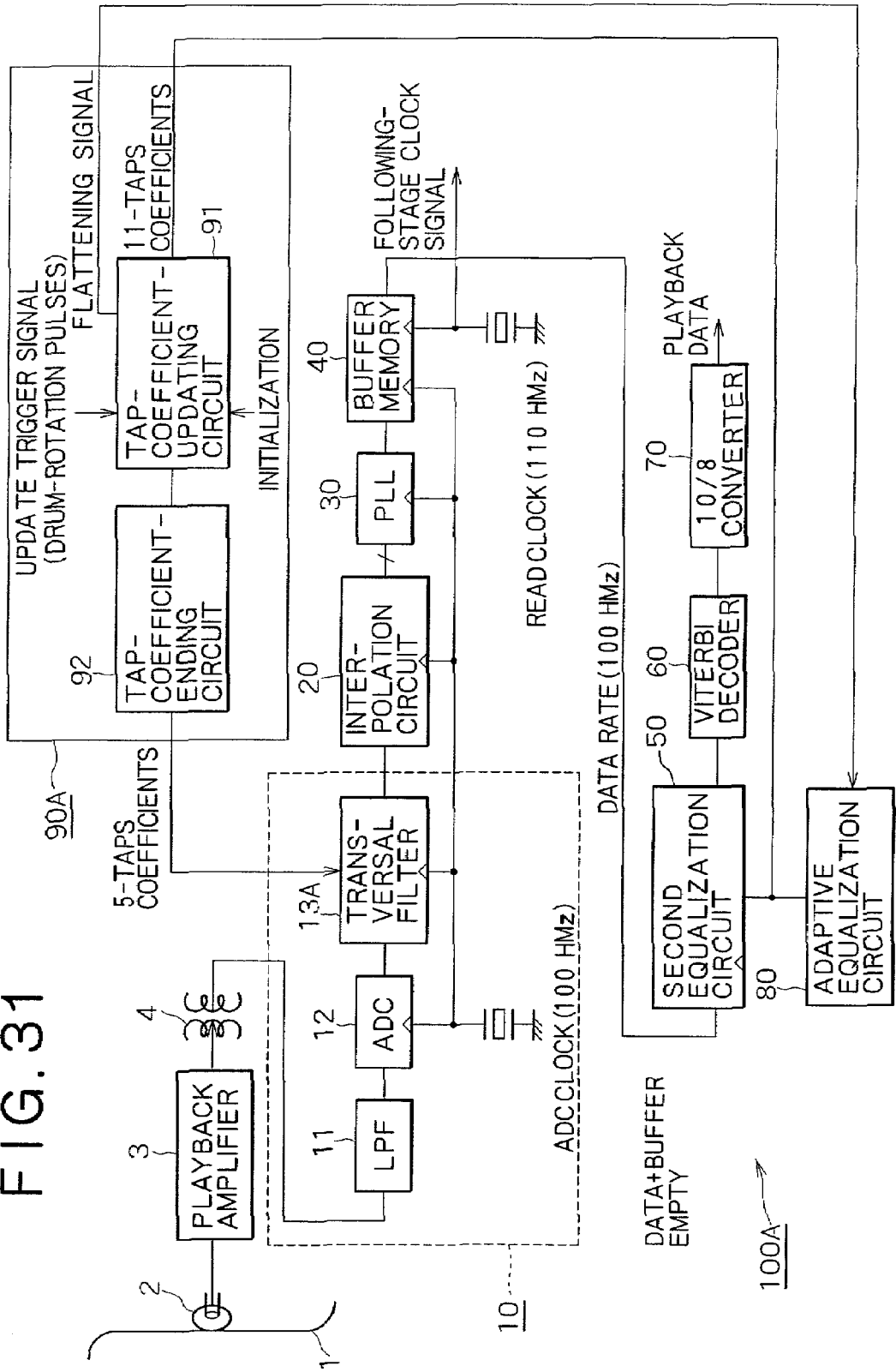
FIG. 31 is a block diagram showing a typical configuration of a tap-coefficient-setting circuit.
Figure 32:
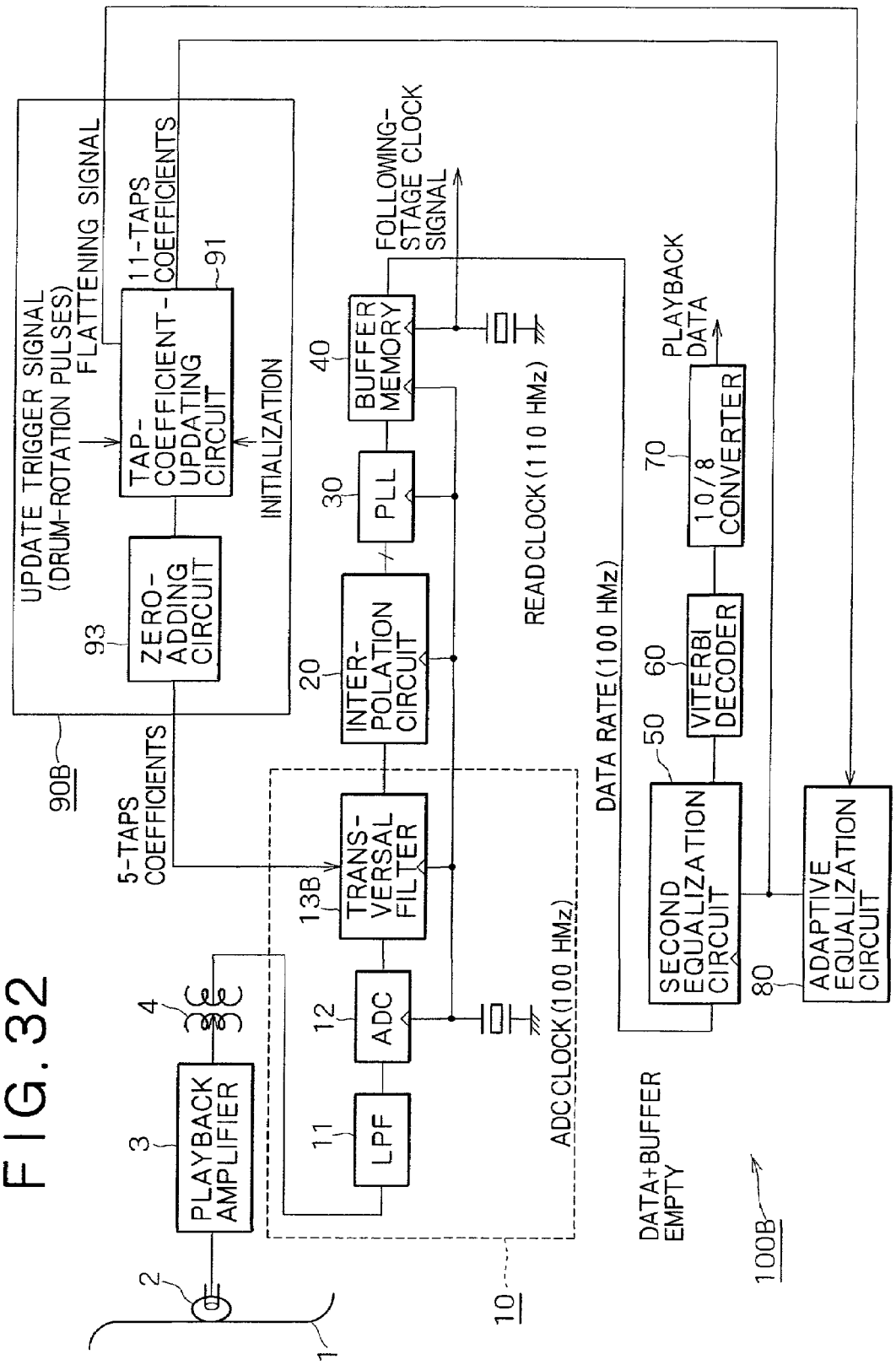
FIG. 32 is a block diagram showing another typical configuration of the tap-coefficient-setting circuit.

In order to implement the updating operation described above, the tap-coefficient-transforming circuit 90 is provided with a tap-coefficient-updating circuit 91 as shown in FIGS. 31 and 32.

To put it in detail, the playback system 100A of the tape streamer shown in FIG. 31 includes the tap-coefficient-transforming circuit 90A including the tap-coefficient-updating circuit 91 and a tap-coefficient-ending circuit 92. In the playback system 100A, the first equalization circuit 10 employs a 5-taps transversal filter 13A. By having the tap-coefficient-ending circuit 92 cut the number of tap coefficients, tap coefficients of an 11-taps transversal filter employed in the second equalization circuit 50 are transformed into tap coefficients of the transversal filter 13A employed in the first equalization circuit 10.

On the other hand, the playback system 100B of the tape streamer shown in FIG. 32 includes the tap-coefficient-transforming circuit 90B including the tap-coefficient-updating circuit 91 and a zero-adding circuit 93. In the playback system 100B, the first equalization circuit 10 employs a 15-taps transversal filter 13B. By having the zero-adding circuit 93 add zeros to tap coefficients, tap coefficients of an 11-taps transversal filter employed in the second equalization circuit 50 are transformed into tap coefficients of the 15-taps transversal filter 13B employed in the first equalization circuit 10.

Figure 33:
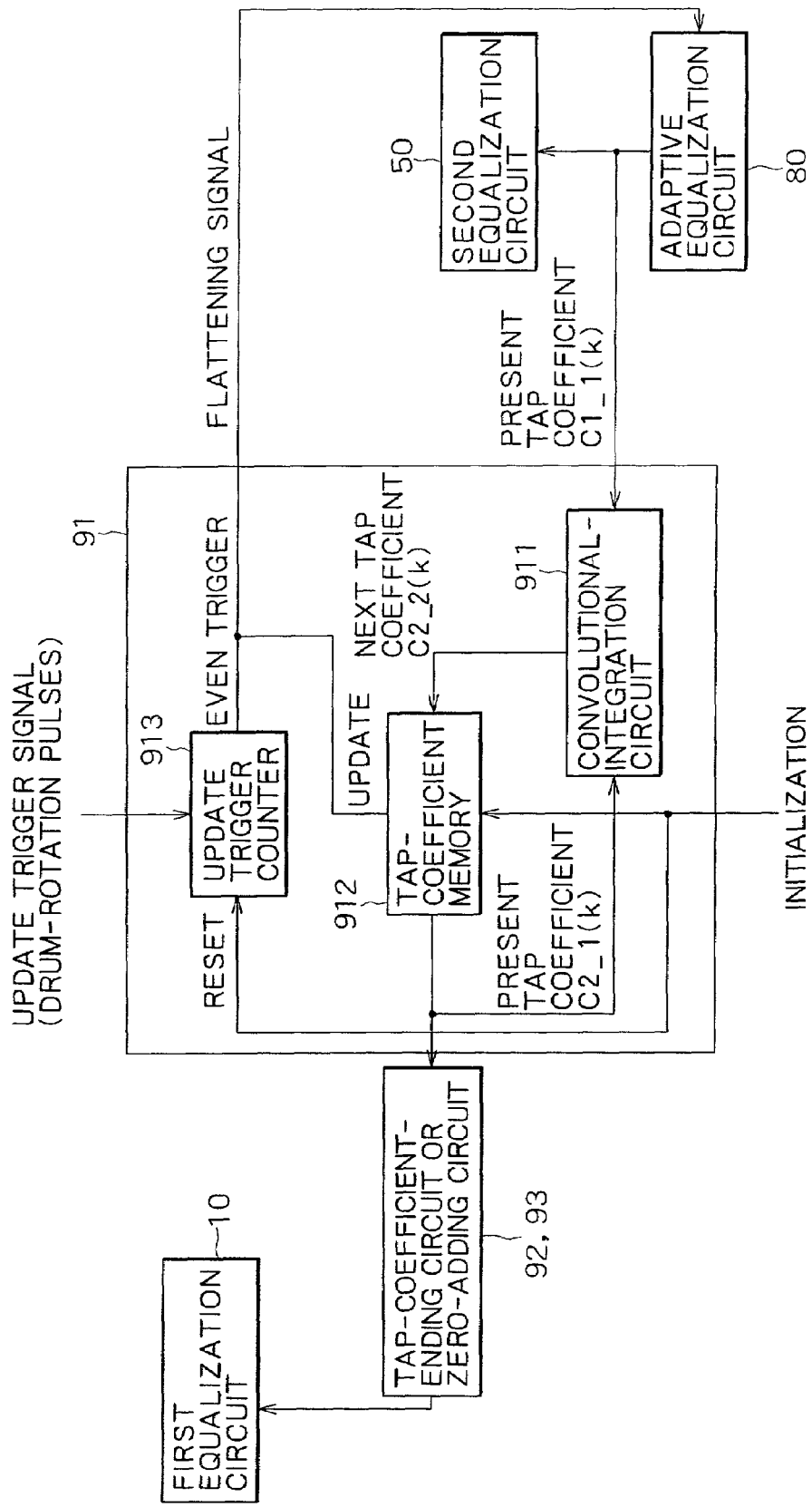
FIG. 33 is a block diagram showing the configuration of a tap-coefficient-updating circuit employed in the tap-coefficient-setting circuit.

As shown in FIG. 33, the tap-coefficient-updating circuit 91 includes a convolutional-integration circuit 911, a tap-coefficient memory 912 and an update trigger counter 913.

In a helical scanning method, the updating period of the tap coefficients is synchronized with the drum rotation for the sake of design convenience. For this reason, drum-rotation pulses are supplied to the tap-coefficient-updating circuit 91 as an update trigger signal. In addition, the tap-coefficient-updating circuit 91 also receives an initialization signal at the beginning of the operation from a system controller, which is not shown in the figure.

The convolutional-integration circuit 911 convolutionally integrates the present tap coefficients of the first equalization circuit 10 and the second equalization circuit 50 in order to compute next tap coefficients of the first equalization circuit 10.

The tap-coefficient memory 912 is used for latching results of the convolutional integration when an update signal is active.

The update trigger counter 913 generates a flattening signal and the update signal, which are used for controlling the updating operation. An even-numbered trigger signal is output as the flattening signal of the adaptive equalization circuit 80 employed in the second equalization circuit 50. The signal is also supplied to the tap-coefficient memory 912. No odd-numbered trigger signal is output.

The tap-coefficient-updating circuit 91 supplies the flattening signal for flattening the transfer characteristic of the second equalization circuit 50 to the adaptive equalization circuit 80 employed in the second equalization circuit 50. The transfer characteristic of the second equalization circuit 50 is flattened when the flattening signal is active.

When the initialization signal is active, the tap-coefficient memory 912 is reset and the transfer characteristic of the first equalization circuit 10 is flattened.

Figure 34:
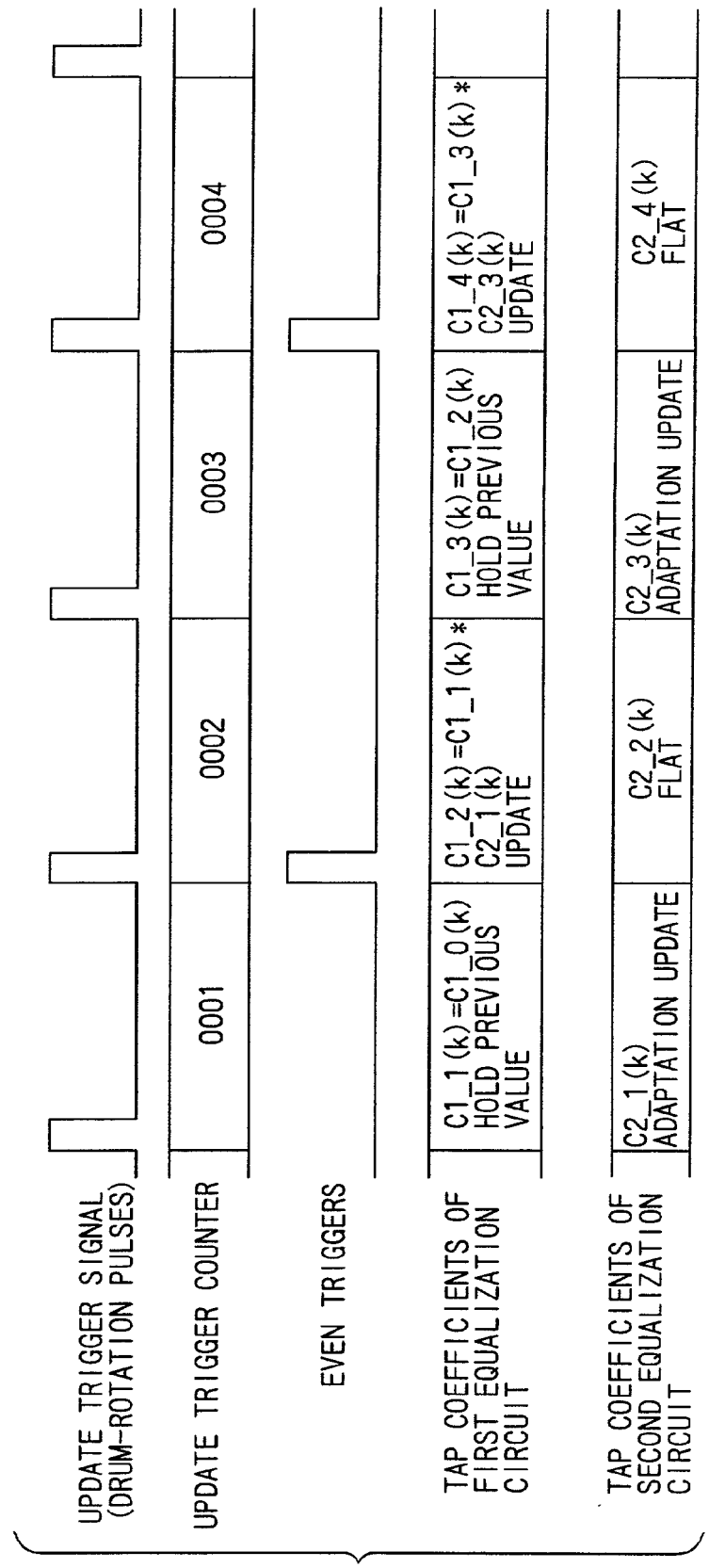
FIG. 34 is time charts representing the operation of the tap-coefficient-updating circuit.

The operation to update the tap-coefficient-updating circuit 91 is represented by time charts of FIG. 34.

FIGS. 35 to 39 are diagrams each showing a partial configuration including only the first equalization circuit 10 shown in FIG. 33, the second equalization circuit 50 also shown in FIG. 33, the tap-coefficient-updating circuit 91 and their operations along the time axis. It should be noted that, for the sake of simplification, the tap coefficients of both the first equalization circuit 10 and the second equalization circuit 50 are uniformly 24-taps coefficients, and the tap-coefficient-ending circuit 92 or the zero-adding circuit 93 is not shown in the figures.

Figure 35:
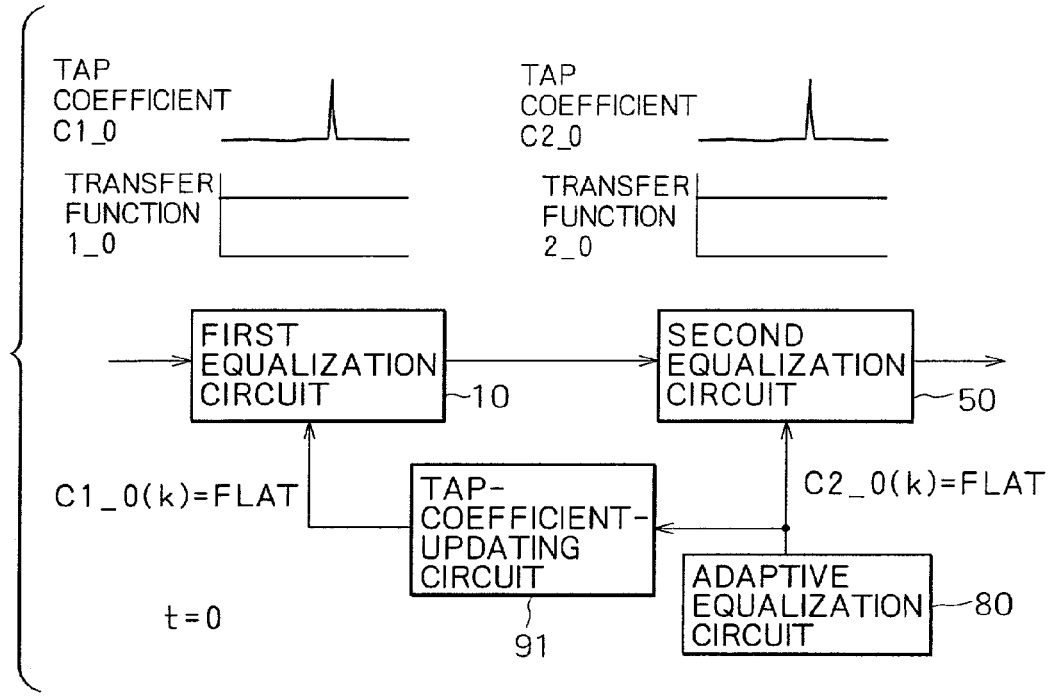
FIG. 35 is a diagram showing a model of a typical updating operation carried out by an equalization circuit at t=0.

FIG. 35 is a diagram showing a state at t=0, that is, right after the start of the operation of the circuit. In this state of t=0, the operation is just started, and the system controller generates the initialization signal while the other components operate as follows.

The tap-coefficient memory 912 is initialized and the transfer characteristic of the first equalization circuit 10 is flattened. The update trigger counter 913 is reset and an evened-number trigger signal functions as a flattening signal for flattening the transfer characteristic of the second equalization circuit 50.

Figure 36:
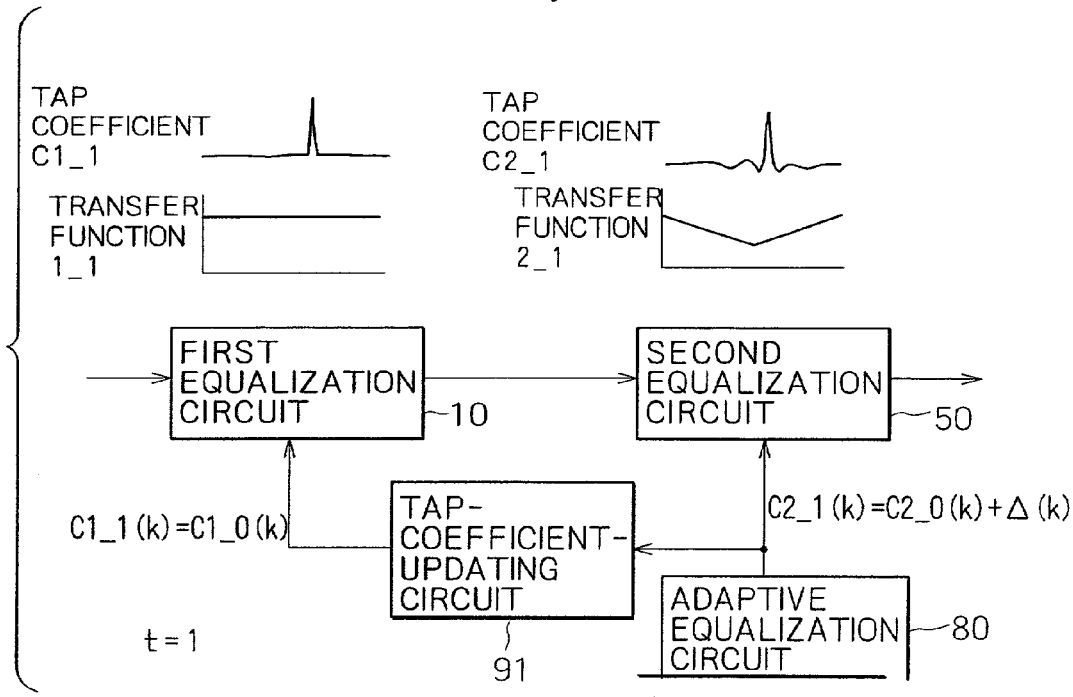
FIG. 36 is a diagram showing a model of a typical updating operation carried out by the equalization circuit at t=1.

FIG. 36 is a diagram showing a state at t=1. In the state of t=1, the count value of the update trigger counter 913 is 1 which is an odd number. Thus, neither the update signal nor the flattening signal is output. As a result, the components operate as follows.

Since the tap-coefficient memory 912 does not operate, the kth tap's tap coefficient $C1_{13}1(k)$ of the first equalization circuit 10 is given as follows:

$$C1\_1(k)=C1\_0(k)$$

As is obvious from the above equation, the kth tap's tap coefficient C1_1(k) retains the value held at t=0.

By processing a playback waveform appearing during a period at t=0, the adaptive equalization circuit 80 determines the tap coefficients of the second equalization circuit 50 at t=1. The kth tap's tap coefficient C2_1(k) of the second equalization circuit 50 is updated as follows:

$$C2\_1(k)=C2\_0(k)+\Delta(k) \text{ where } 0 \leq k \leq 23$$

Thus, equalization is done by using an overall transfer characteristic, which is given as a product of the transfer characteristic of the first equalization circuit 10 and the transfer characteristic of the second equalization circuit 50 as follows:

Overall transfer characteristic=Transfer characteristic of the first equalization circuit×Transfer characteristic of the second equalization circuit Indeed, since the transfer characteristic of the first equalization circuit 10 is a flat characteristic at this point of time, the overall transfer characteristic is equal to the transfer characteristic of the second equalization circuit 50.

Figure 37:
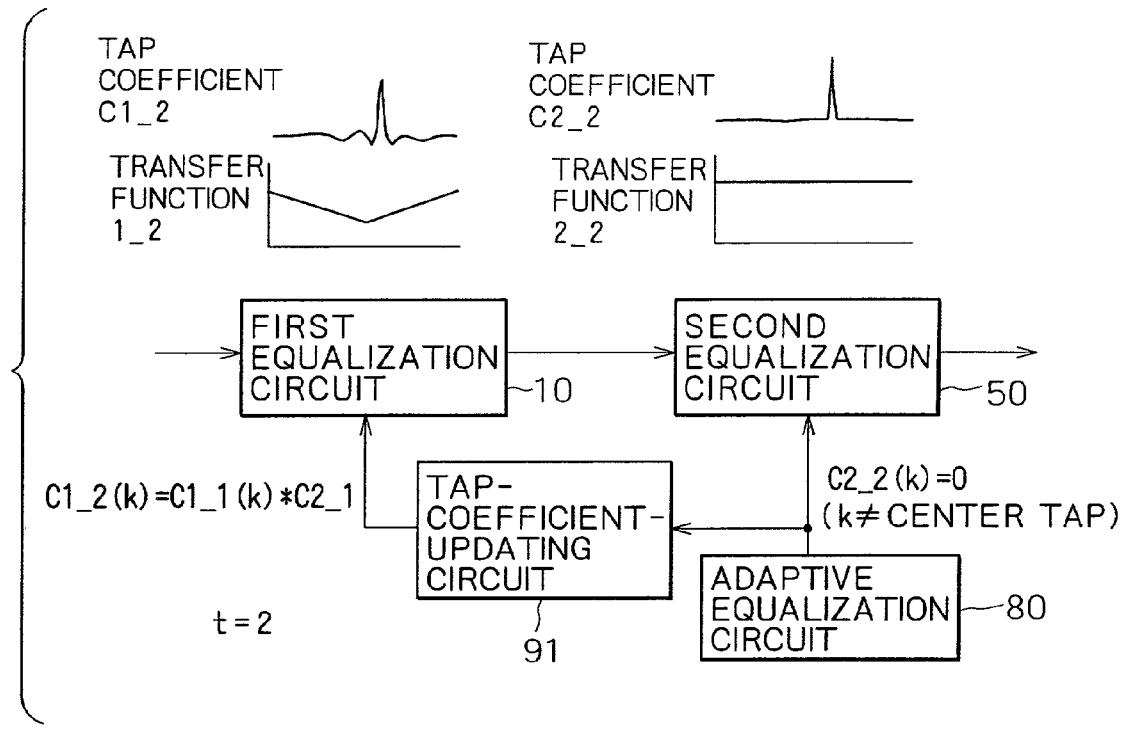
FIG. 37 is a diagram showing a model of a typical updating operation carried out by the equalization circuit at t=2.

FIG. 37 is a diagram showing a state at t=2. In the state of t=2, the count value of the update trigger counter 913 is 2, which is an even number. Thus, the update signal and the flattening signal are output. As a result, the components carry out operations as follows.

The tap-coefficient memory 912 is updated. The kth tap's tap coefficient C1_2(k) of the first equalization circuit 10 is given as follows:

$$C1\_2(k)=C1\_1(k)*C2\_1(k)$$

where the symbol * represents a convolutional-integration operator. As is obvious from the above equation, the tap coefficient C1_2(k) of the first equalization circuit 10 is a convolutional-integration result of the tap coefficient C1_1(k) of the first equalization circuit 10 and the tap coefficient C2_1(k) of the second equalization circuit 50.

In addition, the flattening signal is output:

$$C2\_2(k)=0 \ (k \neq \text{center tap})$$

That is to say, the transfer characteristic of the second equalization circuit 50 is flattened by the adaptive equalization circuit 80.

Since the transfer characteristic of the second equalization circuit 50 is a flat characteristic at this point of time, the overall transfer characteristic is equal to the transfer characteristic of the first equalization circuit 10.

Figure 38:
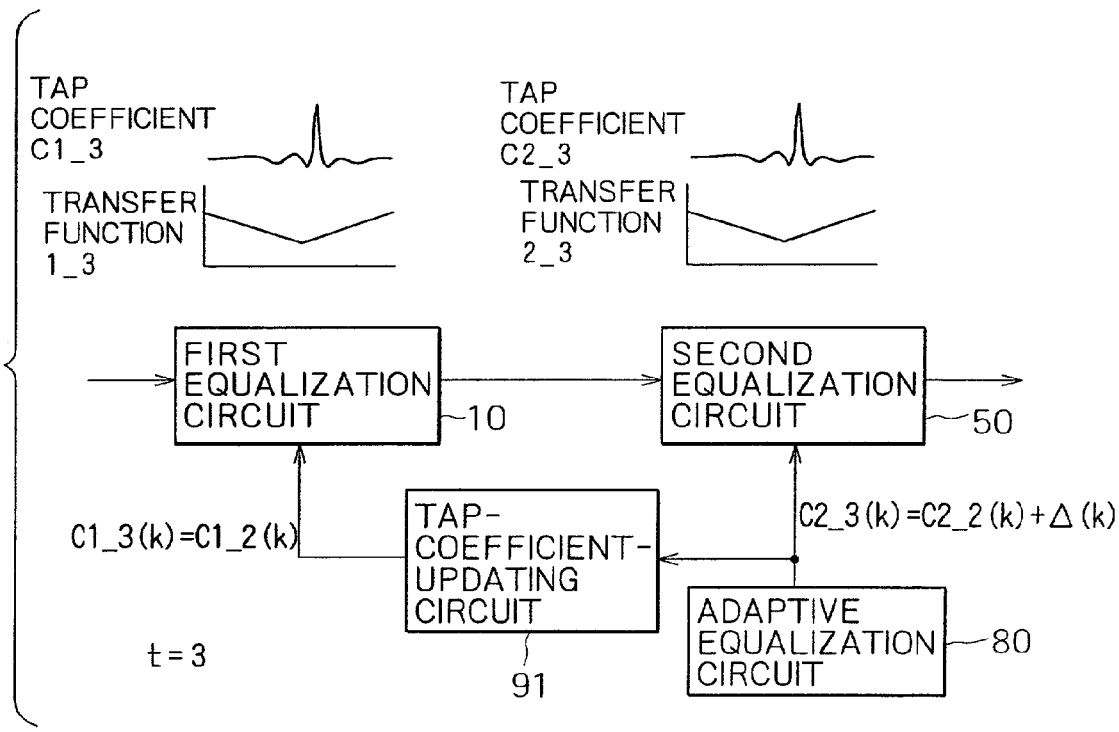
FIG. 38 is a diagram showing a model of a typical updating operation carried out by the equalization circuit at t=3.

FIG. 38 is a diagram showing a state at t=3. In the state of t=3, the count value of the update trigger counter 913 is 3, which is an odd number. Thus, the update signal and the flattening signal are not output. As a result, the components carry out operations as follows.

Since the tap-coefficient memory 912 does not operate, the kth tap's tap coefficient C1_3(k) of the first equalization circuit 10 is given as follows:

$$C1\_3(k)=C1\_2(k)$$

As is obvious from the above equation, the kth tap's tap coefficient C1_3(k) retains the value held at t=2.

In addition, the adaptive equalization circuit 80 updates the kth tap's tap coefficient C2_3(k) of the second equalization circuit 50 as follows:

$$C2\_3(k)=C2\_2(k)+\Delta(k) \text{ where } 0 \leq k \leq 23$$

Figure 39:
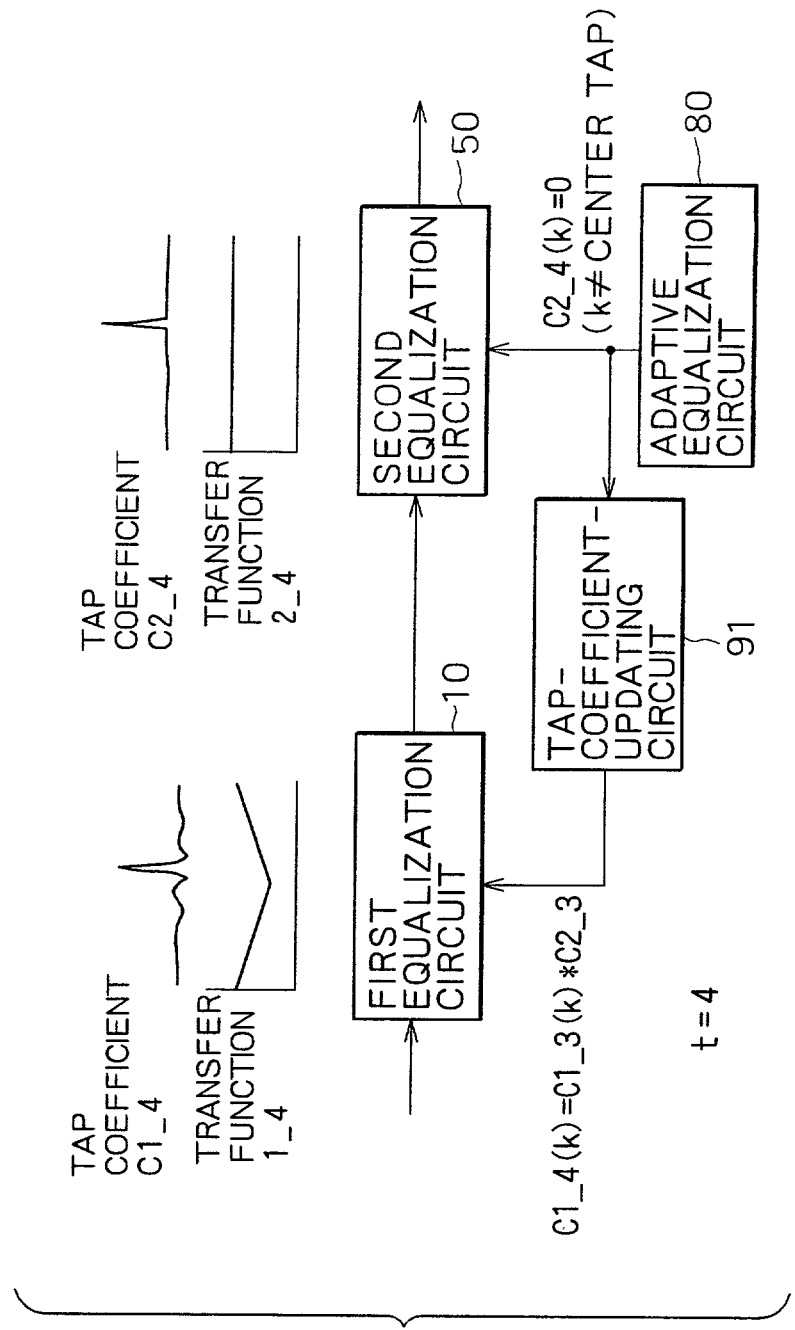
FIG. 39 is a diagram showing a model of a typical updating operation carried out by the equalization circuit at t=4.

Thus, for t=3, equalization is done by using an overall transfer characteristic, which is given as a product of the transfer characteristic of the first equalization circuit 10 and the transfer characteristic of the second equalization circuit 50 as follows:

Overall transfer characteristic=Transfer characteristic of the first equalization circuit×Transfer characteristic of the second equalization circuit FIG. 39 is a diagram showing a state at t=4. In the state of t=4, the count value of the update trigger counter 913 is 4, which is an even number. Thus, the update signal and the flattening signal are output. As a result, the components carry out operations as follows.

The tap-coefficient memory 912 is updated. The kth tap's tap coefficient C1_4(k) of the first equalization circuit 10 is given as follows:

$$C1\_4(k)=C1\_3(k)*C2\_3(k)$$

where the symbol * represents a convolutional-integration operator. As is obvious from the above equation, the tap coefficient C1_4(k) of the first equalization circuit 10 is a convolutional-integration result of the tap coefficient C1_3(k) of the first equalization circuit 10 and the tap coefficient C2_3(k) of the second equalization circuit 50.

In addition, the flattening signal is output:

$$C2\_4(k)=0 \ (k \neq \text{center tap})$$

That is to say, the transfer characteristic of the second equalization circuit 50 is flattened by the adaptive equalization circuit 80.

Since the transfer characteristic of the second equalization circuit 50 is a flat characteristic at this point of time, the overall transfer characteristic is equal to the transfer characteristic of the first equalization circuit 10.

The algorithm described above can be summarized as follows:

Initialization at the start of the operation (t=0):
  (1) The transfer characteristic of the first equalization circuit is flattened.
  (2) The transfer characteristic of the second equalization circuit is flattened.

TABLE 7

| (Operation for t = odd number) | |
| --- | --- |
| C1_i + 1(k) = C1_i(k) | The first equalization circuit: Retain |
| C2_i + 1(k) = C2_i(k) + Δ(k) | The second equalization circuit: Update |

TABLE 8

| (Operation for t = even number) | |
| --- | --- |
| C1_i + 1(k) = C1_i(k) * C2_i(k) | The transfer characteristic of the first equalization circuit = overall transfer characteristic |
| C2_i + 1(k) = 0 (k ≠ center tap) | The transfer characteristic of the second equalization circuit is flattened |

Figure 40:
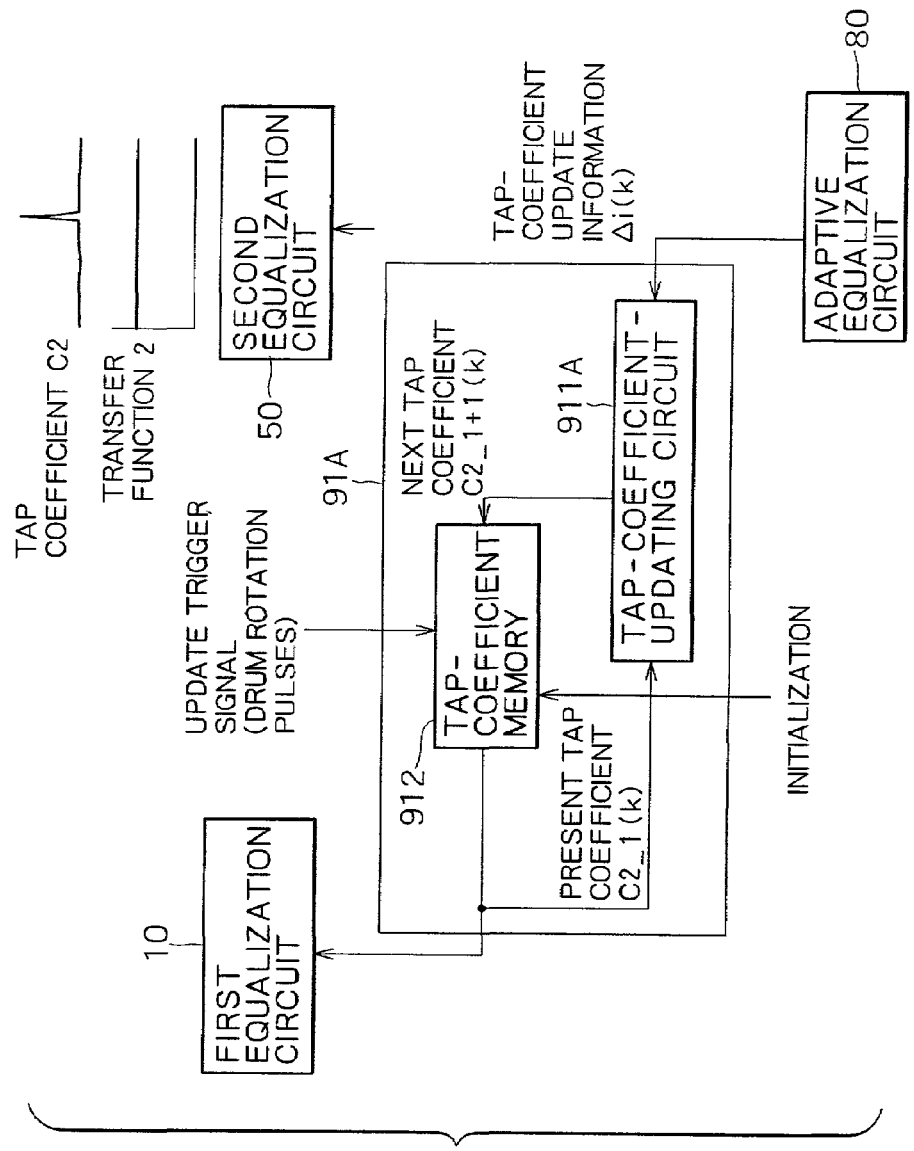
FIG. 40 is a block diagram showing another typical configuration of the tap-coefficient-updating circuit.

The tap-coefficient-updating circuit 91 employed in the tap-coefficient-transforming circuit 90 shown in FIGS. 31 and 32 can be simplified into a configuration shown in FIG. 40.

To put it in detail, by having the tap-coefficient-updating circuit 91A shown in FIG. 40 fix the transfer characteristic of the second equalization circuit 50 at a flat characteristic, the update trigger counter 913 shown in FIG. 33 can be eliminated. In addition, tap-coefficient-updating information Δi(k) output by the adaptive equalization circuit 80 is applied to the first equalization circuit 10.

The tap-coefficient-updating information Δi(k) output by the adaptive equalization circuit 80 indicates whether to increase or decrease the value of the tap coefficient of the kth tap. Thus, even if the tap-coefficient-updating information Δi(k) output by the adaptive equalization circuit 80 is applied to the first equalization circuit 10, the transfer characteristic is updated correctly and the adaptive equalization is also carried out correctly as well.

Moreover, in the case of a transversal filter with a flattened transfer characteristic, an unnecessary multiplication circuit and an unnecessary addition circuit can be eliminated. Furthermore, the registers can also be eliminated to allow direct links with the input and the output. Thus, the second equalization circuit 50 shown in FIG. 40 can be omitted to a configuration shown in FIG. 42. An example of the transversal filter with a flattened transfer characteristic is a 12-taps transversal filter with a flat transfer characteristic having only the tap coefficient k6 of the 6$^{th}$ tap set at 1 and all other tap coefficients set at zero as shown in FIG. 41.

Figure 41:
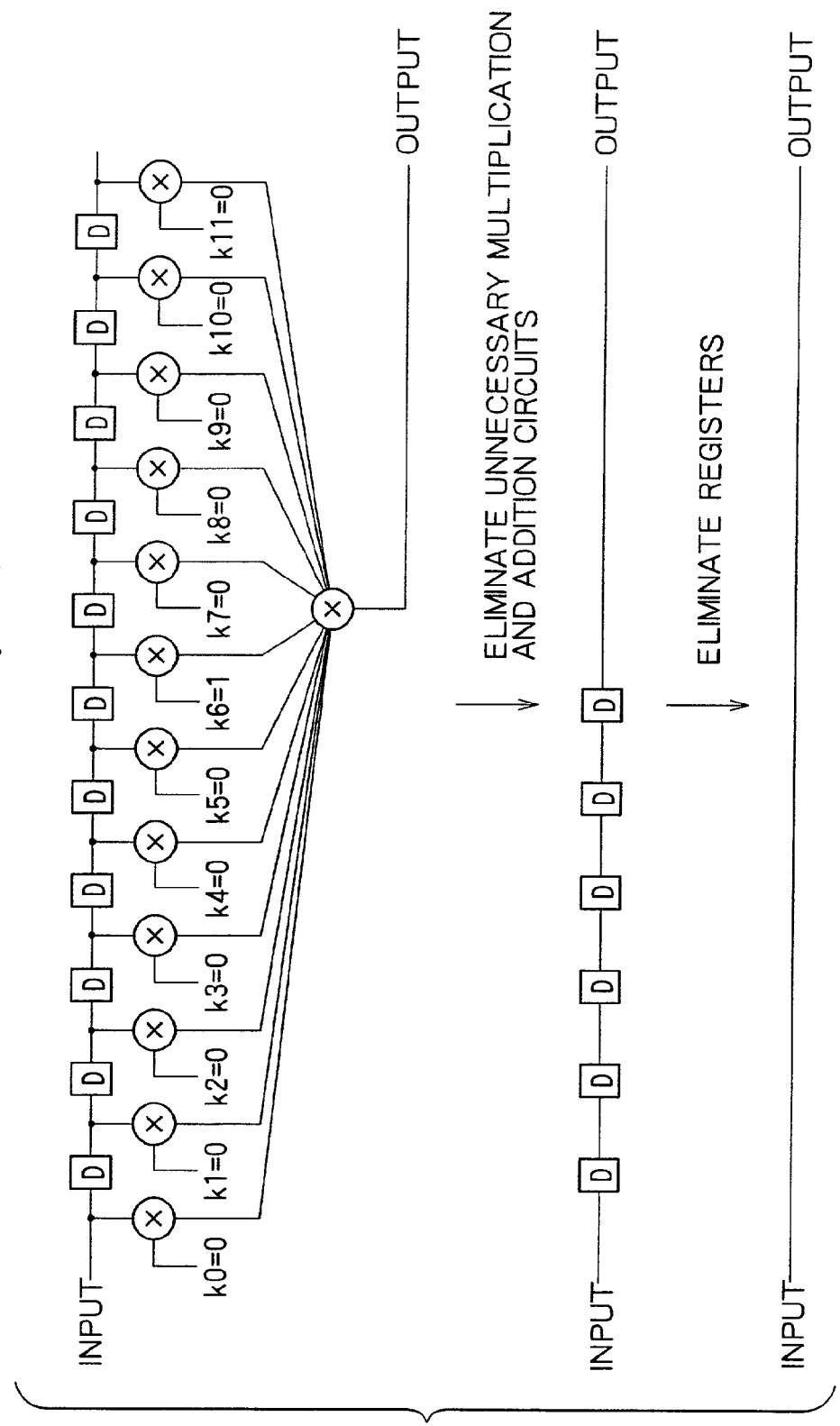
FIG. 41 is an explanatory diagram showing a transversal filter having a flattened transfer characteristic.
Figure 42:
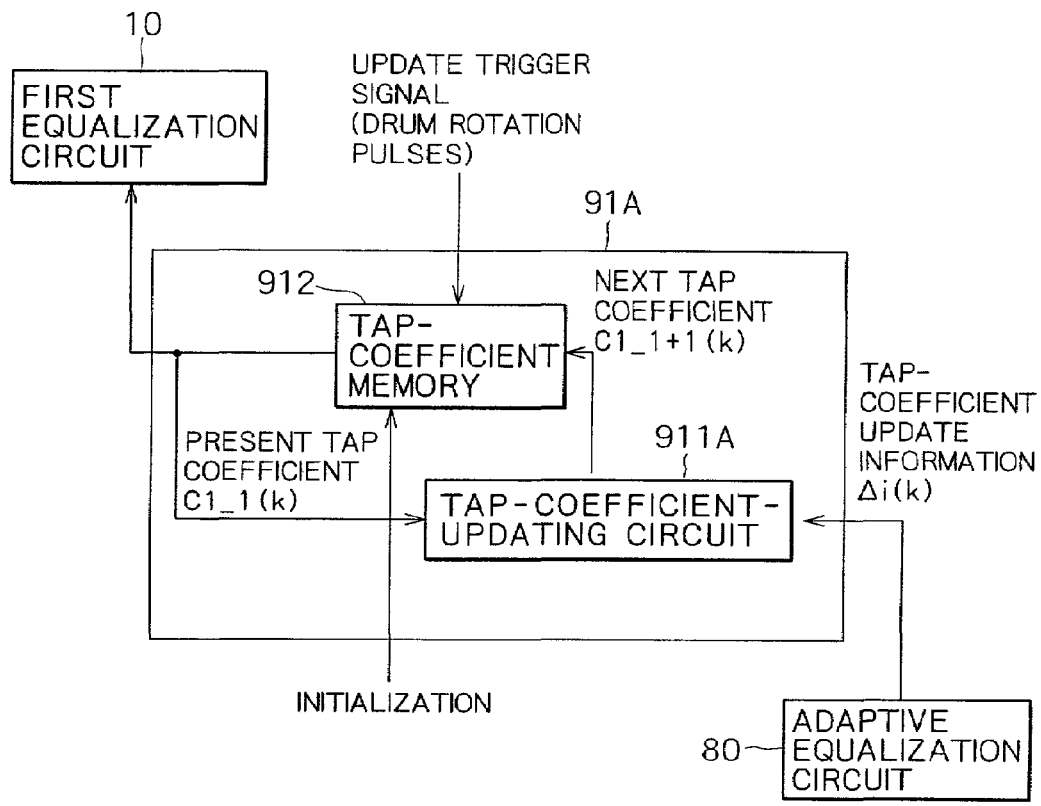
FIG. 42 is a block diagram showing a further typical configuration of the tap-coefficient-updating circuit.
Figure 43:
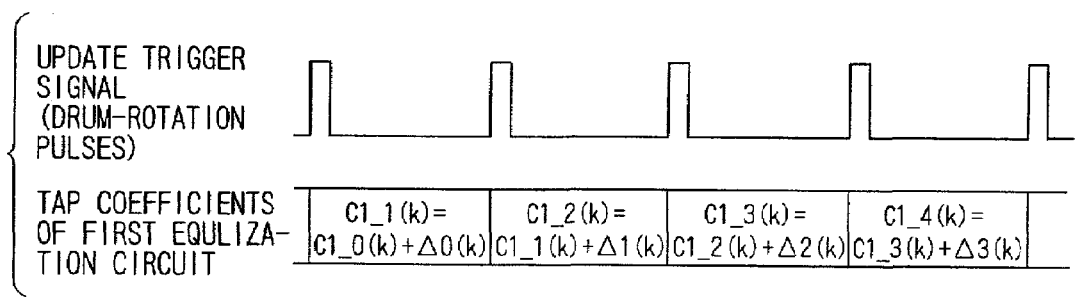
FIG. 43 is time charts representing the operation of the tap-coefficient-updating circuit shown in FIG. 42.

The tap-coefficient-updating circuit 91A shown in FIGS. 41 and 42 carries out operations represented by a timing chart shown in FIG. 43. A tap-coefficient-updating circuit 911A updates the kth tap's tap coefficient C1_i+1(k) of the first equalization circuit 10 on the edge of a pulse of every drum rotation in accordance with the following equation:

$$C1\_i+1(k)=C1\_i(k)+\Delta i(k)$$

Figure 44:
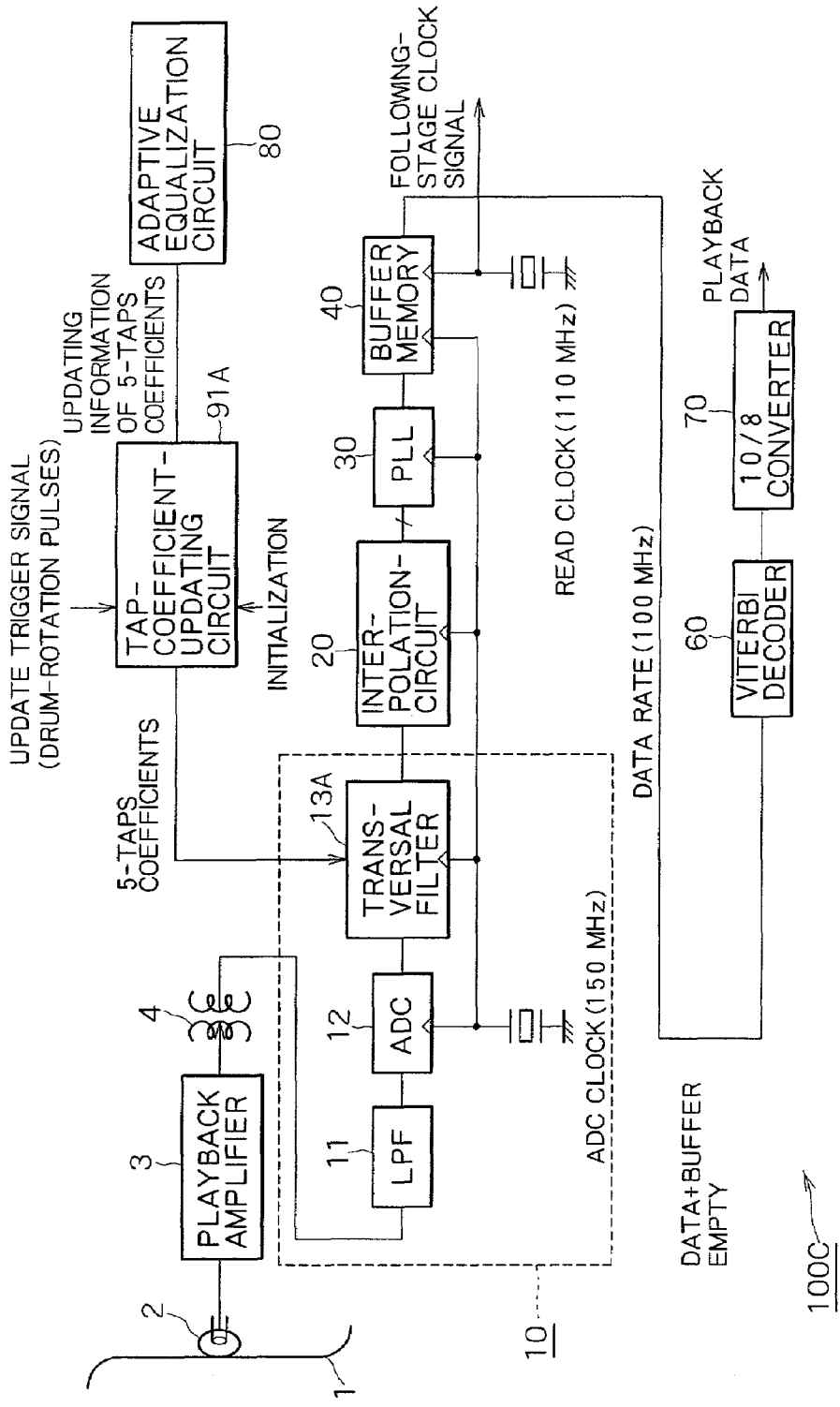
FIG. 44 is a block diagram showing another typical configuration of the playback system of the tape streamer provided by the present invention.
Figure 45:
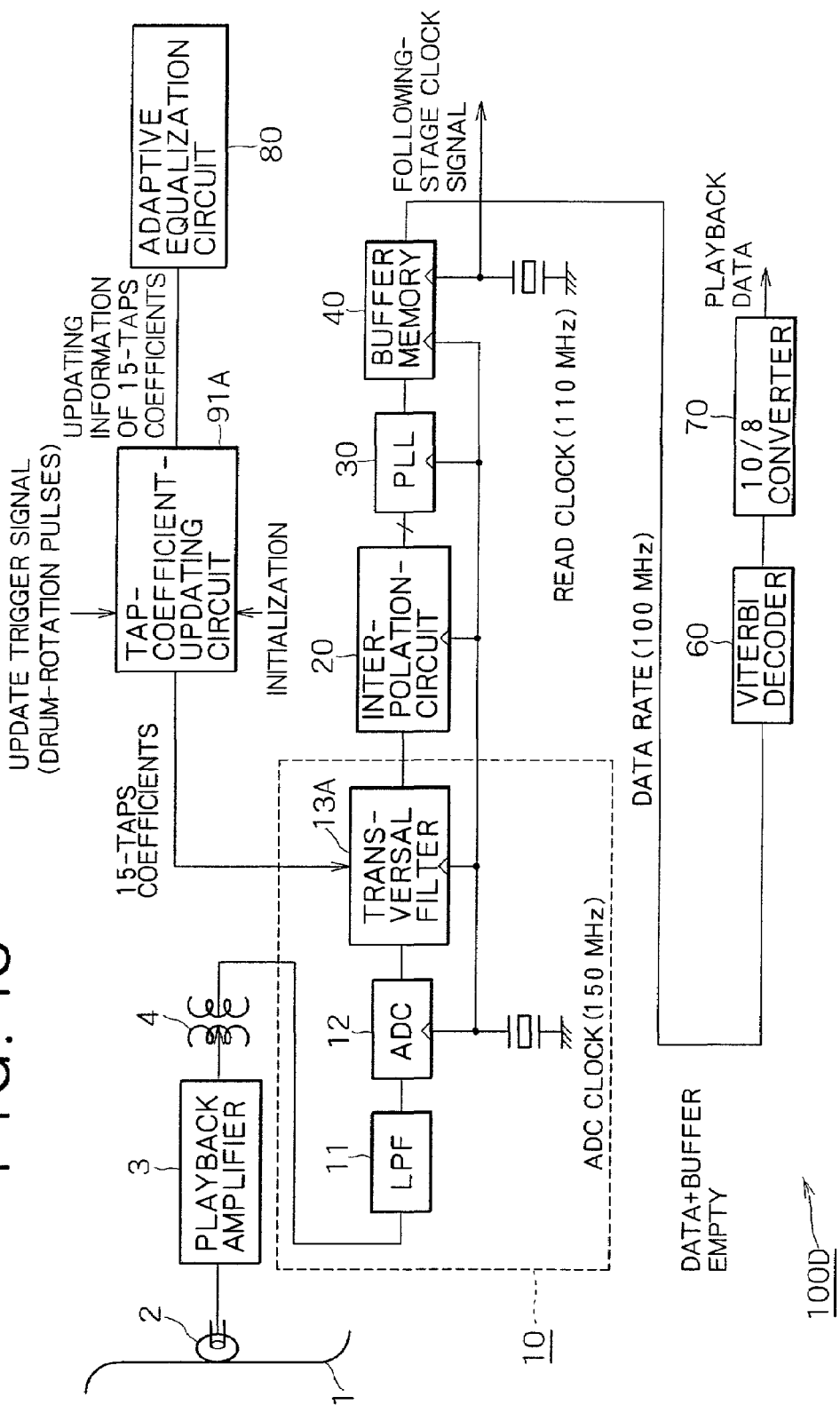
FIG. 45 is a block diagram showing a further typical configuration of the playback system of a tape streamer provided by the present invention.

By employing the tap-coefficient-updating circuit 91A with such a configuration, the playback system 100A shown in FIG. 31 and the playback system 100B shown in FIG. 32 can be simplified respectively to a playback system 100C shown in FIG. 44 and a playback system 100D shown in FIG. 45.

The following description explains an example to implement an overall transfer characteristic by a convolutional-integration result of tap coefficients.

In general, an overall transfer characteristic is found by computing a product of two transfer characteristics in accordance with the following procedure.

1. Apply discrete Fourier transformation to the tap coefficients of the first equalization circuit to find a frequency response H$_1$(w) of the transfer characteristic of the first equalization circuit, where notation w denotes an angular frequency.
2. Apply the discrete Fourier transformation to the tap coefficients of the second equalization circuit to find a frequency response H$_2$(w) of the transfer characteristic of the second equalization circuit.
3. Find an overall frequency response H(w) in accordance with the following equation:

$$H(w)=H_1(w) \times H_2(w)$$

4. Apply the discrete inverse Fourier transformation to the overall frequency response H(w) to find next tap coefficients of the first equalization circuit.

In the embodiment employing a transversal filter, however, the tap coefficients representing the overall transfer characteristic are found as follows:

Tap coefficients representing the overall transfer
characteristic=Convolutional-integration result of
tap coefficients of the first equalization circuit and
tap coefficients of the second equalization circuit.

Thus, a Fourier-transformation circuit can be eliminated.

Figure 46A:
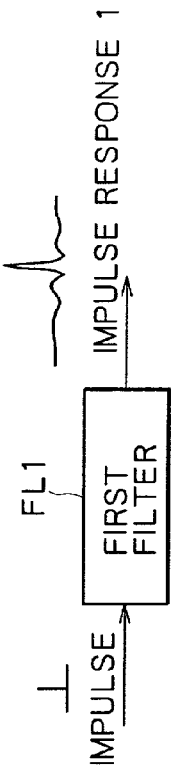
FIGS. 46A to 46C are explanatory diagrams showing impulse-response characteristics exhibited by the playback system of the tape streamer provided by the present invention.
Figure 46B:
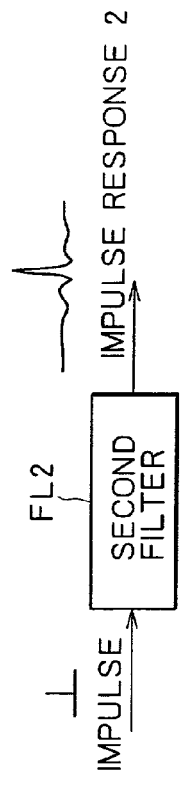
Figure 46C:
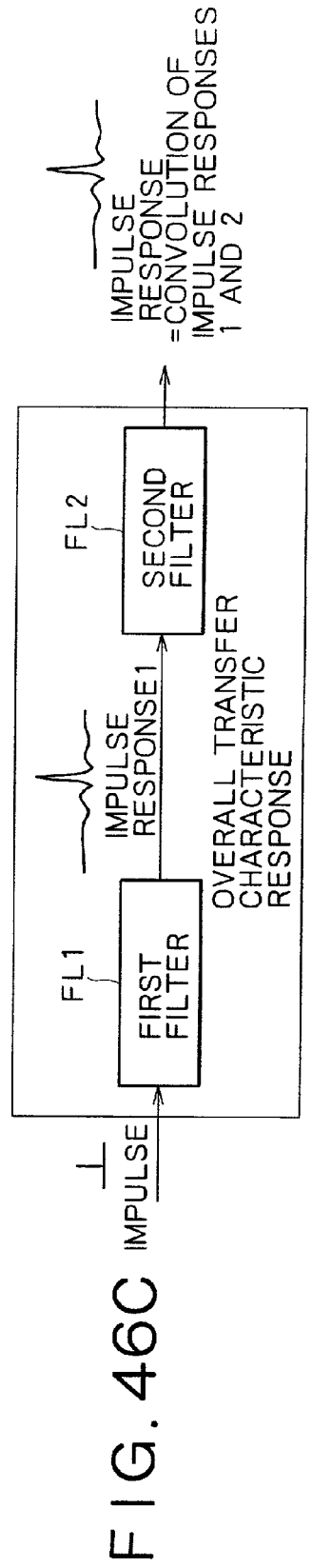

Let a first filter FL1 have impulse-response characteristic 1 as shown in FIG. 46A and a second filter FL2 have impulse-response characteristic 2 as shown in FIG. 46B. The first filter FL1 and the second filter FL2 are connected to each other in series to form a series-connection filter with the second filter FL2 provided at a stage following the first filter FL1 as shown in FIG. 46C. An impulse response of the series-connection filter is a response of the second filter FL2 to an impulse response of the first filter FL1. The impulse response of the series-connection filter is given as follows:

Impulse response of series-connection filter=Impulse
response of first filter FL1*Impulse response of
second filter FL2, where the symbol * denotes the convolutional-integration operator.

As is obvious from the above equation, the overall impulse response of the series-connected filter is equal to the convolutional-integration result of the impulse responses of the individual component filters.

Since this embodiment employs a transversal filter, the input response of an individual component filter is equal to its tap coefficients. Thus, by finding a convolution product of tap coefficients of the first equalization circuit 10 and tap coefficients of the second equalization circuit 50, it is possible to obtain tap coefficients representing the overall transfer characteristic.

FIGS. 47 to 53 are diagrams each showing a typical processing result.

Figure 47:
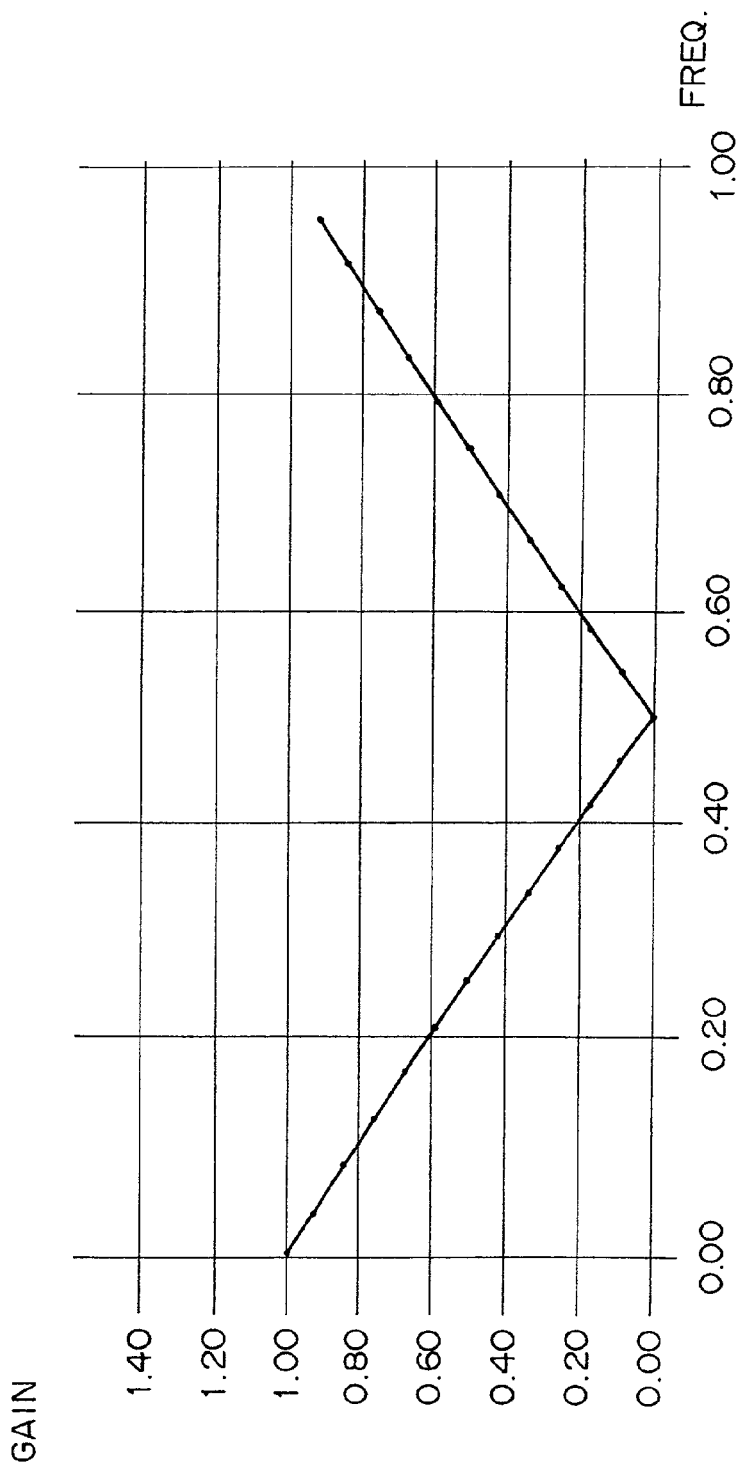
FIG. 47 is a diagram showing a typical frequency response of the transfer characteristic of a first equalization circuit at t=i.

To be more specific, FIG. 47 is a diagram showing a typical frequency response of the transfer characteristic of the first equalization circuit 10 at t=i−1.

Figure 48:
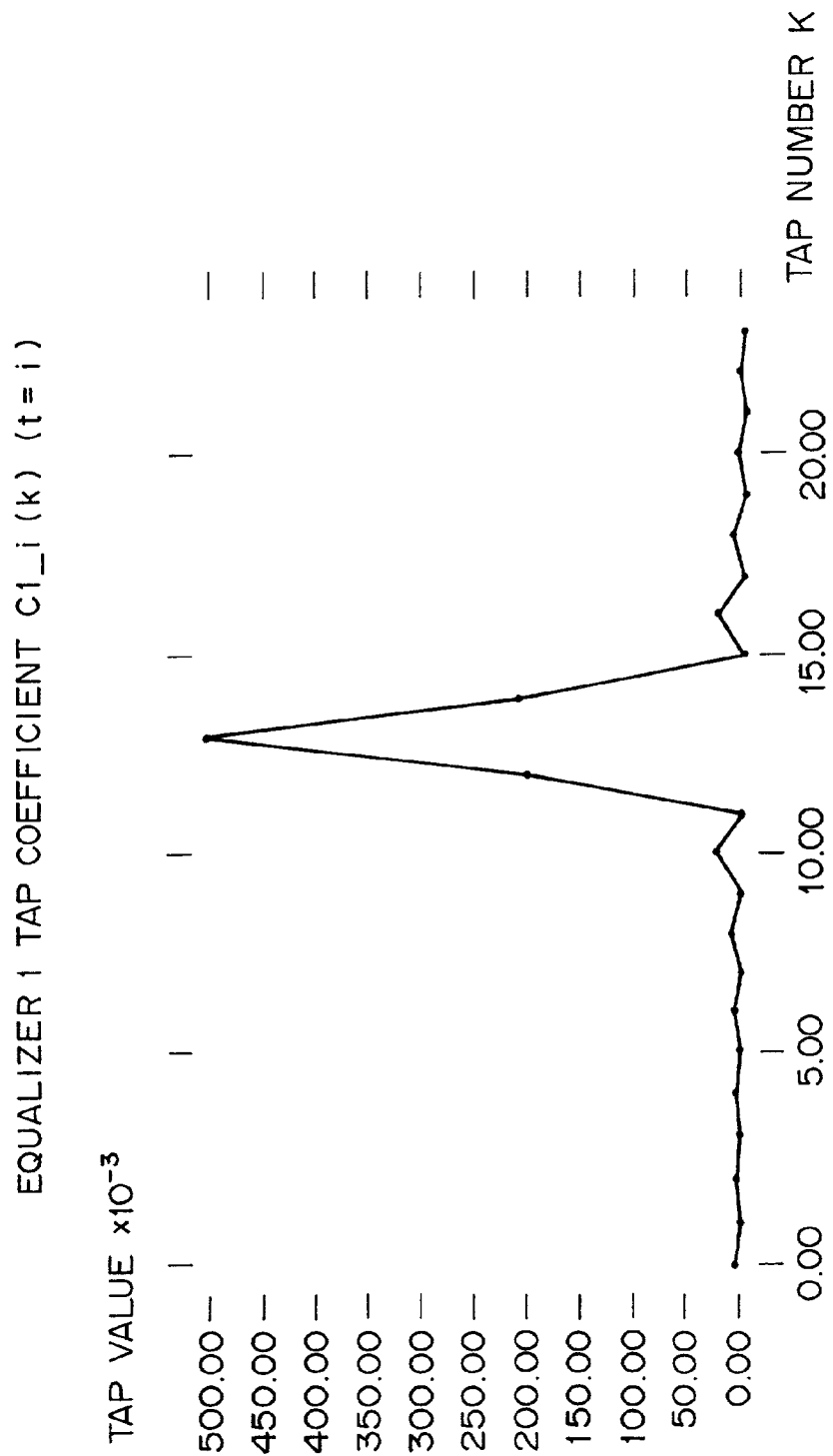
FIG. 48 is a diagram showing typical tap coefficients of the first equalization circuit at t=i.

FIG. 48 is a diagram showing a typical tap coefficient of the first equalization circuit 10 at t=i− 1. The tap coefficient corresponds to the tap coefficient C1_i(k) of the kth tap. The tap coefficient is computed by applying the discrete inverse Fourier transformation to the typical frequency response shown in FIG. 47.

Figure 49:
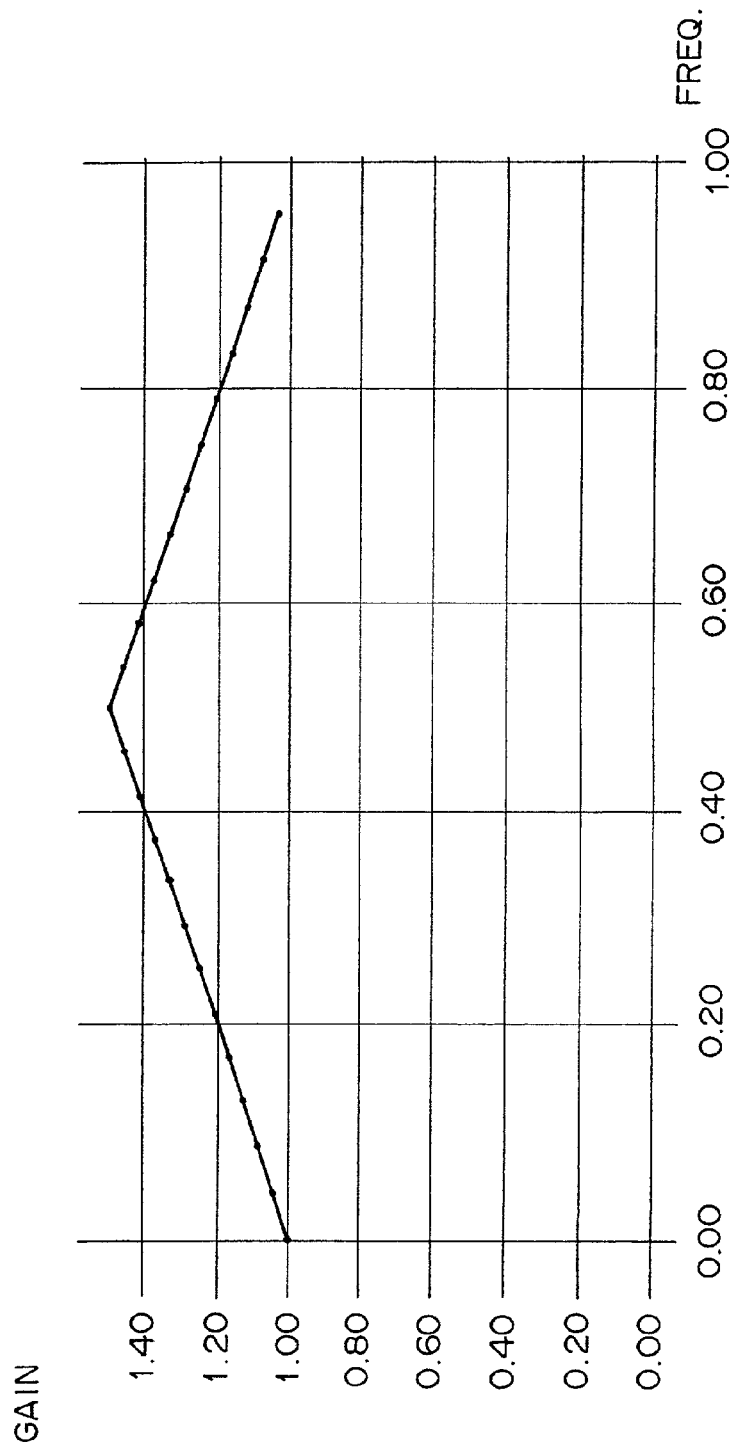
FIG. 49 is a diagram showing a typical frequency response of the transfer characteristic of a second equalization circuit at t=i.

FIG. 49 is a diagram showing a typical frequency response of the transfer characteristic of the second equalization circuit 50 at t=i.

Figure 50:
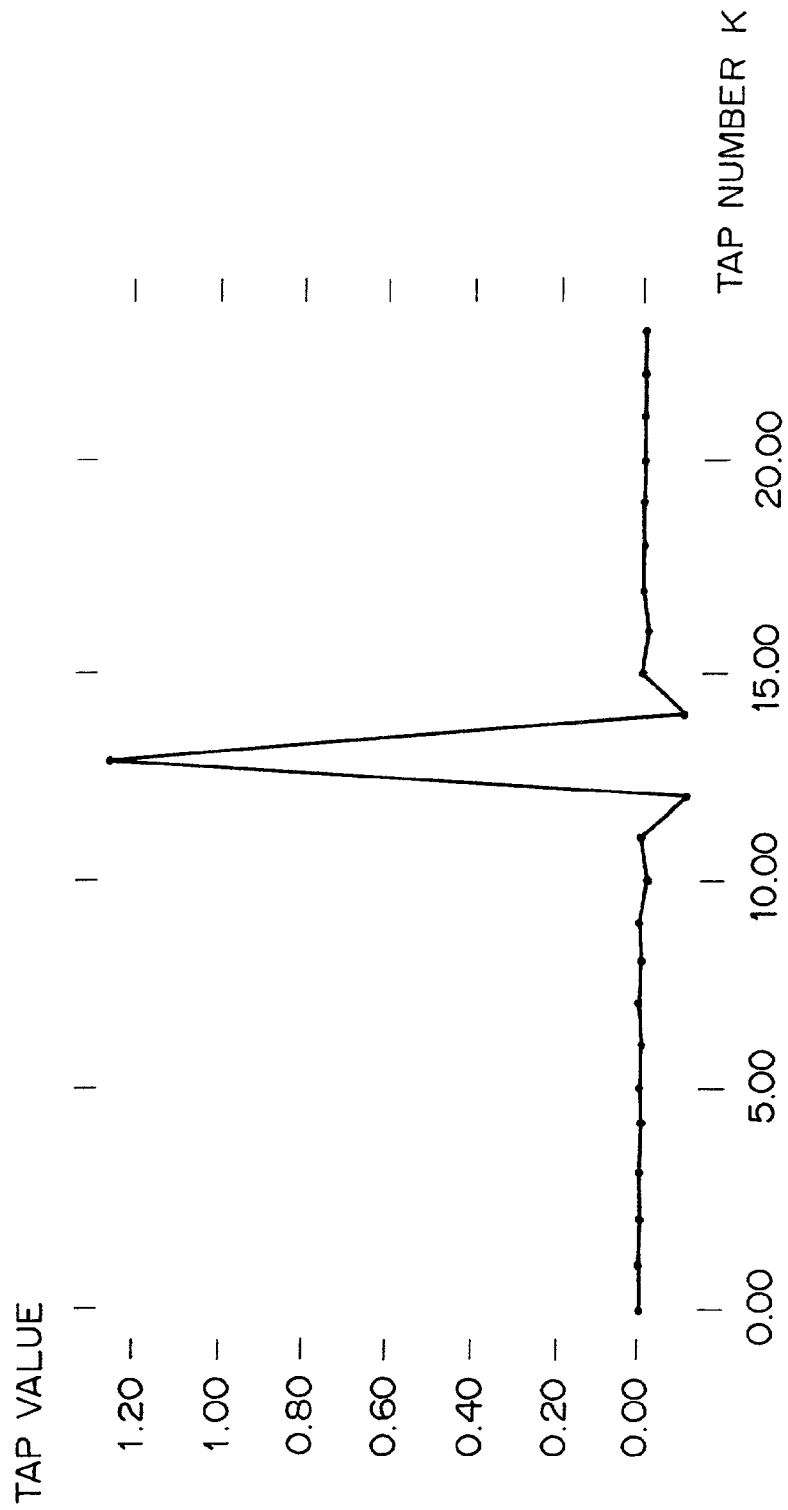
FIG. 50 is a diagram showing typical tap coefficients of the second equalization circuit at t=i.

FIG. 50 is a diagram showing a typical tap coefficient of the second equalization circuit 50 at t=i. The tap coefficient is the tap coefficient C2_i(k) of the kth tap. The tap coefficient is computed by applying the discrete inverse Fourier transformation to the typical frequency response shown in FIG. 49.

Figure 51:
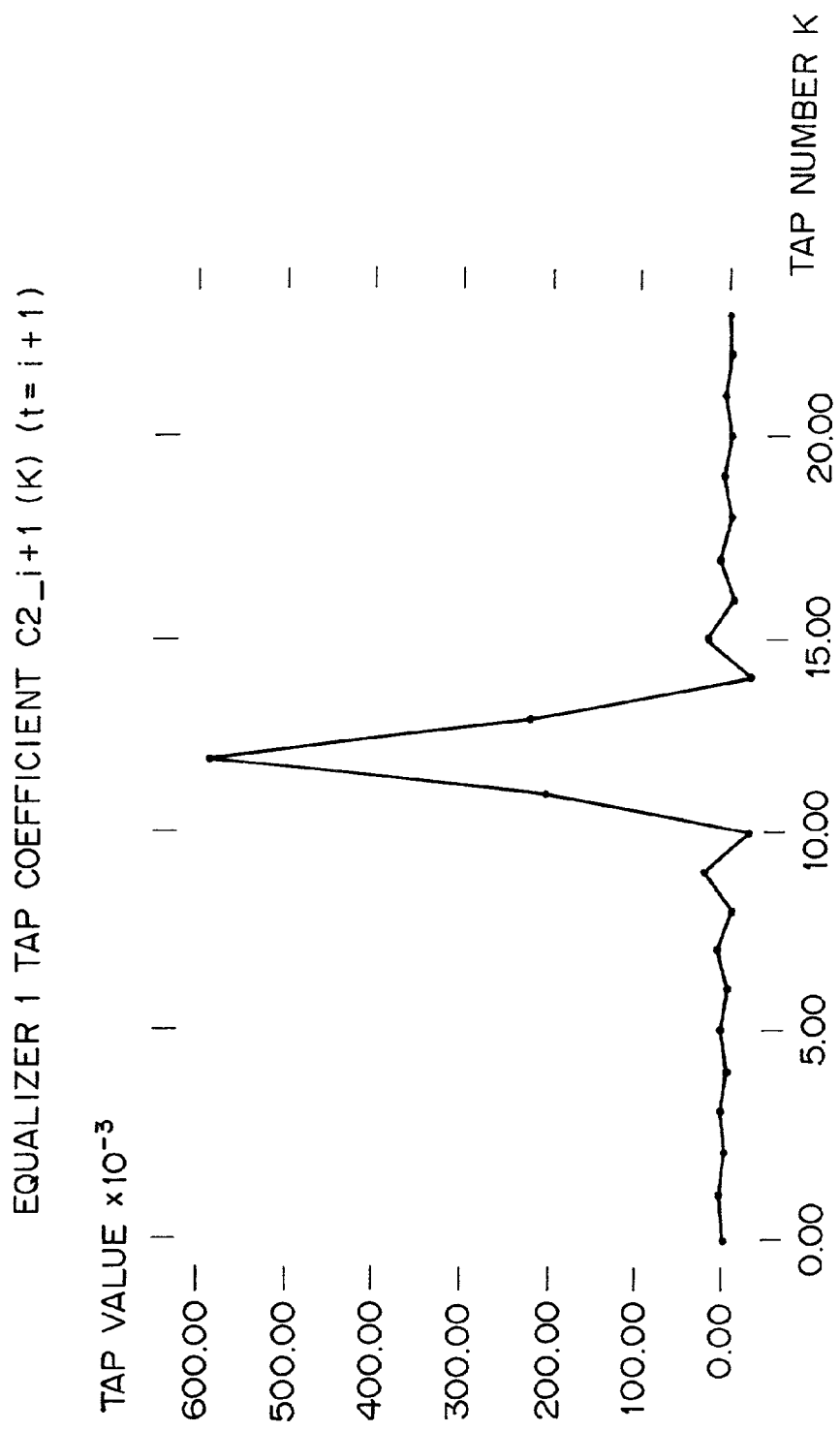
FIG. 51 is a diagram showing a convolutional-integration result of a tap coefficient $C1_{13}$ i(k) and a tap coefficient $C2_{13}$ i(k)

FIG. 51 is a diagram showing a conventional-integration result of the tap coefficient C1_i(k) and the tap coefficient C2_i(k). The conventional-integration result is used as a next tap coefficient C1_i+1(k) of the first equalization circuit 10.

Figure 52:
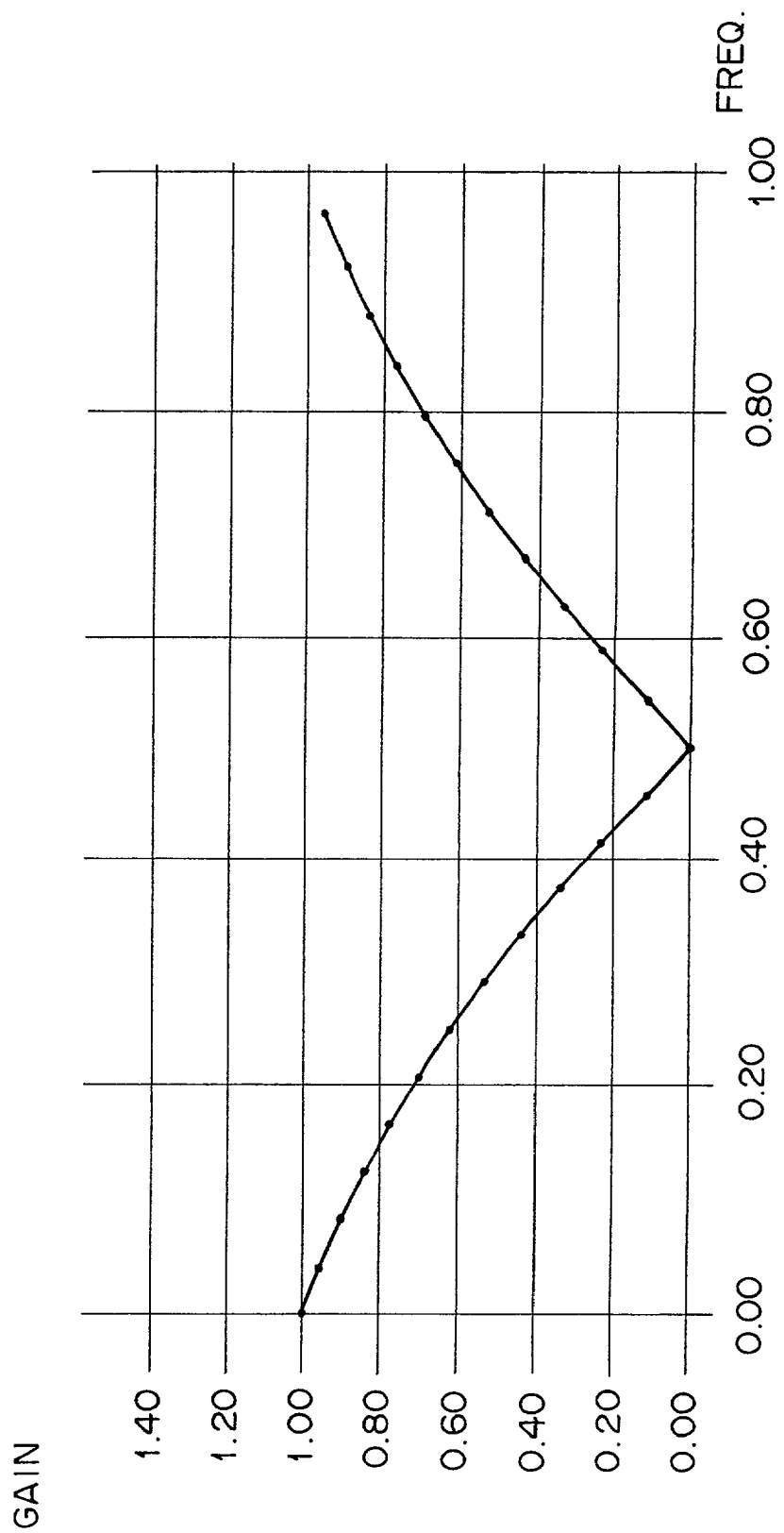
FIG. 52 is a diagram showing an overall transfer characteristic's frequency response computed by applying the discrete Fourier transformation to a next tap coefficient $C1_{13}$ i+1(k)

FIG. 52 is a diagram showing a frequency response of an overall transfer characteristic. The frequency response is computed by applying the discrete Fourier transformation to the next tap coefficient C1_i+1(k).

Figure 53:
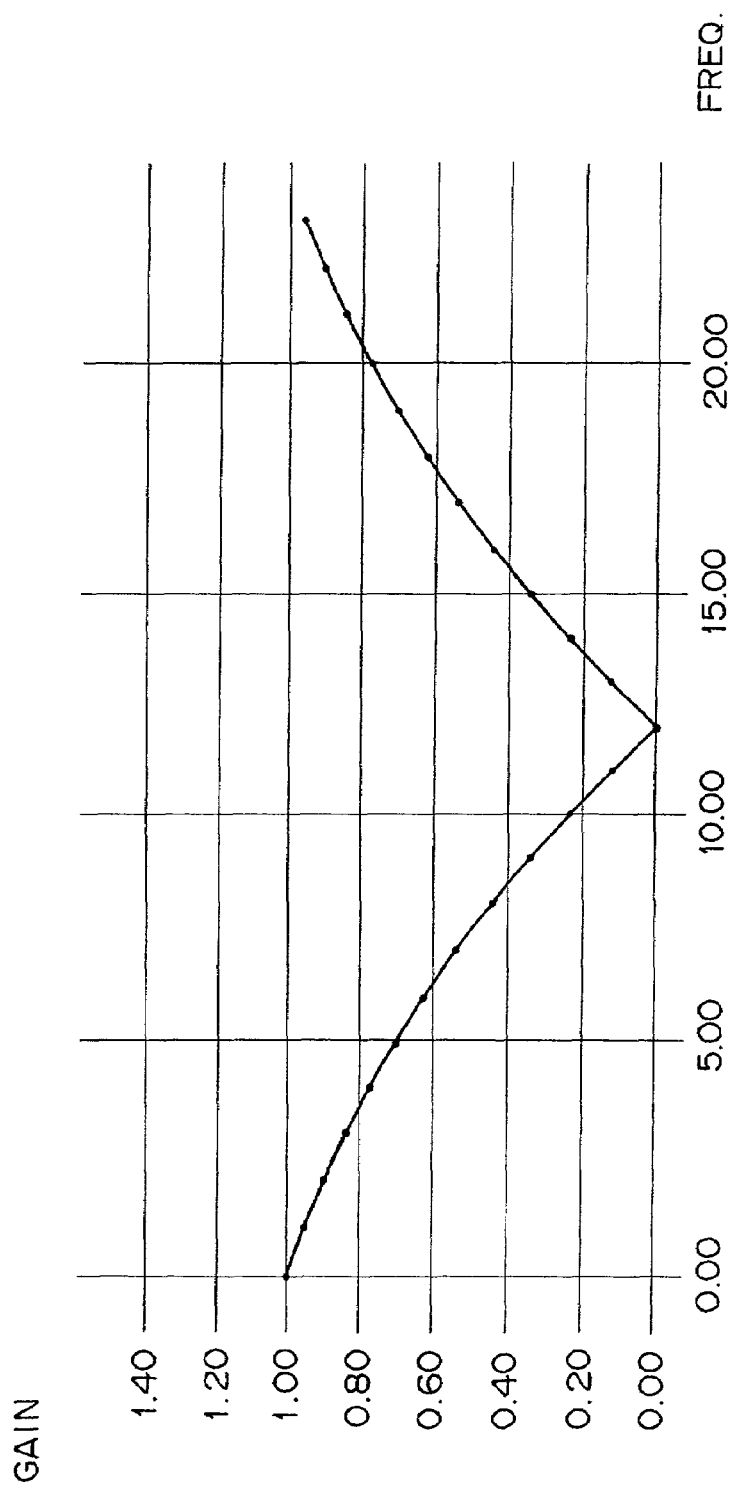
FIG. 53 is a diagram showing an overall transfer characteristic's frequency response computed by multiplying the first equalization circuit's transfer-characteristic frequency response shown in FIG. 47 by the second equalization circuit's transfer-characteristic frequency response shown in FIG. 49 for verifying that the overall transfer characteristic's frequency response shown in FIG. 52 is correct.

FIG. 53 is a diagram showing a frequency response of an overall transfer characteristic. The frequency response is computed by multiplying the frequency response shown in FIG. 47 by the frequency response shown in FIG. 49. As described above, the frequency response shown in FIG. 47 is the frequency response of the transfer characteristic of the first equalization circuit 10 and the frequency response shown in FIG. 49 is the frequency response of the transfer characteristic of the second equalization circuit 50. The frequency response shown in FIG. 53 is computed for verifying that the frequency response of overall transfer characteristic shown in FIG. 52 is correct.

It is obvious that the frequency response shown in FIG. 52 is identical with the frequency response shown in FIG. 53. As described above, the frequency response shown in FIG. 52 is a convolutional-integration result of tap coefficients while the frequency response shown in FIG. 53 is a product of frequency responses.

Figure 54:
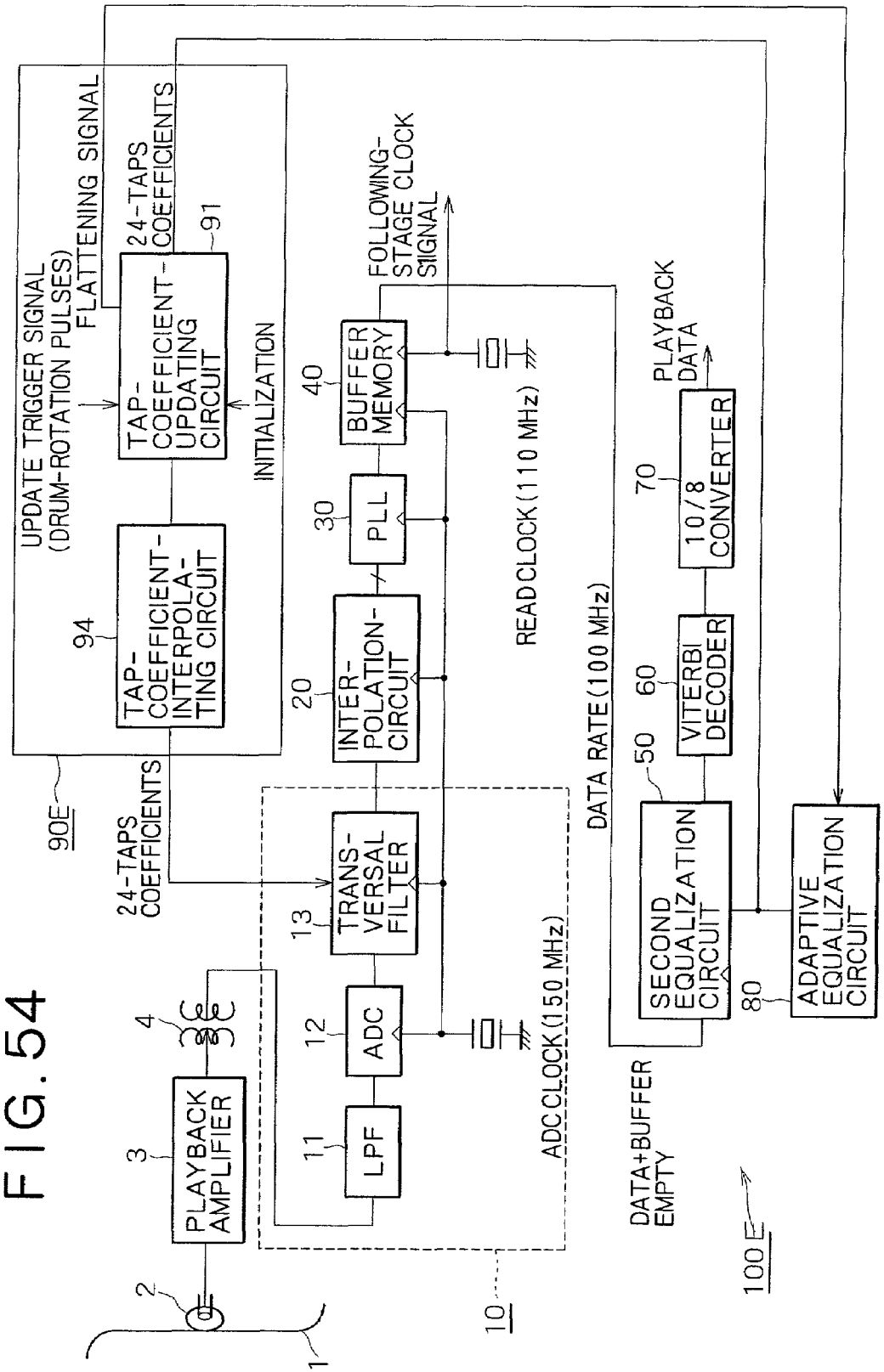
FIG. 54 is a block diagram showing the configuration of a tap-coefficient-transforming circuit for a case in which the sampling frequency of the first equalization circuit is different from a channel clock frequency.

The above description explains a case in which the sampling frequency of the first equalization circuit 10 is approximately equal to the channel clock frequency. However, there is also a case in which the sampling frequency of the first equalization circuit 10 is different from the channel clock frequency. In order to absorb a difference in data rate caused by the difference in frequency, a tap-coefficient-transforming circuit 90E like one shown in FIG. 54 is employed. As shown in the figure, the tap-coefficient-transforming circuit 90E includes the tap-coefficient-updating circuit 91 and a tap-coefficient-interpolating circuit 94.

In the playback system 100E of the tape streamer shown in FIG. 54, there is a difference in data rate. To be more specific, the data rate of the first equalization circuit 10 is 150 MHz while the data rate of the second equalization circuit 50 is 100 MHz. Tap coefficients generated by the tap-coefficient-interpolating circuit 94 are provided for the first equalization circuit 10. The tap coefficients generated by the tap-coefficient-interpolating circuit 94 are obtained by applying 1.5 (=150 MHz/100 MHz)-times interpolation to tap coefficients of the second equalization circuit 50.

It should be noted that, not essentially needed, the tap-coefficient-ending circuit 92 and the zero-adding circuit 93 are eliminated.

Figure 55:
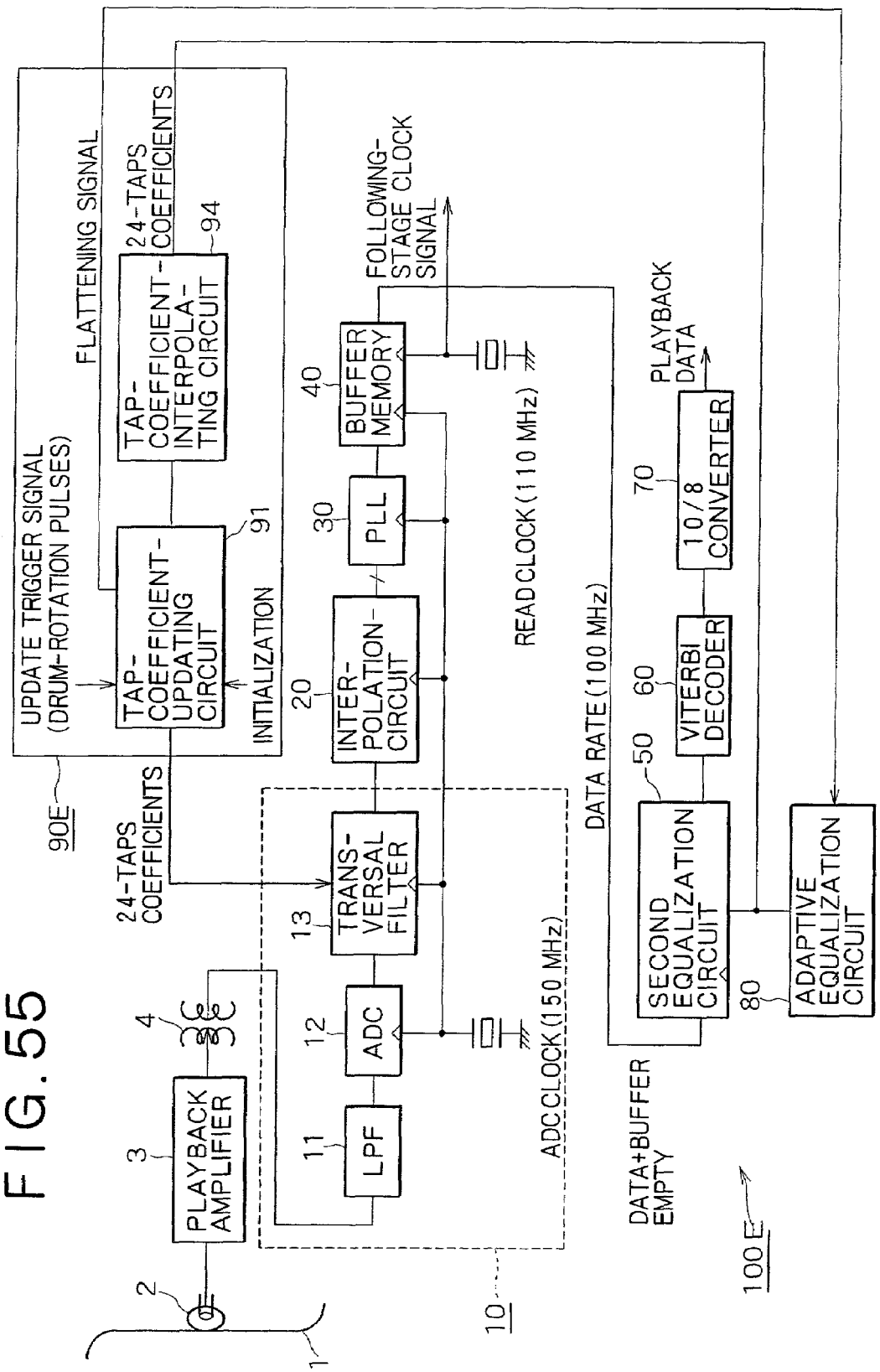
FIG. 55 is a block diagram showing another typical configuration of the tap-coefficient-transforming circuit.

It is also worth noting that, as shown in FIG. 55, the connection arrangement of the tap-coefficient-updating circuit 91 and the tap-coefficient-interpolating circuit 94 can be reversed.

Figure 56:
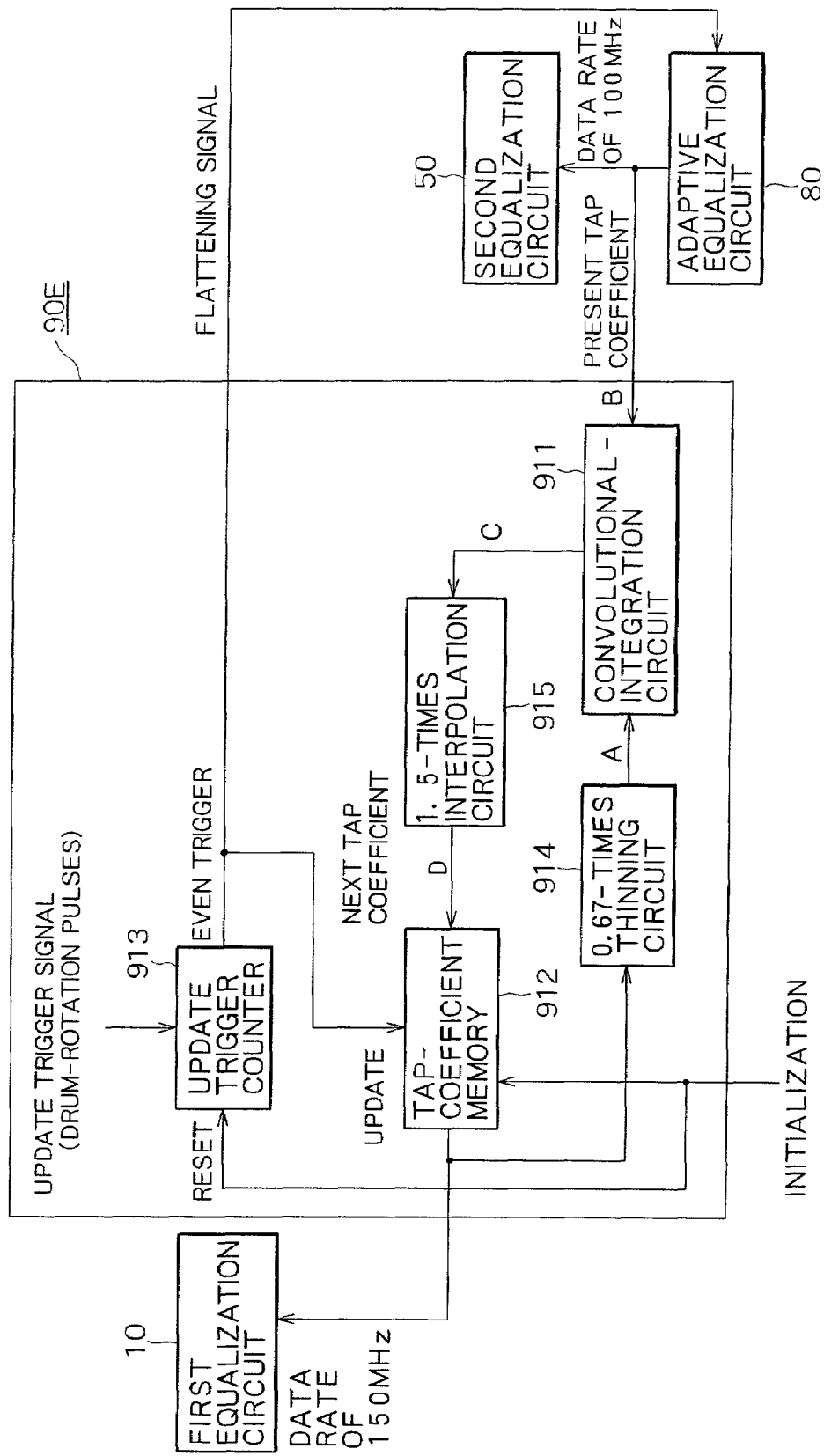
FIG. 56 is a block diagram showing a concrete typical configuration of the tap-coefficient-transforming circuit for a case in which the sampling frequency of the first equalization circuit is different from the channel clock frequency.

FIG. 56 is a diagram concretely showing the tap-coefficient-transforming circuit 90E used in a case in which the sampling frequency of the first equalization circuit 10 is different from the channel clock frequency.

The tap-coefficient-transforming circuit 90E shown in FIG. 56 includes a convolutional-integration circuit 911, a tap-coefficient memory 912, an update trigger counter 913, a 0.67-times thinning circuit 914 and a 1.5-times interpolation circuit 915.

In the tap-coefficient-transforming circuit 90E, the 0.67-times thinning circuit 914 carries out a S2/S1-thinning process, where S2=100 MHz and S1=150 MHz, on present tap coefficients of the first equalization circuit 10 to generate tap coefficients A. The convolutional-integration circuit 911 produces tap coefficients C as a result of convolutional-integration products of the tap coefficients A and present tap coefficients B of the second equalization circuit 50 as follows:

$$C = A * B,$$

where the symbol * denotes the convolutional-integration operator.

Then, the tap coefficients C are subjected to S1/S2-times interpolation in the 1.5-times interpolation circuit 915 to produce tap coefficients D, which are used as next tap coefficients of the first equalization circuit 10.

In the tap-coefficient-transforming circuit 90E, the update trigger counter 913 counts the number of drum-rotation pulses provided as an update trigger signal as is the case with the tap-coefficient-updating circuit 91 shown in FIG. 33. In addition, the tap-coefficient-transforming circuit 90E also receives an initialization signal at the beginning of the operation from a system controller, which is not shown in the figure. The update trigger counter 913 outputs an even-numbered trigger signal as an update signal and a flattening signal.

The tap-coefficient memory 912 latches the tap coefficients D with a timing of the update signal.

A next transfer characteristic of the second equalization circuit 50 is flattened by the flattening signal.

Figure 57:
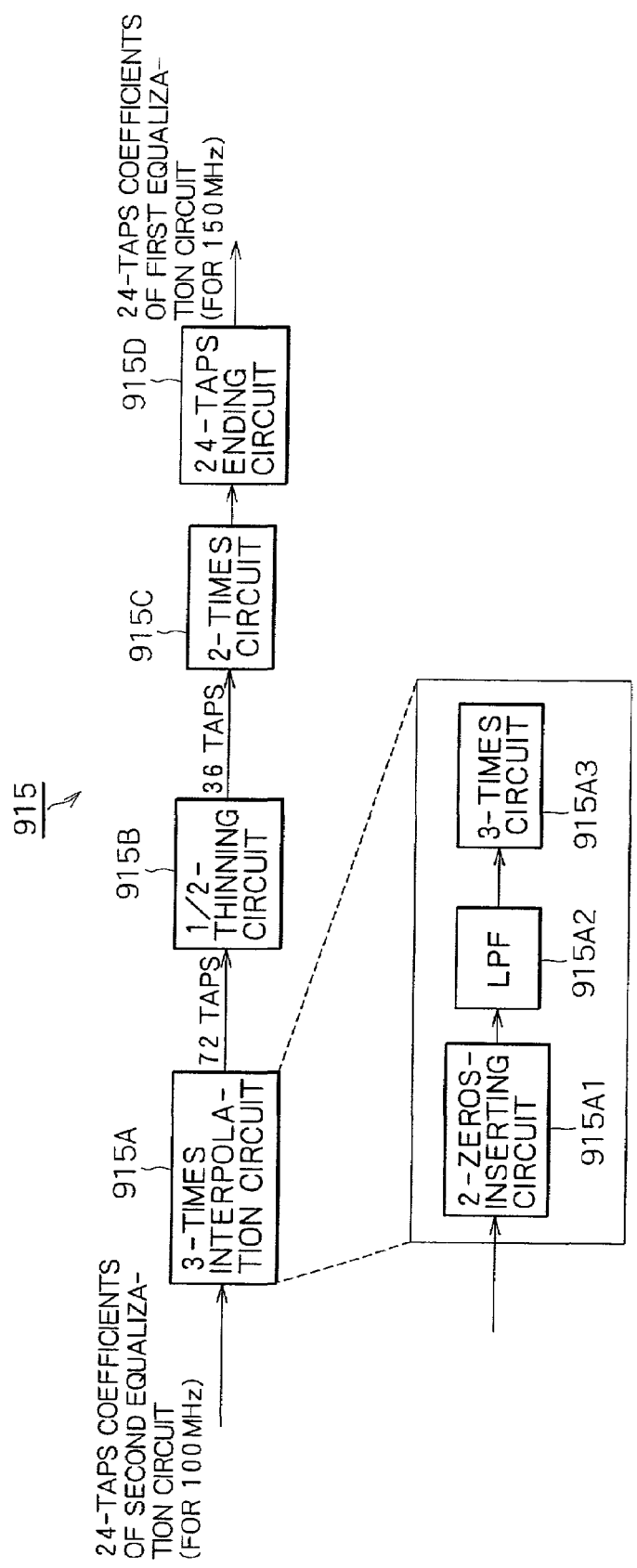
FIG. 57 is a block diagram showing a typical configuration of a 1.5-times interpolation circuit employed in the tap-coefficient-transforming circuit.

As shown in FIG. 57, the 1.5-times interpolation circuit 915 includes a 3-times interpolation circuit 915A, a ½-thinning circuit 915B, a 2-times circuit 915C and a 24-taps ending circuit 915D. In the 1.5-times interpolation circuit 915, the 3-times interpolation circuit 915A carries out 3-times interpolation on tap coefficients of the second equalization circuit 50 prior to a ½-thinning process in the ½-thinning circuit 915B. As shown in the figure, the 3-times interpolation circuit 915A includes a 2-zeros-inserting circuit 915A1, an LPF 915A2 and a 3-times circuit 915A3.

The number of taps subjected to 1.5-times interpolation is 24 and increased to 36 in the 1.5-times interpolation. The 24-taps ending circuit 915D is provided to end the tap coefficients at the $23^{rd}$ tap coefficient from 36 coefficients to only 24 coefficients.

Figure 58:
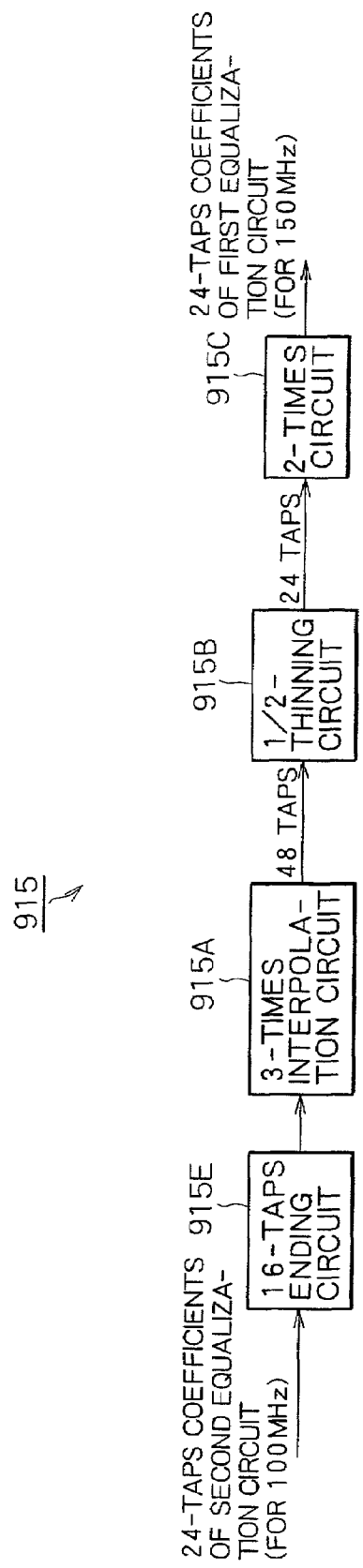
FIG. 58 is a block diagram showing another typical configuration of the 1.5-times interpolation circuit.

As shown in FIG. 58, the 1.5-times interpolation circuit 915 can also has a configuration including a 16-taps ending circuit 915E at the input stage. The 16-taps ending circuit 915E is provided to end the tap coefficients at the $15^{th}$ tap coefficient from 24 coefficients to only 16 coefficients in advance prior to 3-times interpolation in the 3-times interpolation circuit 915A.

Figure 59:
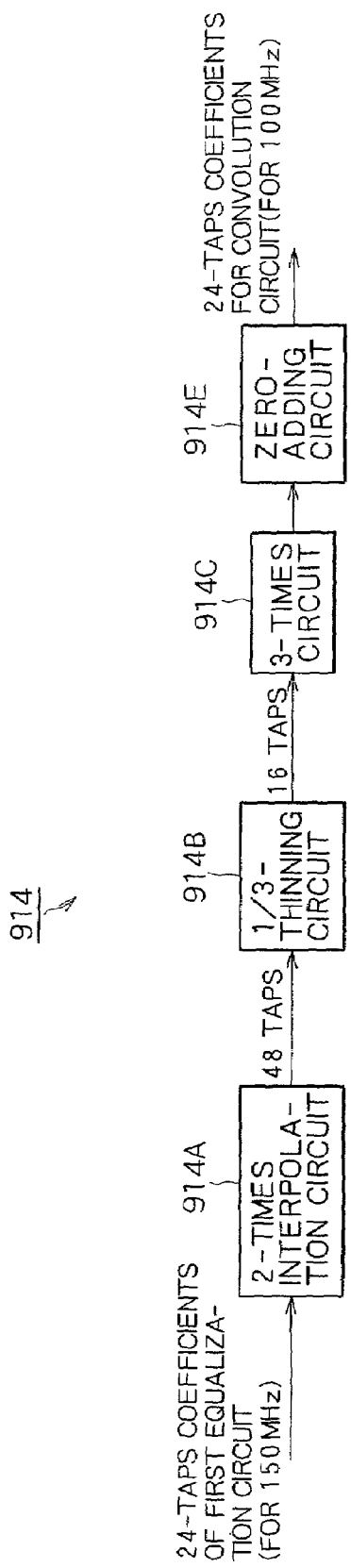
FIG. 59 is a block diagram showing a typical configuration of a 0.67-times interpolation circuit employed in the tap-coefficient-transforming circuit.

As shown in FIG. 59, the 0.67-times thinning circuit 914 includes a 2-times interpolation circuit 914A, a ⅓-thinning circuit 914B, a 3-times 914C and a zero-adding circuit 914E for transforming 16 taps coefficients into 24 taps coefficients.

Figure 60:
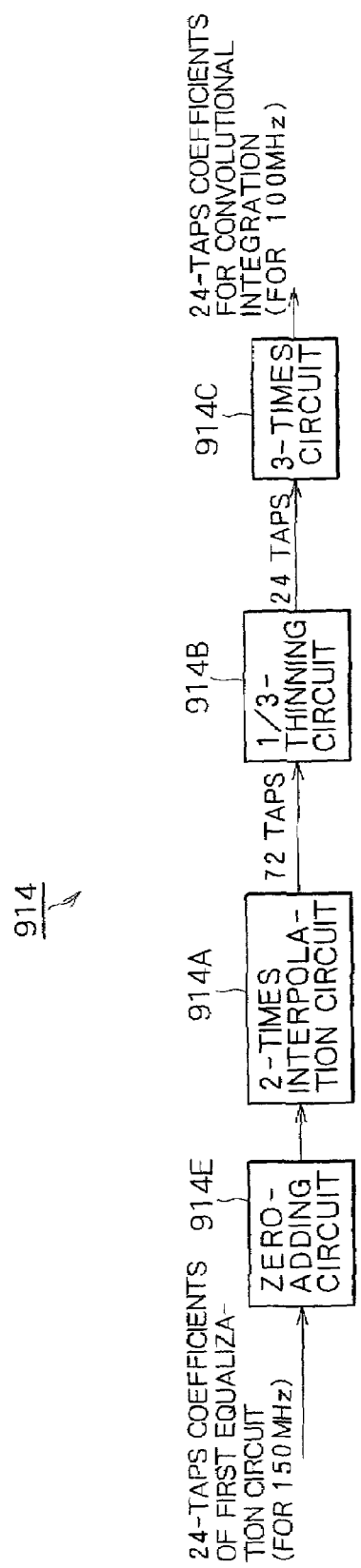
FIG. 60 is a block diagram showing another typical configuration of the 0.67-times interpolation circuit.

As an alternative, the 0.67-times thinning circuit 914 may also include the zero-adding circuit 914E at the input stage as shown in FIG. 60. The zero-adding circuit 914E transforms the tap coefficients from 24 coefficients to 36 coefficients in advance prior to 2-times interpolation in the 2-times interpolation circuit 914A.

Figure 61:
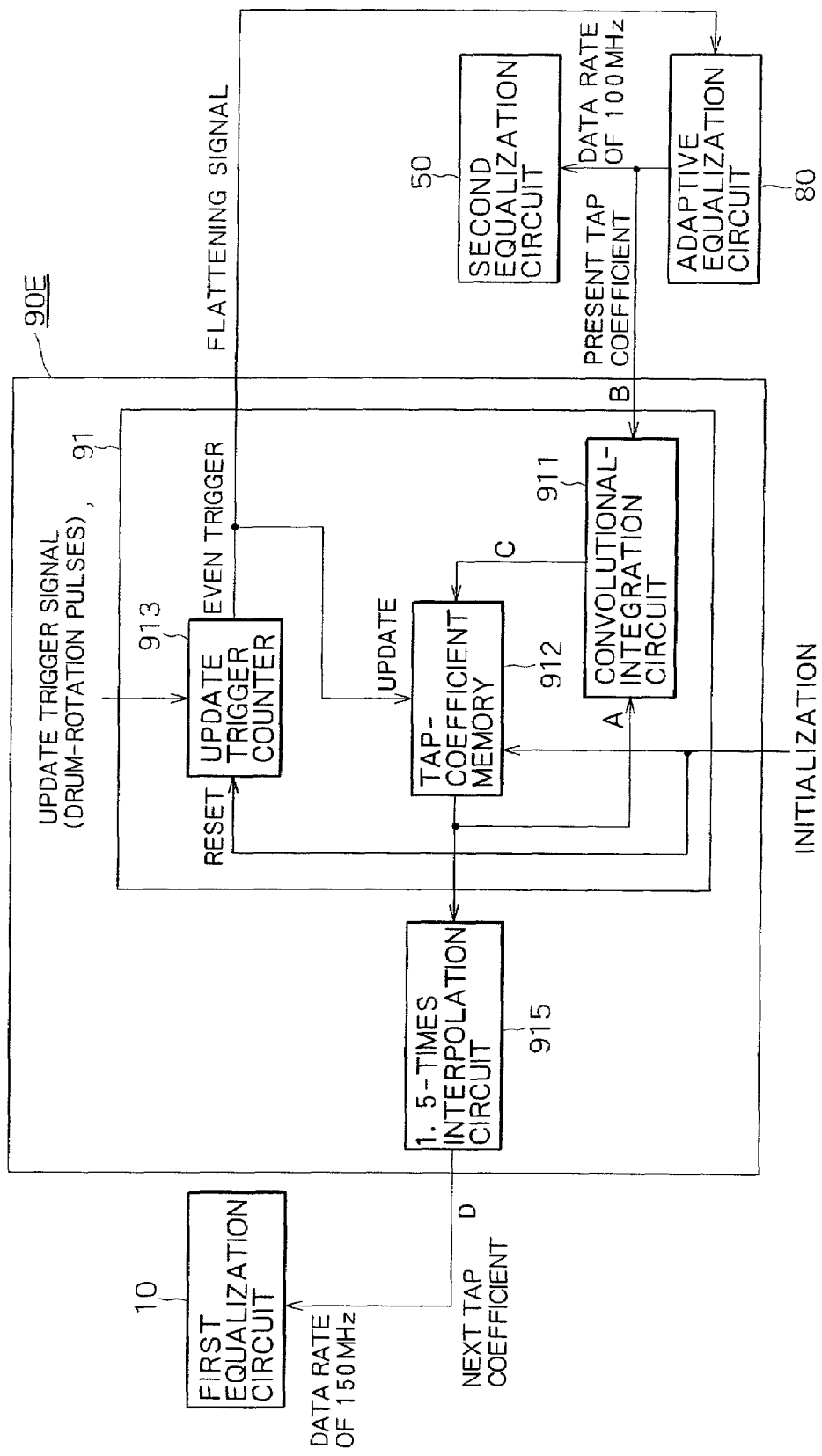
FIG. 61 is a block diagram showing another typical configuration of the tap-coefficient-transforming circuit for a case in which the sampling frequency of the first equalization circuit is different from the channel clock frequency.
Figure 62:
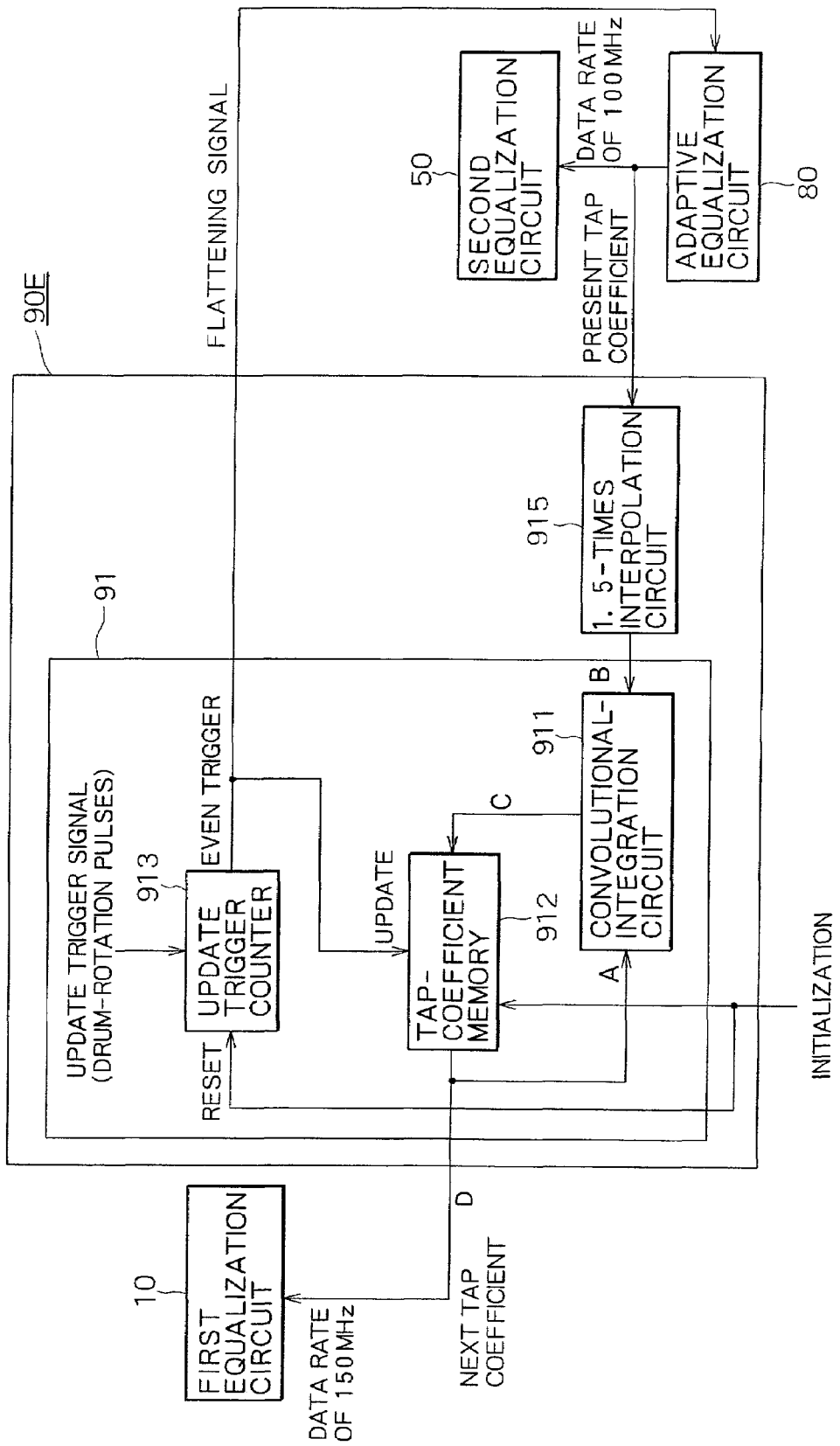
FIG. 62 is a block diagram showing a further typical configuration of the tap-coefficient-transforming circuit for a case in which the sampling frequency of the first equalization circuit is different from the channel clock frequency.

In addition, the 0.67-times thinning circuit 914 employed in the tap-coefficient-transforming circuit 90E shown in FIG. 56 can be eliminated to provide a configuration shown in FIG. 61 or 62.

In the tap-coefficient-transforming circuit 90E shown in FIG. 61, the 1.5-times interpolation circuit 915 is moved to a stage following the tap-coefficient memory 912. Tap coefficients are thus provided from the 1.5-times interpolation circuit 915 to the first equalization circuit 10. This configuration corresponds to the playback system 100E shown in FIG. 54.

In the tap-coefficient-transforming circuit 90E shown in FIG. 62, on the other hand, the present tap coefficients of the second equalization circuit 50 are supplied to the tap-coefficient-updating circuit 91 by way of the 1.5-times interpolation circuit 915. This configuration corresponds to the playback system 100E shown in FIG. 55. In the tap-coefficient-transforming circuit 90E shown in FIG. 62, the convolutional-integration circuit 911 carries out convolutional integration on the present tap coefficients A of the first equalization circuit 10 and tap coefficients B to compute tap coefficients C as a result convolutional-integration products as follows:

$$C = A * B,$$

where the symbol * denotes the convolutional-integration operator.

The tap coefficients B are obtained as a result of applying S1/S2-time interpolation to the present tap coefficients of the second equalization circuit 50 in the 1.5-times interpolation circuit 915. The tap coefficients C obtained as a result of the convolutional integration are used as next tap coefficients of the first equalization circuit 10. The tap-coefficient memory 912 latches the tap coefficients C resulting from the convolutional integration with a timing of an update signal. The next transfer characteristic of the second equalization circuit 50 is flattened by a flattening signal.

The description given so far explains a case in which the first equalization circuit 10 and the second equalization circuit 50 each employ a transversal filter. In general, the sampling frequency of the first equalization circuit 10 is higher than the channel clock frequency. It is possible to deal with such a case by determining the next transfer characteristic of the first equalization circuit 10 as follows. The frequency range of the second equalization circuit 50 is divided into a frequency region A inside the frequency range of the second equalization circuit 50 and a frequency region B outside the frequency range of the second equalization circuit 50. A product of the present transfer characteristic of the frequency region A and the present transfer characteristic of a frequency region A inside the frequency range of the first equalization circuit 10 is used as the next transfer characteristic of the frequency region A inside the frequency range of the first equalization circuit 10, and the next transfer characteristic of a frequency region B outside the frequency range of the first equalization circuit 10 is set at 0. In addition, the next transfer characteristic of the second equalization circuit 50 is flattened.

Figure 63:
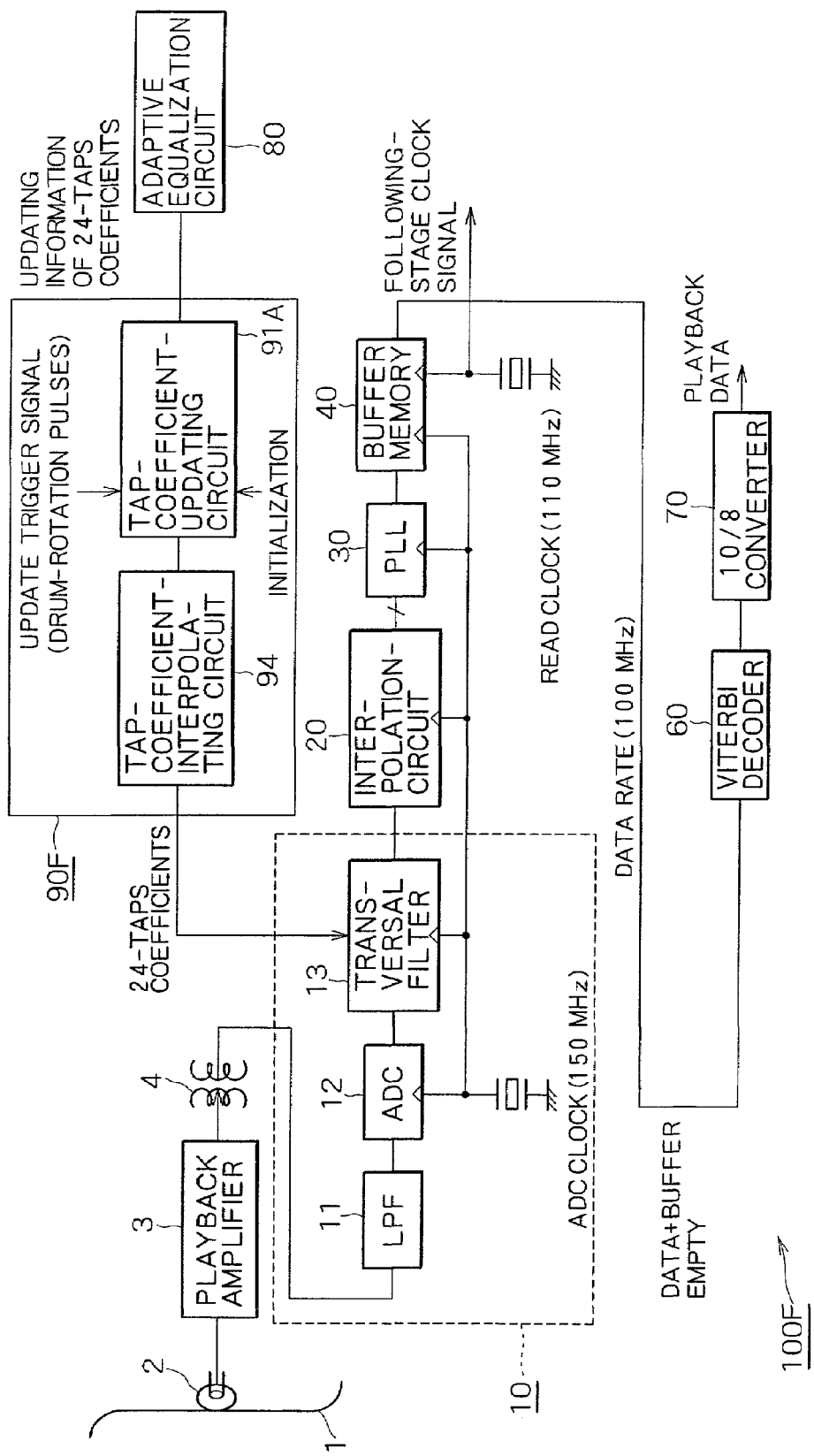
FIG. 63 is a block diagram showing a still further typical configuration of the playback system of a tape streamer provided by the present invention.

The sampling frequency of the first equalization circuit 10 may be different from the channel clock frequency. In this case, much like the playback system 100C shown in FIG. 44 and the playback system 100D shown in FIG. 45 wherein the sampling frequency of the first equalization circuit 10 is approximately equal to the channel clock frequency, the second equalization circuit 50 is eliminated to provide a playback system 100F of the tape streamer like one shown in FIG. 63.

Figure 64:
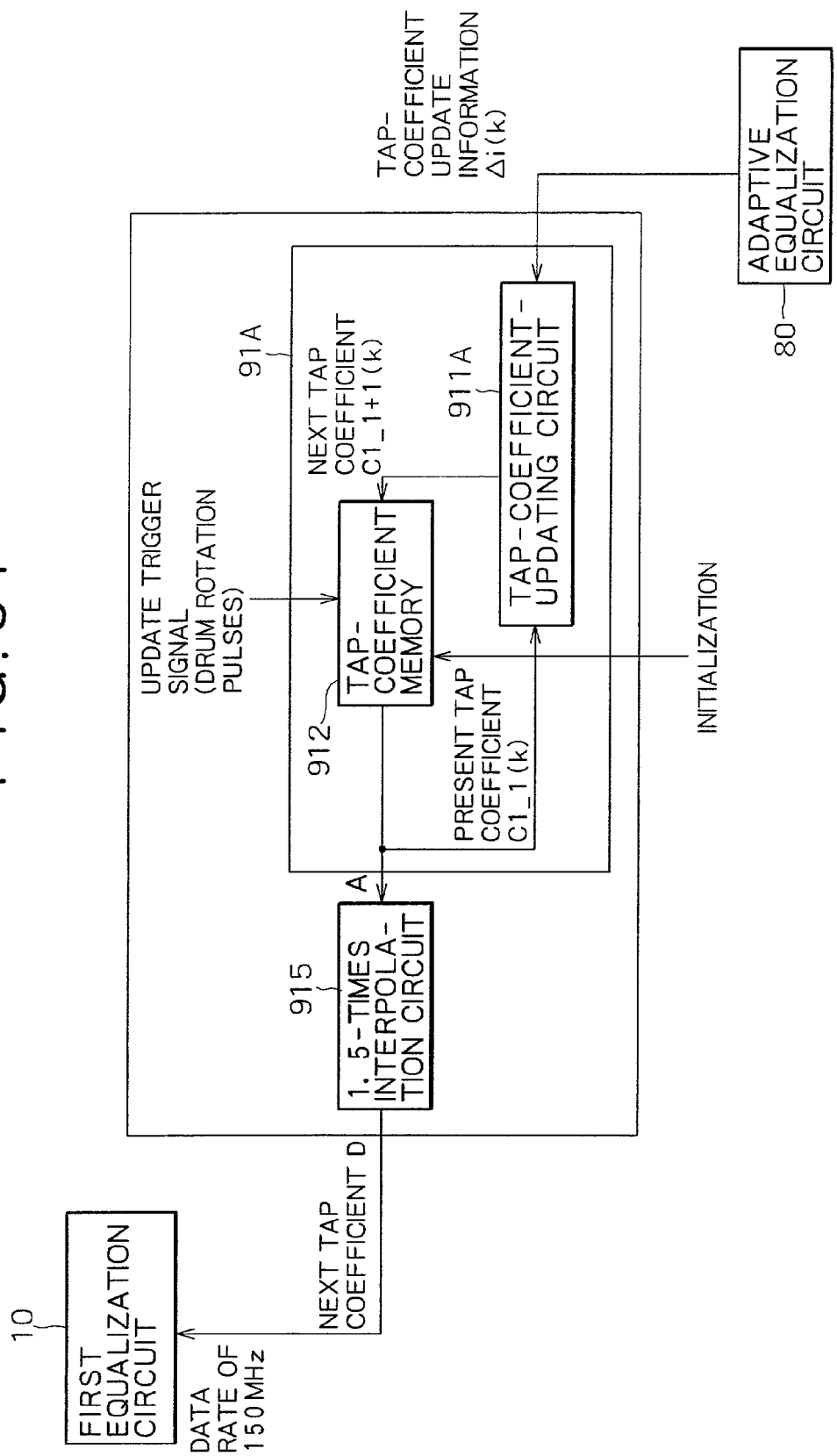
FIG. 64 is a block diagram showing a major part of a configuration of a tap-coefficient-setting circuit without second equalization circuit.
Figure 65:
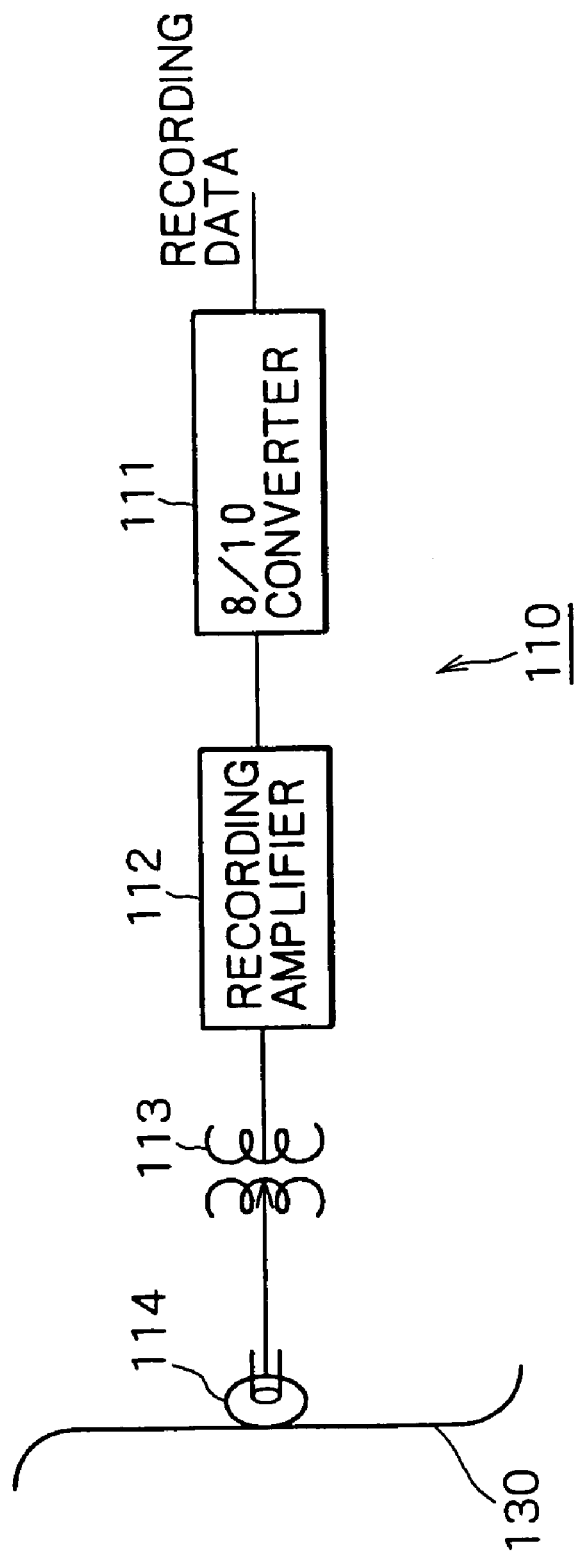
FIG. 65 is a block diagram showing the configuration of a recording system of the conventional tape streamer conforming to the DDS4 specifications.
Figure 66:
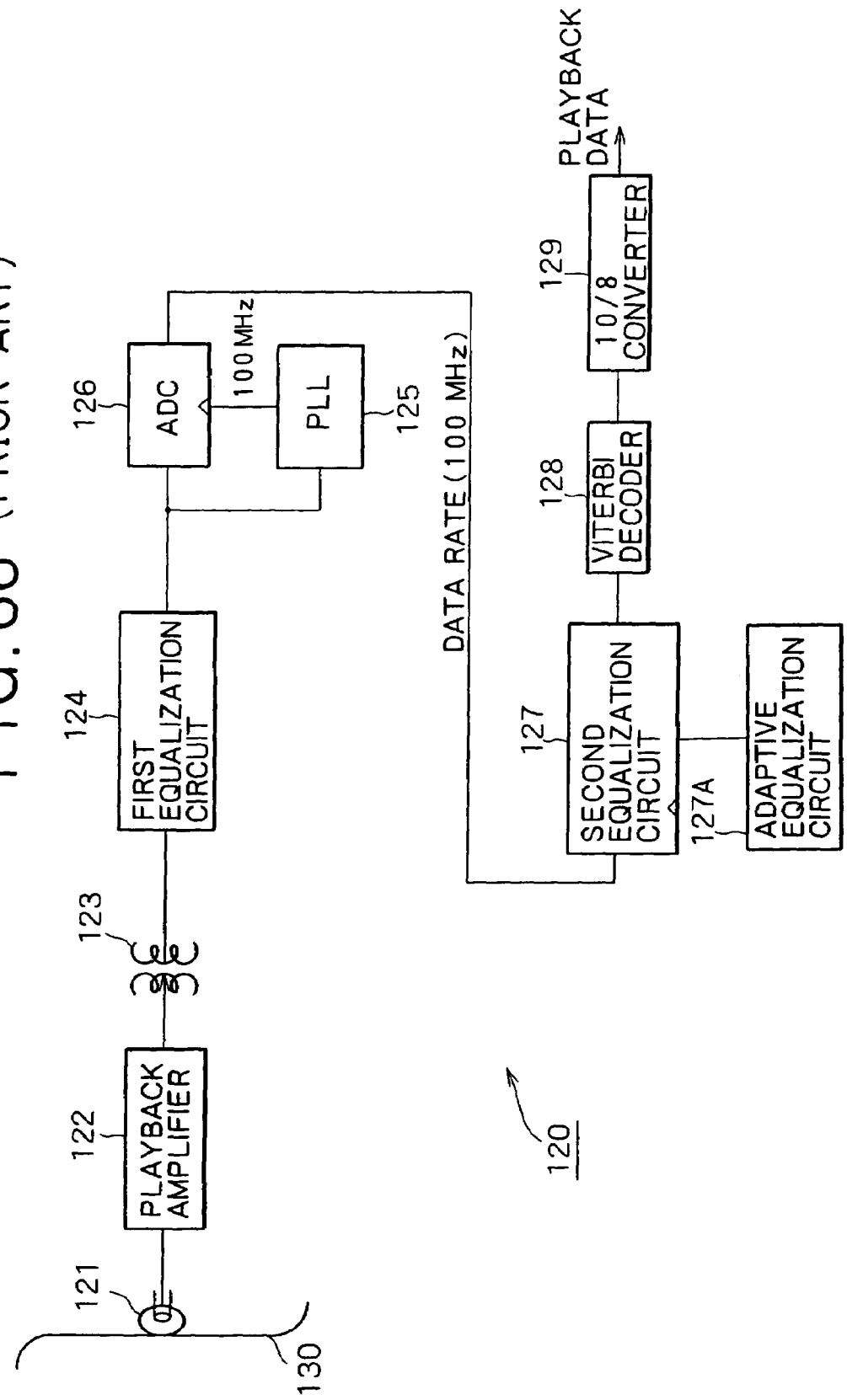
FIG. 66 is a block diagram showing the configuration of a playback system of the conventional tape streamer conforming to the DDS4 specifications.
Figure 67:
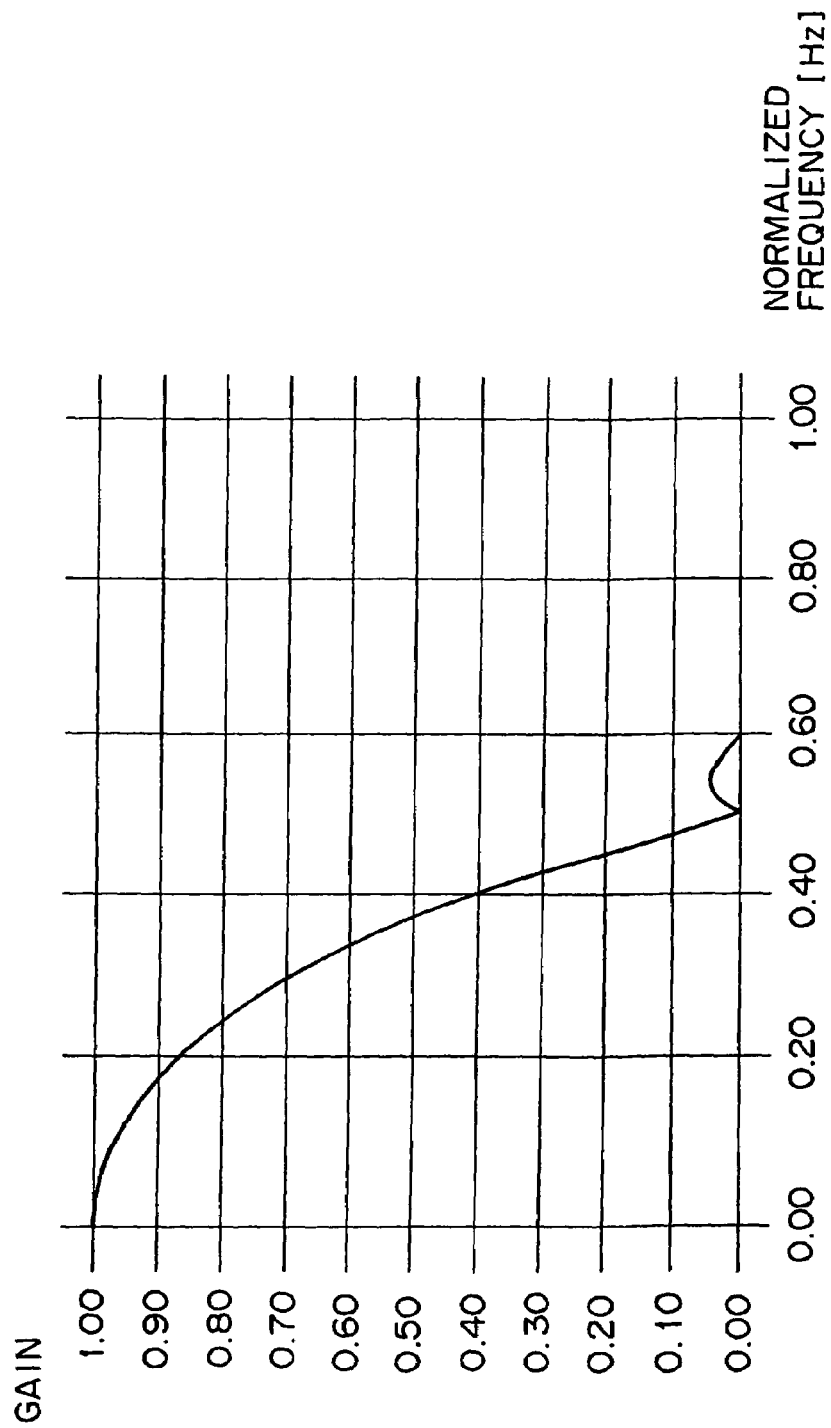
FIG. 67 is a diagram showing a PR1 transfer characteristic used in the DDS4 specifications.
Figure 68:
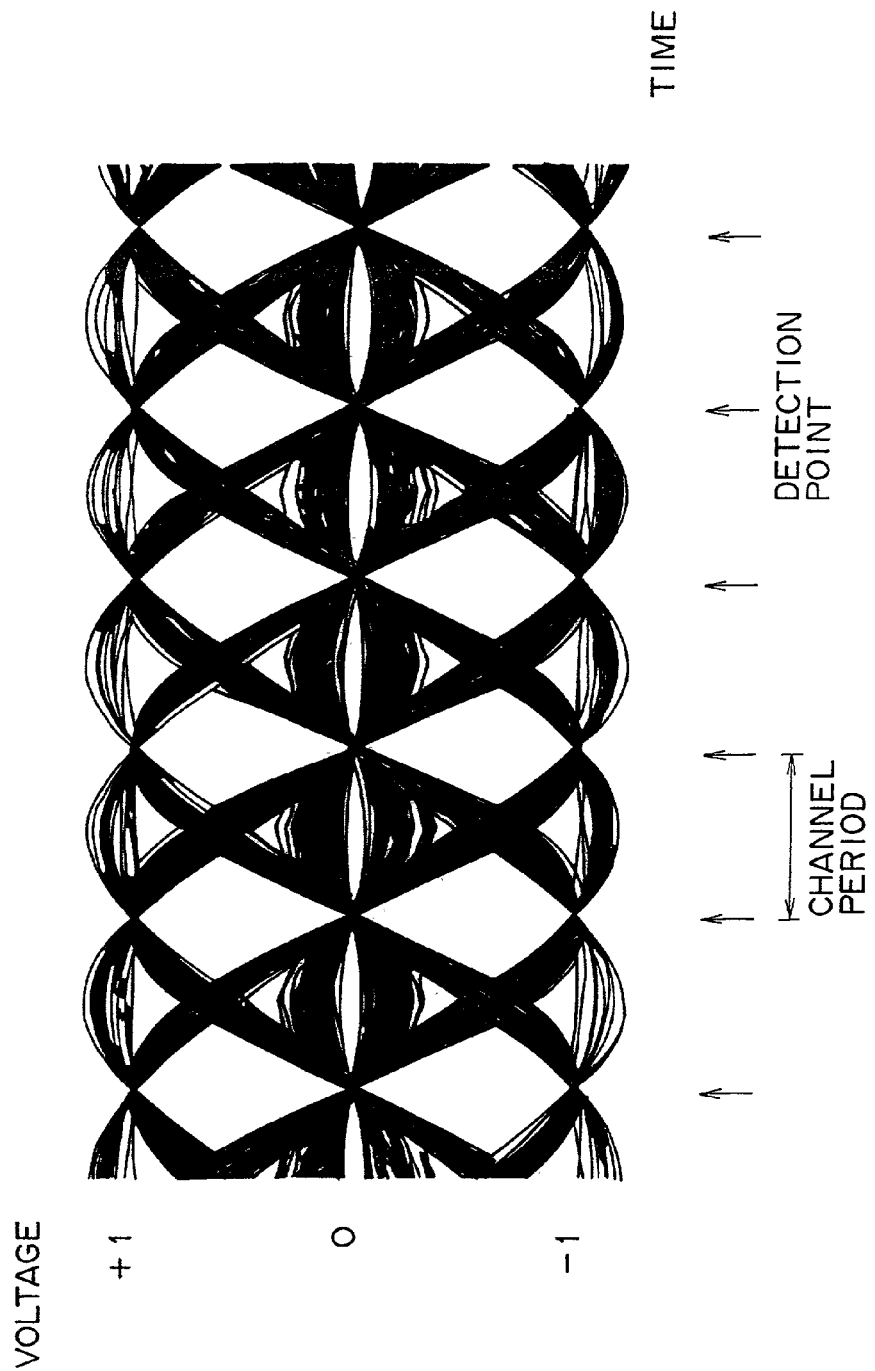
FIG. 68 is a diagram showing a PR1 channel output eye pattern in the playback system of the tape streamer.
Figure 69:
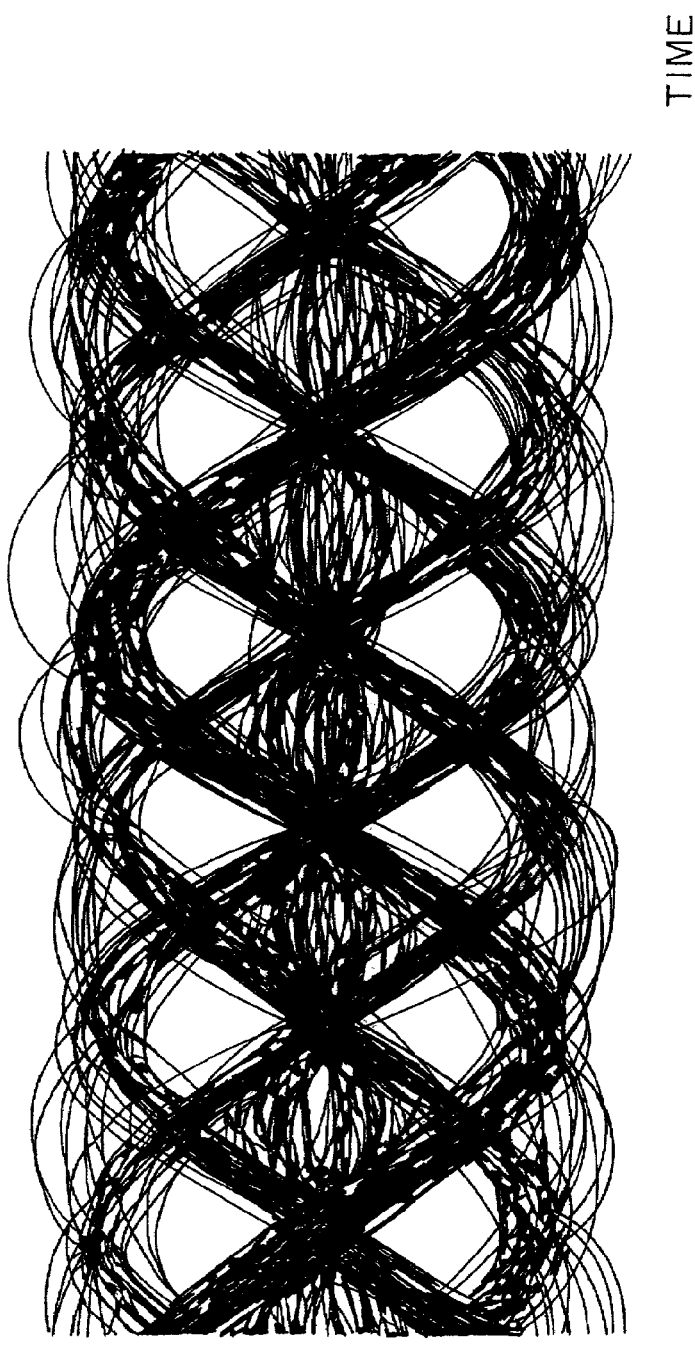
FIG. 69 is a diagram showing an eye pattern for a case in which a playback frequency characteristic set at the factory has inevitably changed due to wear of a playback head or dirt stuck on the playback head.
Figure 71:
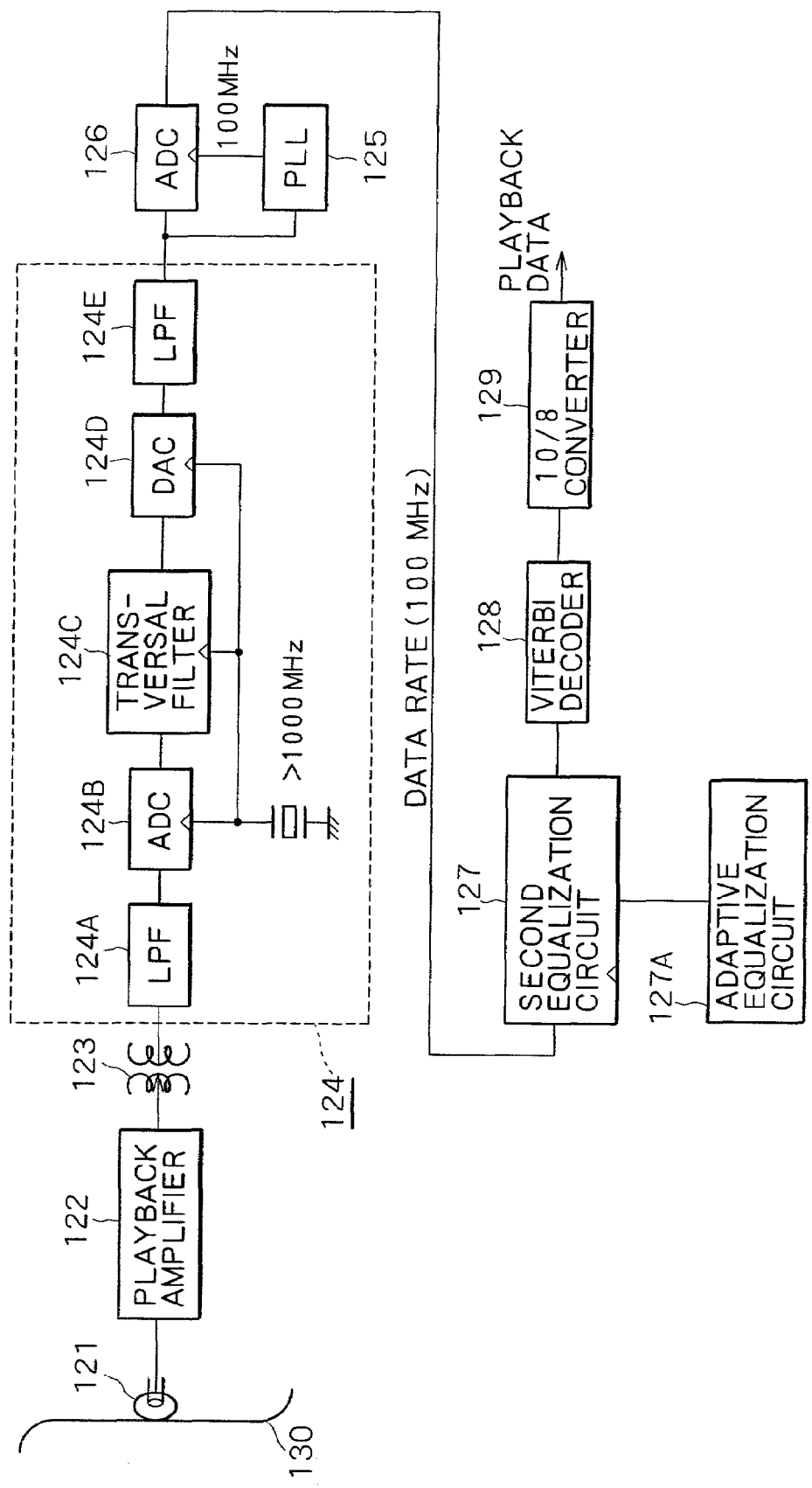
FIG. 71 is a block diagram showing the configuration of a playback system of a tape streamer employing a digital transversal filter in a first equalization circuit.
Figure 72:
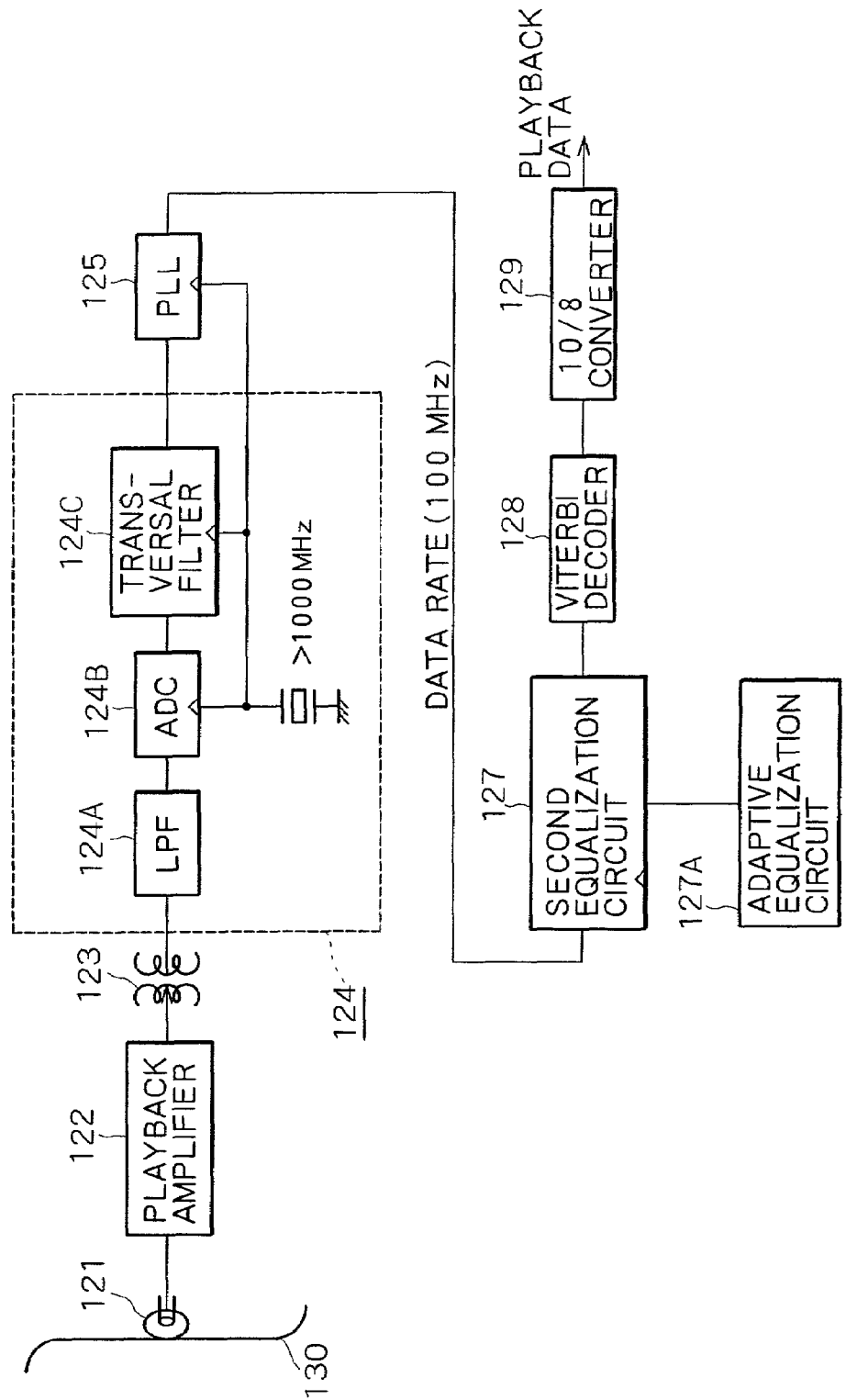
FIG. 72 is a block diagram showing the configuration of a playback system of a tape streamer employing a PLL circuit with a digital input.
Figure 73:
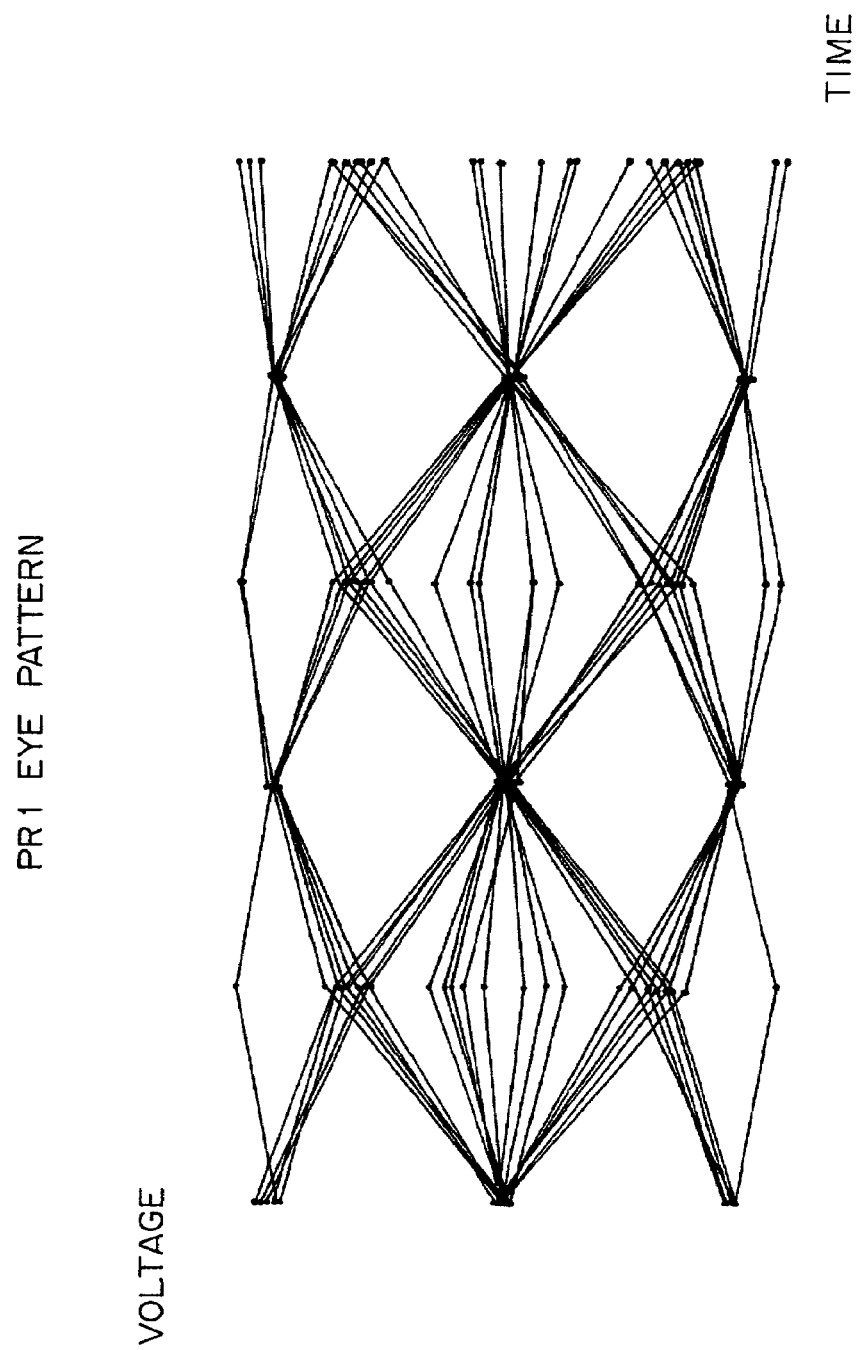
FIG. 73 is a diagram showing a PR1 channel output eye pattern for 2-times over sampling.
Figure 74:
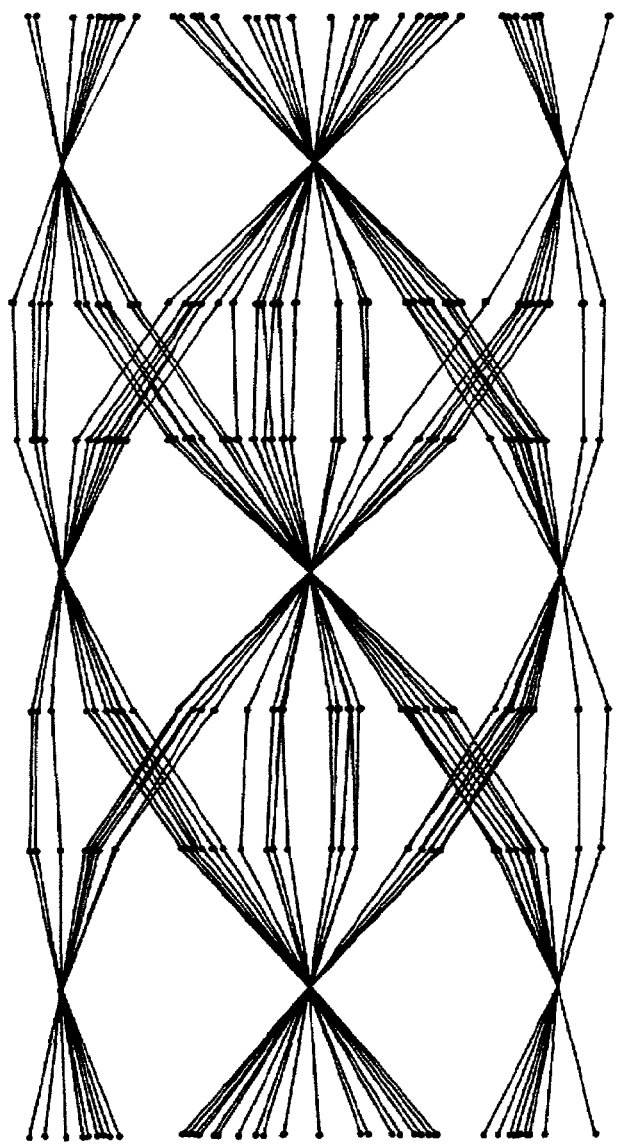
FIG. 74 is a diagram showing a PR1 channel output eye pattern for 3-time over sampling.
Figure 75:
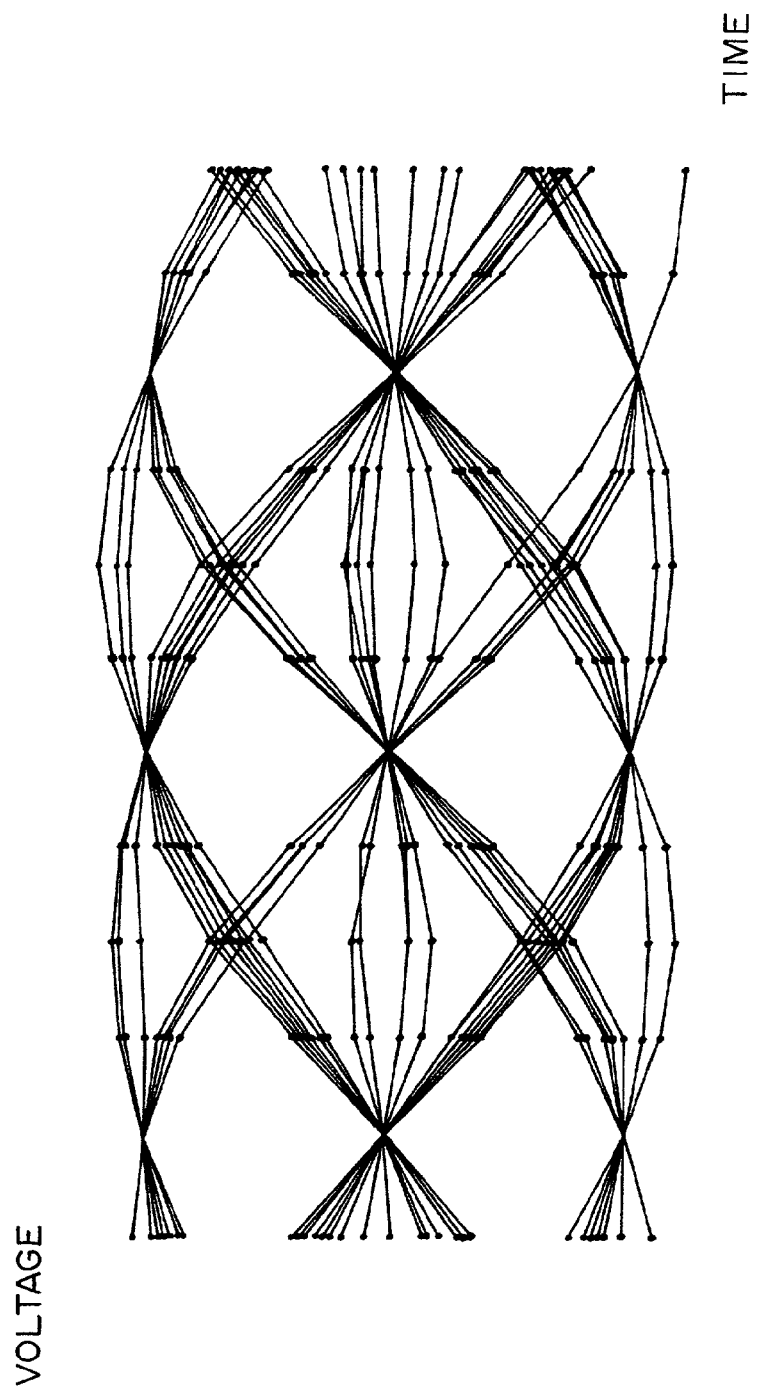
FIG. 75 is a diagram showing a PR1 channel output eye pattern for 4-times over sampling.
Figure 76:
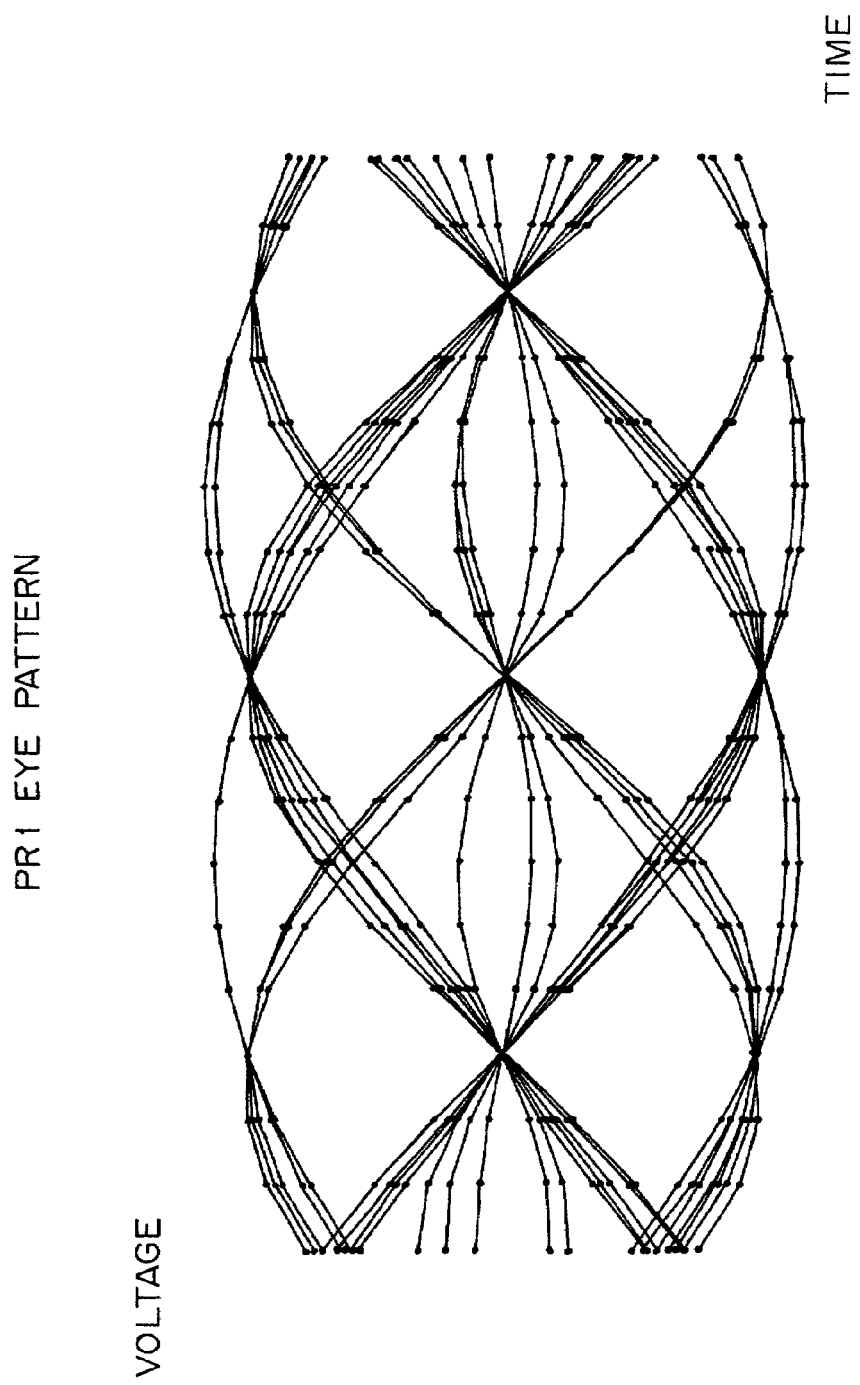
FIG. 76 is a diagram showing a PR1 channel output eye pattern for 6-time over sampling.
Figure 77:
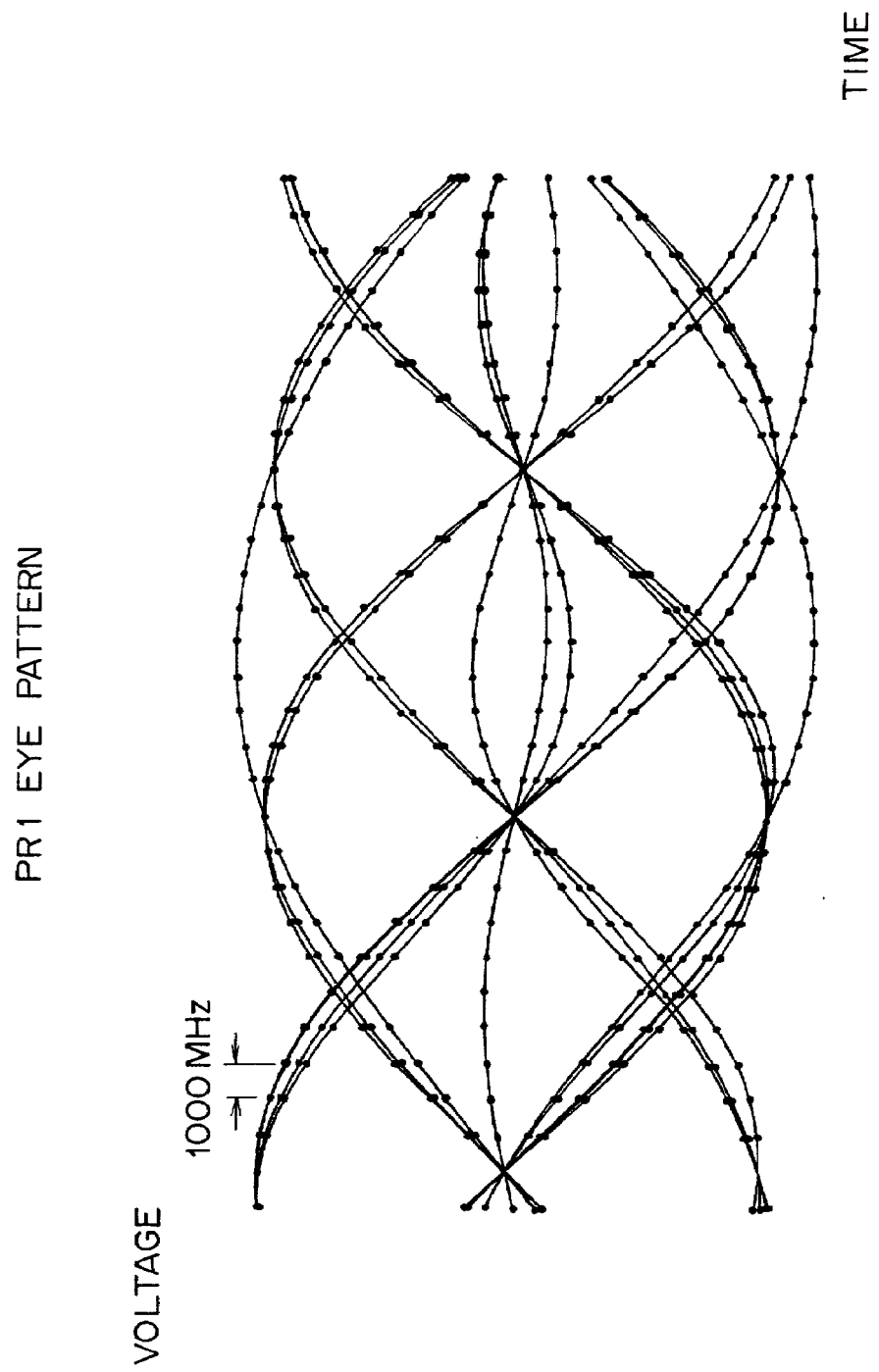
FIG. 77 is a diagram showing a PR1 channel output eye pattern for 10-time over sampling.

FIG. 64 is a diagram showing the configuration of the tap-coefficient-transforming circuit 90F not including the second equalization circuit 50. As shown in the figure, the present tap coefficients A of the first equalization circuit 10, which are generated by the tap-coefficient-updating circuit 91A shown in FIG. 42, are supplied to the first equalization circuit 10 by way of the 1.5-times interpolation circuit 915.

In order to apply tap-coefficient-updating information Δi(k) output by the adaptive equalization circuit 80 to the tap coefficients of the first equalization circuit 10, tap coefficients A are fetched from the tap-coefficient memory 912 provided at the stage preceding the 1.5-times interpolation circuit 915. The tap coefficients A are regarded as data obtained as a result of an fc/S1 thinning process carried out on present tap coefficients D of the first equalization circuit 10 where notation fc denotes a channel clock frequency and notation S1 denotes the sampling frequency of the first equalization circuit 10.

The tap-coefficient-updating circuit 91A computes a next tap coefficient C1_i+1(k) based on a present tap coefficient C1_i(k) output from the tap-coefficient memory 912 and the tap-coefficient-updating information Δ i(k) output by the adaptive equalization circuit 80 as follows:

$$C1\_i+1(k)=C1\_i(k)+\Delta i(k)$$

The next tap coefficient C1_i+1(k) is used for updating a tap coefficient A of the first equalization circuit 10.

The 1.5-times interpolation circuit 915 carries out S1/fc-times interpolation on tap coefficients A output by the tap-coefficient-updating circuit 91A to generate the tap coefficients D of the first equalization circuit 10.

In the signal-processing circuit provided by the present invention, by employing a transversal filter as a first equalization circuit provided at a stage preceding a PLL circuit, the operation of the PLL circuit can be stabilized.

To put it in detail, since the range in which the transfer characteristic of an analog equalizer changes is narrow, an equalization error remains. On the other hand, the range in which the transfer characteristic of the equalization circuit changes is broad. Thus, the equalization error can be minimized. As a result, the operation of the PLL circuit can be stabilized.

In addition, in the signal-processing circuit provided by the present invention, the first equalization circuit is set to carry out adaptive equalization. As a result, the operation of the PLL circuit can be stabilized.

While the preferred embodiment of the present invention has been described using the specific terms, such description is for illustrative purposes only, and it is to be understood that changes and variations may be made without departing from the spirit or scope of the following claims.

What is claimed is:

1. A signal-processing circuit, comprising:
   a phase-locked loop circuit for receiving playback data resulting from analog-to-digital conversion of a playback signal from an equalization circuit,
   wherein said equalization circuit is composed of a transversal filter,
   wherein said equalization circuit comprises a first equalization circuit and a second equalization circuit provided on a downstream side from said phase-locked loop circuit,
   a sampling frequency of said first equalization circuit is made approximately equal to a channel clock frequency;
   a subsequent transfer characteristic of said first equalization circuit is made equal to a product of a present transfer characteristic of said first equalization circuit and a present transfer characteristic of said second equalization circuit; and
   a subsequent transfer characteristic of said second equalization circuit is flattened, and
   wherein said transversal filter is used for each of said first equalization circuit and said second equalization circuit to obtain said subsequent transfer characteristic of said first equalization circuit by setting a subsequent tap coefficient of said first equalization circuit to a result of a convolutional integration of a present tap coefficient of said first equalization circuit and a present tap coefficient of said second equalization circuit.

2. The signal-processing circuit according to claim 1, wherein said equalization circuit includes means for performing adaptive equalization.

3. A signal-processing circuit comprising:
   a phase-locked loop circuit for receiving playback data resulting from analog-to-digital conversion of a playback signal from an equalization circuit,
   wherein said equalization circuit is composed of a transversal filter, and
   wherein said equalization circuit includes means for performing adaptive equalization; and
   an adaptive equalization circuit provided on a downstream side from said phase-locked loop circuit,
   wherein said equalization circuit is subjected to adaptive equalization by applying tap-coefficient-updating information output by said adaptive equalization circuit to a tap coefficient of said first equalization circuit in accordance with: subsequent k-th tap coefficient=present k-th tap coefficient+k-th tap-coefficient-updating information.

4. A signal-processing circuit comprising:
   a phase-locked loop circuit for receiving playback data resulting from analog-to-digital conversion of a playback signal from an equalization circuit,
   wherein said equalization circuit is composed of a transversal filter, and wherein said equalization circuit comprises a first equalization circuit and further comprising a second equalization circuit provided on a downstream side from said phase-locked loop circuit, wherein a sampling frequency of said first equalization circuit is set at a value higher than a channel clock frequency;

a subsequent transfer characteristic of said first equalization circuit is divided into a portion in a first frequency band being within a frequency band of said second equalization circuit and a portion in a second frequency band being outside of said frequency band of said second equalization circuit;

said portion of said subsequent transfer characteristic of said first equalization circuit in said first frequency band is taken as a product of a portion of said present time transfer characteristic of said first equalization circuit in said first frequency band and said present transfer characteristic of said second equalization circuit, and said portion of said subsequent transfer characteristic of said first equalization circuit in said second frequency band is set to zero; and said subsequent transfer characteristic of said second equalization circuit is flattened.

5. The signal-processing circuit according to claim 4, wherein said transversal filter is used for each of said first and said second equalization circuits to determine a subsequent tap coefficient of said first equalization circuit by:

obtaining a tap coefficient A of said first equalization circuit by subjecting a present tap coefficient of said first equalization circuit to fc/S1 thinning, where S1 denotes a sampling frequency of said first equalization circuit and fc denotes a channel clock frequency;

obtaining a convolution-integration result C in accordance with C=A*B, where * denotes a convolution-integration operator and B denotes a present tap coefficient of said second equalization circuit;

obtaining a tap coefficient D by subjecting said convolution-integration result C to S1/fc-times interpolation; and taking said tap coefficient D as said subsequent tap coefficient of said first equalization circuit.

6. The signal-processing circuit according to claim 4, wherein said transversal filter is used for each of said first and second equalization circuits to determine a subsequent tap coefficient of said first equalization circuit by:

obtaining a tap coefficient B of said second equalization circuit by subjecting a present tap coefficient of said second equalization circuit to fc/S1 thinning, where S1 denotes a sampling frequency of said first equalization circuit and fc denotes a channel clock frequency;

obtaining a convolution-integration result C in accordance with C=A*B, where * denotes a convolution-integration operator and A denotes a present tap coefficient of said first equalization circuit; and taking said convolution-integration result C as said subsequent tap coefficient of said first equalization circuit.

7. A signal-processing circuit comprising:

a phase-locked loop circuit for receiving playback data resulting from analog-to-digital conversion of a playback signal from an equalization circuit, wherein said equalization circuit is composed of a transversal filter, and wherein said equalization circuit includes means for performing adaptive equalization, an adaptive equalization circuit provided on a downstream side from said phase-locked loop circuit, wherein said equalization circuit is subjected to said adaptive equalization by:

making a sampling frequency S1 of said equalization circuit higher than a channel clock frequency fc;

obtaining a tap coefficient A by subjecting a present tap coefficient of said first equalization circuit to fc/S1 thinning;

calculating a subsequent value of said tap coefficient A in accordance with:

subsequent k-th value of tap coefficient A=present k-th value of tap coefficient A+k-th tap-coefficient-updating information;

obtaining a tap coefficient B by subjecting said subsequent value of said tap coefficient A to S1/fc-times interpolation; and setting said tap coefficient B to a subsequent tap coefficient of said first equalization circuit.

8. A signal-processing circuit, comprising:

an analog-to-digital converter for sampling a playback signal to convert said playback signal into a digital signal and for outputting said digital signal; and a digital phase-locked loop circuit for receiving said digital signal from said analog-to-digital converter, wherein said digital signal output by said analog-to-digital converter is supplied to said digital phase-locked loop circuit to fetch a detection-point voltage, an equalization circuit provided between said analog-to-digital converter and said phase-locked loop circuit, wherein said equalization circuit includes a digital transversal filter an interpolation circuit provided between said equalization circuit and said digital phase-locked loop circuit, wherein said interpolation circuit is adapted to interpolate separate pieces of sampling data with period approximately equal to a channel-clock period.

9. The signal-processing circuit according to claim 8, wherein a sampling frequency of said analog-to-digital converter is approximately equal to a channel-clock frequency.

10. The signal-processing circuit according to claim 8, wherein said interpolation circuit includes a transversal filter for said interpolation and an R-times interpolation circuit; and data is thinned at intervals of R taps of said transversal filter for said interpolation.

11. The signal-processing circuit according to claim 10, wherein said R-times interpolation circuit is composed of R pieces of a plurality of transversal filters disposed in parallel.

12. The signal-processing circuit according to claim 8, wherein said interpolation circuit includes a low-magnification interpolation circuit that includes a transversal filter and a Q-times linear interpolation circuit provided on a downstream side from said low-magnification interpolation circuit.

13. The signal-processing circuit according to claim 12, wherein said Q-times linear interpolation circuit is composed of Q pieces of a plurality of interpolation circuits disposed in parallel.

14. The signal-processing circuit according to claim 8, wherein said phase-locked loop circuit includes:

a data selector for receiving R×Q parallel trains of S×R×Q-times interpolation data from said interpolation circuit and selecting one of 0 and 1 piece of said data closest to a detection point from said parallel trains of data for S>1;

a detection point computing circuit for controlling said data selector; and a circuit for reporting one of 0 said detection points and 1 said detection point.

15. The signal-processing circuit according to claim 8, wherein said phase-locked loop circuit includes:
a data selector for receiving R×Q parallel trains of S×R×Q-times interpolation data from said interpolation circuit and selecting one of 0, 1, and 2 pieces of said data closest to detection points from said parallel data for S≦1;
a detection point computing circuit for controlling said data selector; and
a circuit for reporting one of 0, 1, and 2 said detection points.

16. The signal-processing circuit according to claim 8, wherein said phase-locked loop circuit includes:
a plurality of data selectors for receiving P×R×Q parallel trains of S×R×Q-times interpolation data from said interpolation circuit and for selecting a number of said data closest to a plurality of maximum detection points from said parallel data, a quantity of data selectors in said plurality of data selectors being equal to Dmax;
a plurality of detection point computing circuits for controlling one of said plurality of data selectors; and
a circuit for reporting a plurality of detection points.

17. The signal-processing circuit according to claim 8, wherein said phase-locked loop circuit includes:
thinning period correcting means for absorbing frequency deviations while being updated in accordance with:

$$d = d \pm \Delta d,$$

wherein d denotes a thinning period and Δd denotes a thinning period correction quantity; and
a value of said thinning period correction quantity Δd given to said thinning period correcting means is changed in accordance with a response speed.

18. The signal-processing circuit according to claim 8, wherein a buffer memory in which data output by said phase-locked loop circuit is stored and from which data is read with a clock signal is provided on a downstream side from said phase-locked loop circuit.

19. The signal-processing circuit according to claim 18, wherein said buffer memory has two memory banks; and
for S≦1 odd-numbered detection point data and even-numbered detection point data output by said phase-locked loop circuit are stored alternately into said two memory banks of said buffer memory.

20. The signal-processing circuit according to claim 18, wherein said buffer memory has a plurality of memory banks, a quantity of memory banks in said plurality of memory banks being equal to Dmax, wherein Dmax is a maximum number of detection points simultaneously output by said phase locked loop circuit for receiving P×R×Q parallel trains of S×R×Q-times interpolation data Dmax is expressed by: Dmax=Int(P/S)+1; and
when a number of detection points reported by said phase locked loop circuit is D and D is one of less than and equal to Dmax detection point data output by said phase-locked loop circuit are stored in said buffer memory having said D banks.

21. The signal-processing circuit according to claim 18, wherein a frequency of said clock signal for reading data from said buffer memory is higher than a frequency of a channel clock signal.

22. The signal-processing circuit according to claim 21, wherein said buffer memory includes:
an empty-buffer detection circuit for outputting an empty-data signal to indicate that said buffer memory is empty, wherein an operation of circuits provided at a back of said empty-buffer detection circuit is stopped based on said empty-data signal.

23. The signal-processing circuit according to claim 18, further comprising a voltage-controlled oscillator for generating said clock signal for reading said data from said buffer memory.

24. The signal-processing circuit according to claim 23, wherein an oscillation frequency of said voltage-controlled oscillator is controlled to prevent an empty-data state and a data overflow in said buffer memory.

25. The signal-processing circuit according to claim 24, wherein said voltage-controlled oscillator is subjected to feedback control such that a read address to read said data from said buffer memory and a write address to write said data into said buffer memory satisfy:

(write address−read address)=a maximum difference.

26. A recording and playback apparatus having a recording system and a playback system each employing a signal-processing circuit, each of said signal-processing circuits comprising:
a first equalization circuit;
a phase-locked loop circuit for receiving playback data obtained as a result of analog-to-digital conversion of a playback signal by said first equalization circuit; and
a second equalization circuit provided on a downstream side from said phase-locked loop circuit,
wherein each of said first and said second equalization circuits is composed of a transversal filter;
a sampling frequency of said first equalization circuit is set at a value approximately equal to a channel clock frequency;
a subsequent transfer characteristic of said first equalization circuit is made equal to a product of a present transfer characteristic of said first equalization circuit and a present transfer characteristic of said second equalization circuit; and
a subsequent transfer characteristic of said second equalization circuit is flattened.

27. A recording and playback apparatus including a recording system and a playback system each employing a signal-processing circuit, each of said signal-processing circuits comprising:
an analog-to-digital converter for sampling a playback signal to convert said playback signal into a digital signal;
a digital phase-locked loop circuit for receiving said digital signal from said analog-to-digital converter;
an equalization circuit composed of a digital transversal filter, said equalization circuit being provided between said analog-to-digital converter and said phase-locked loop circuit; and
an interpolation circuit for interpolating separate pieces of sampling data with a period approximately equal to a channel clock period, said interpolation circuit being provided between said equalization circuit and said digital phase-locked loop circuit,
wherein said interpolation circuit includes a Q-times linear interpolation circuit and an R-times interpolation circuit composed of a plurality of transversal filters, said plurality containing a number of transversal filters equal to R;

a sampling frequency of said analog-to-digital converter is set at a value approximately equal to a channel clock frequency; and said digital signal output of said analog-to-digital converter is supplied to said digital phase-locked loop circuit to fetch a detection point voltage.

* * * * *